Figure 1:
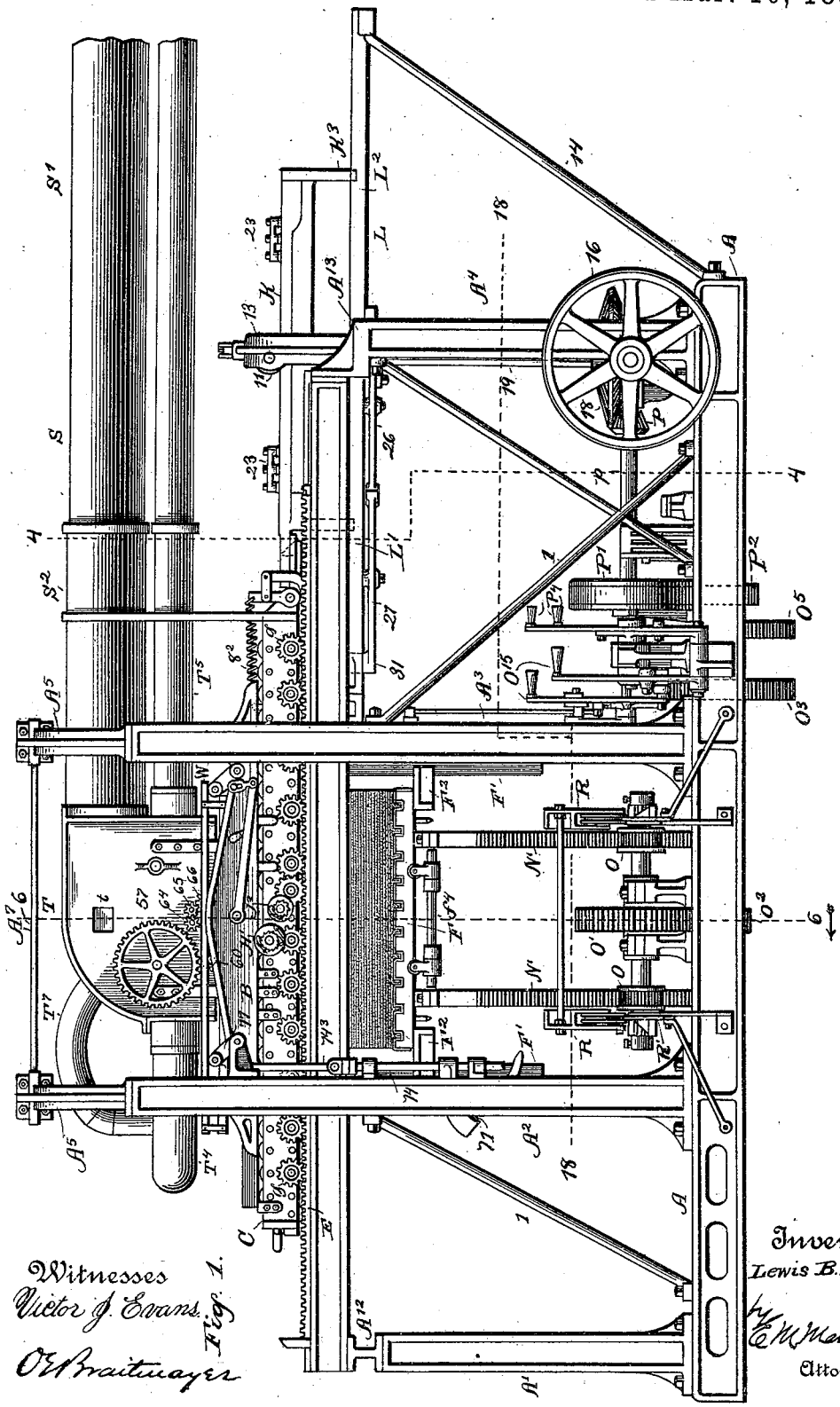

(No Model.) 25 Sheets—Sheet 3.
L. B. McDONALD.
PRESS FOR BALING COTTON, &c.

No. 556,274. Patented Mar. 10, 1896.

Witnesses
Victor J. Evans
O. F. Braitmayer

Inventor
Lewis B. McDonald.
by E. W. Marble & Sons
Attorneys (No Model.)  
25 Sheets—Sheet 7.

L. B. McDONALD.
PRESS FOR BALING COTTON, &c.

No. 556,274. Patented Mar. 10, 1896.

Witnesses  
Victor J. Evans.  
O. E. Braitmayer

Inventor  
Lewis B. McDonald  
by E. M. Marble & Sons,  
Attorneys

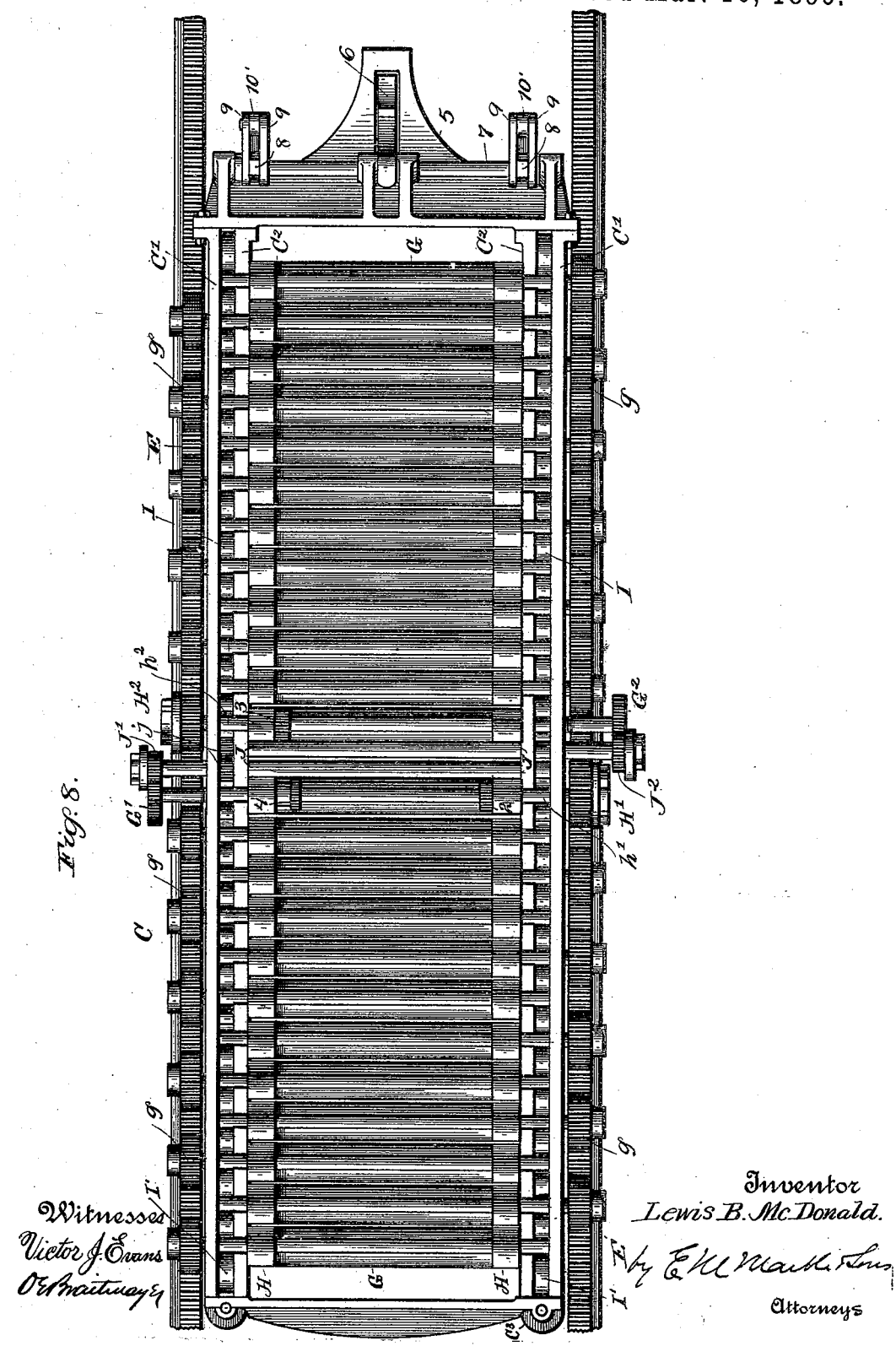

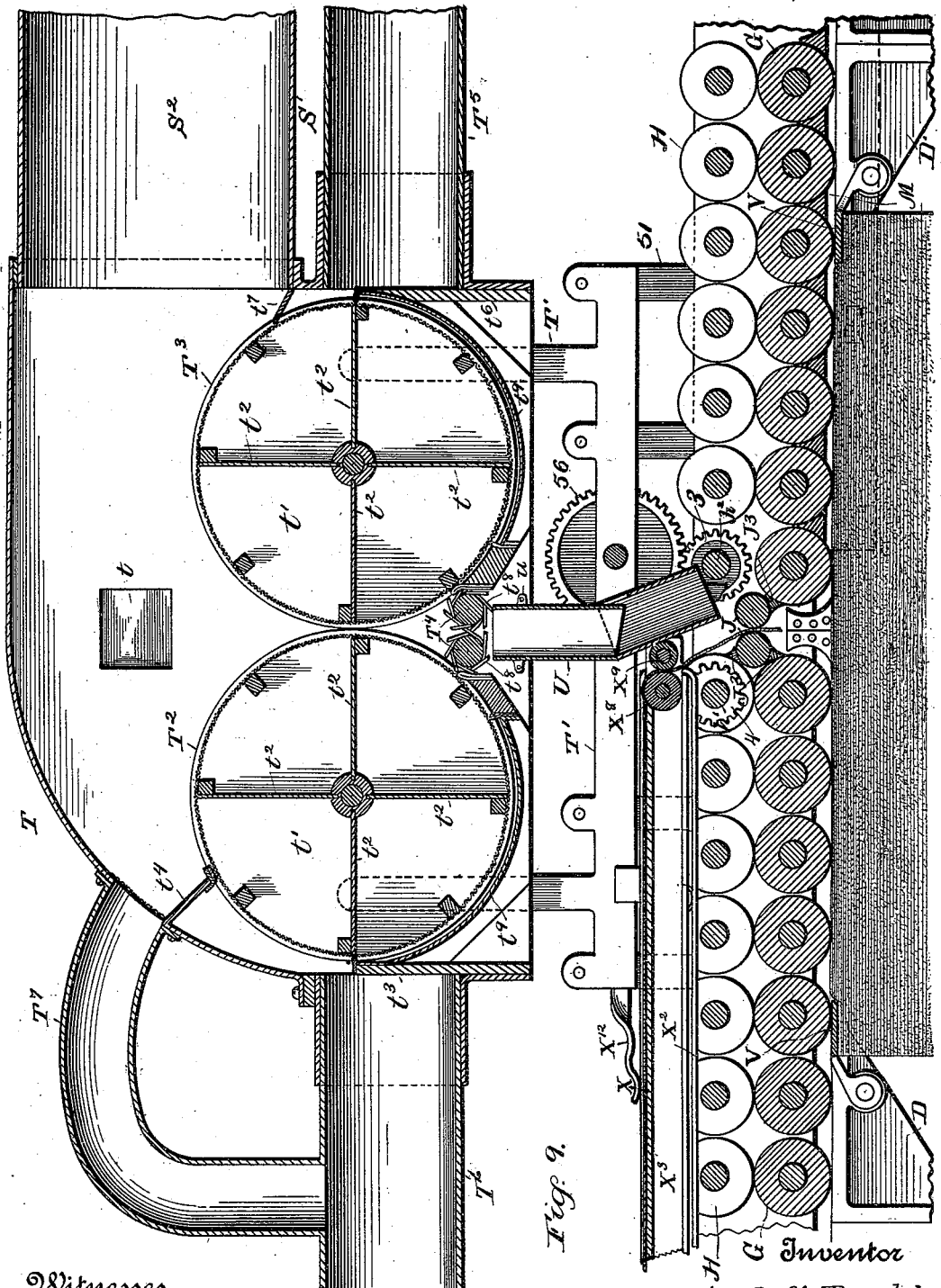

(No Model.)
25 Sheets—Sheet 10.
L. B. McDONALD.
PRESS FOR BALING COTTON, &c.
No. 556,274.
Patented Mar. 10, 1896.
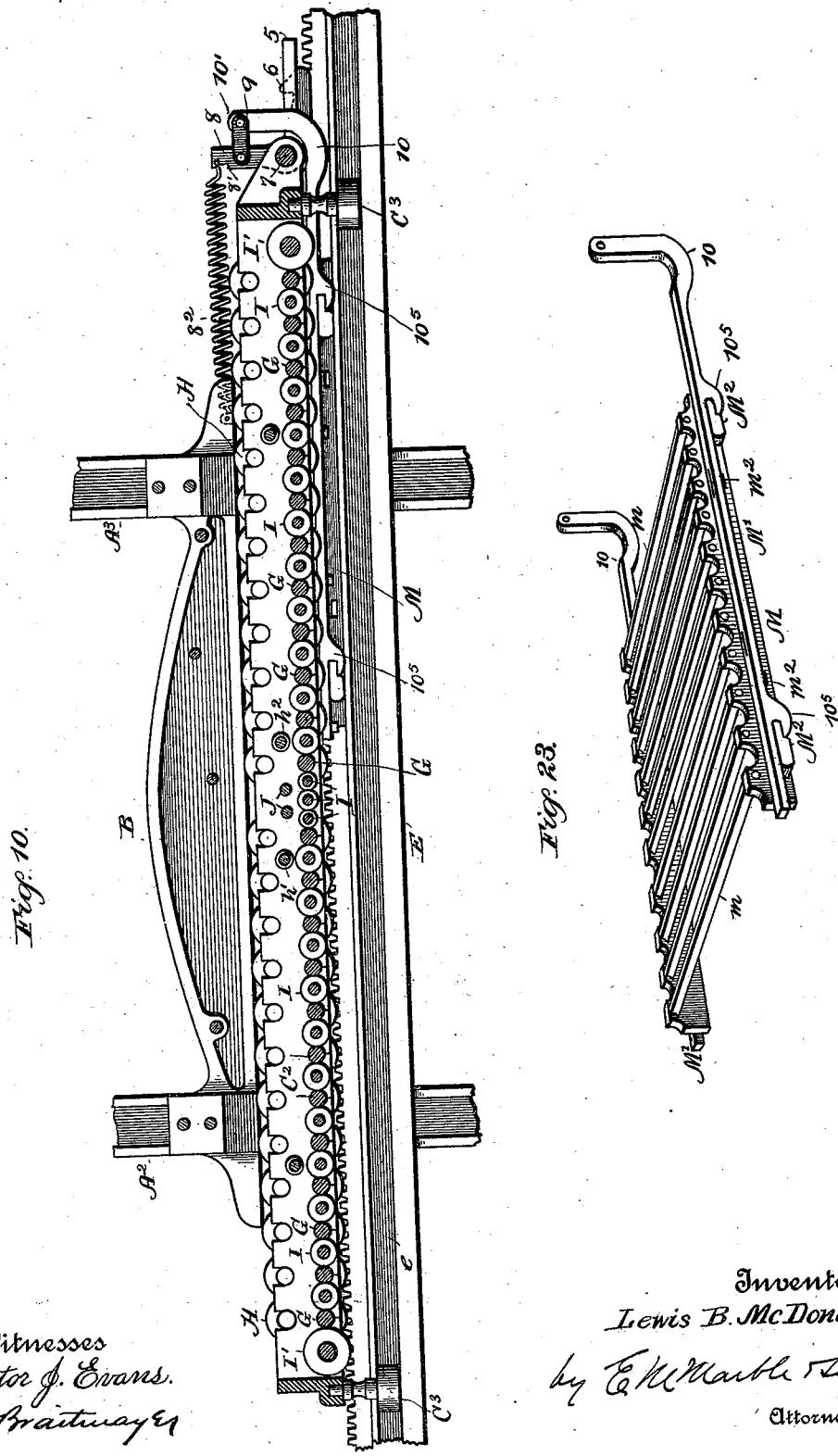
Witnesses
Victor J. Evans.
O. F. Braitmayer
Inventor
Lewis B. McDonald.
by E. W. Marble & Sons
Attorneys (No Model.) 25 Sheets—Sheet 11.
L. B. McDONALD.
PRESS FOR BALING COTTON, &c.
No. 556,274. Patented Mar. 10, 1896.
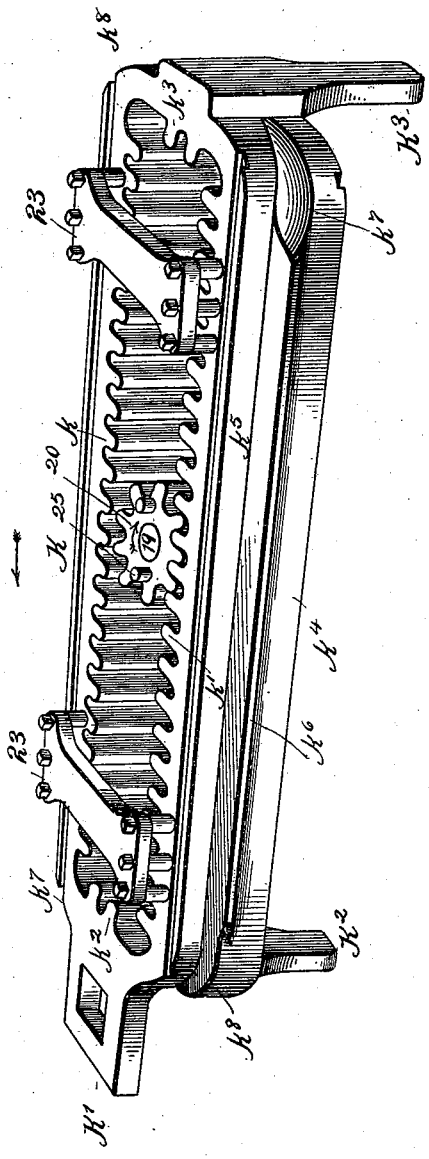
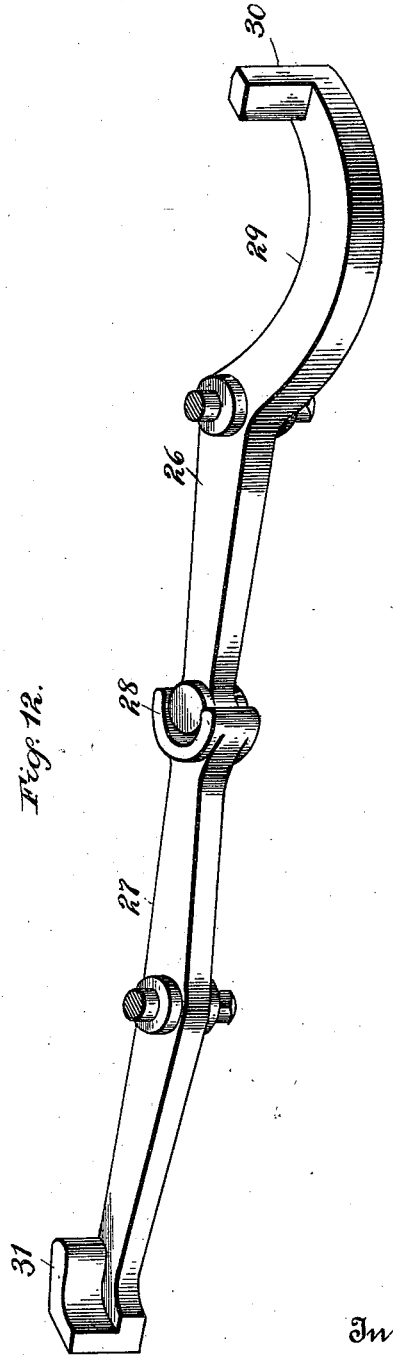
Witnesses
Victor J. Evans
O. W. Braitmayer
Inventor
Lewis B. McDonald
by E. W. Marble & Son
Attorneys

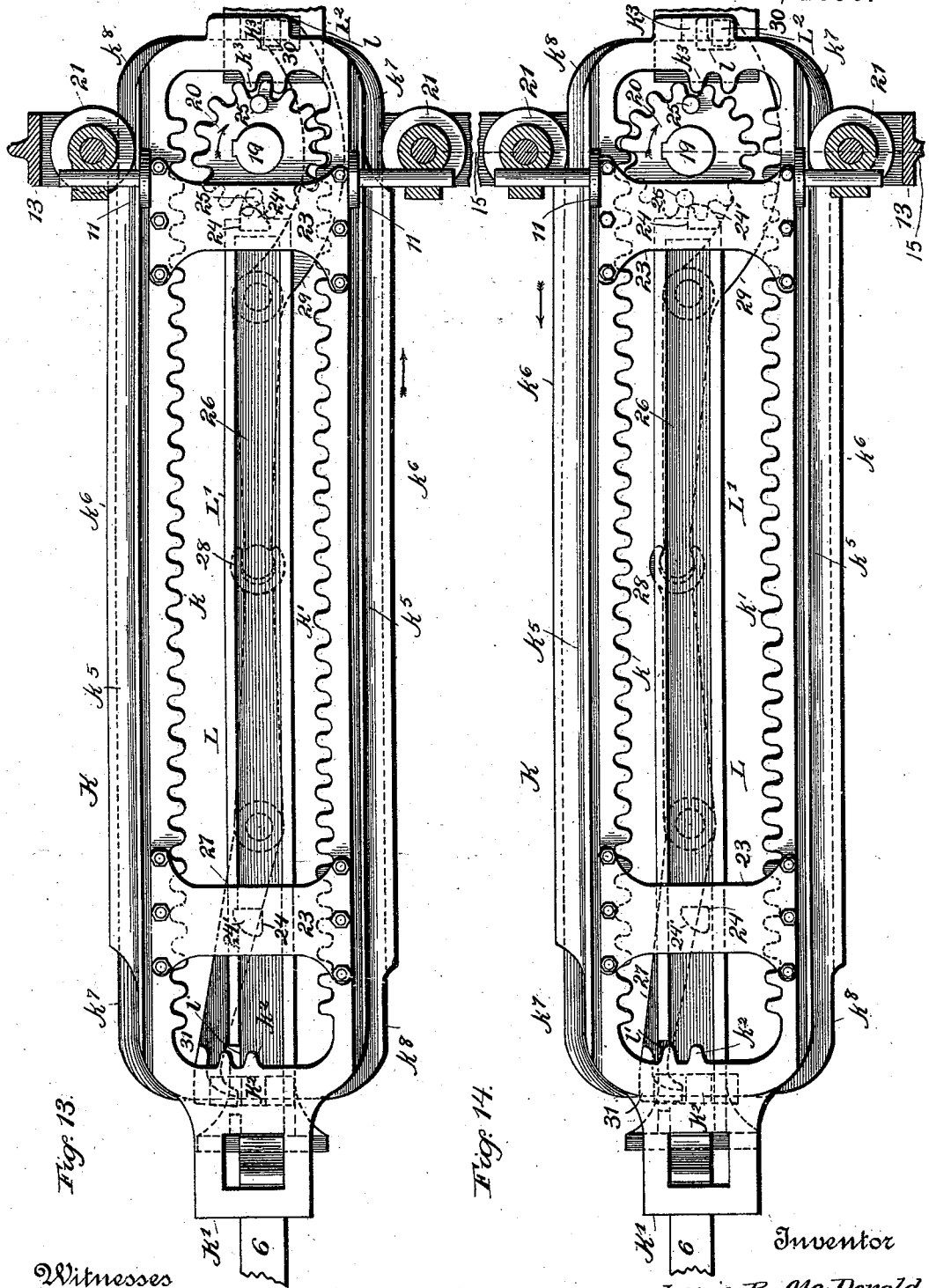

(No Model.) 25 Sheets—Sheet 13.
L. B. McDONALD.
PRESS FOR BALING COTTON, &c.
No. 556,274. Patented Mar. 10, 1896.
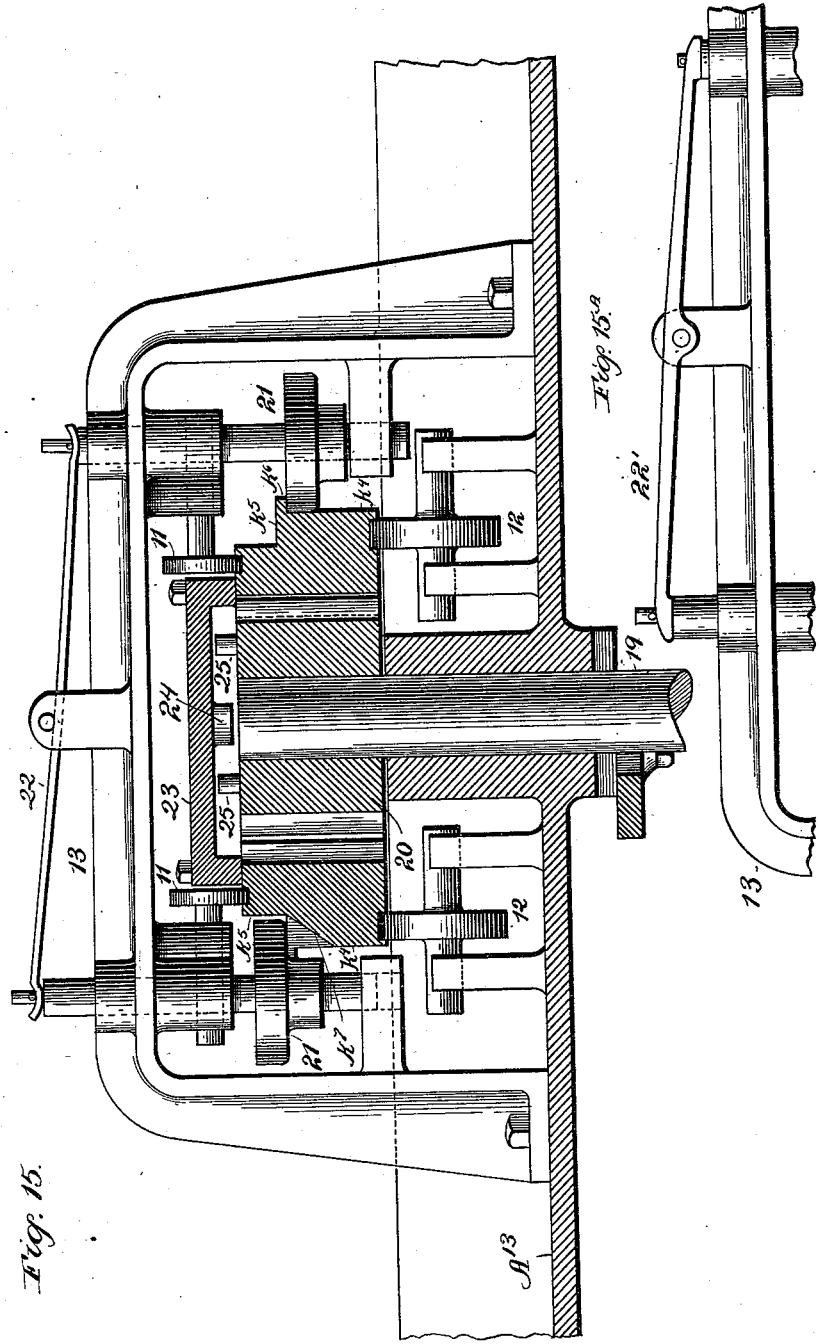
Witnesses
Victor J. Evans
O. F. Braithwayes
Inventor
Lewis B. McDonald.
by E. M. Walker & Sons
Attorneys

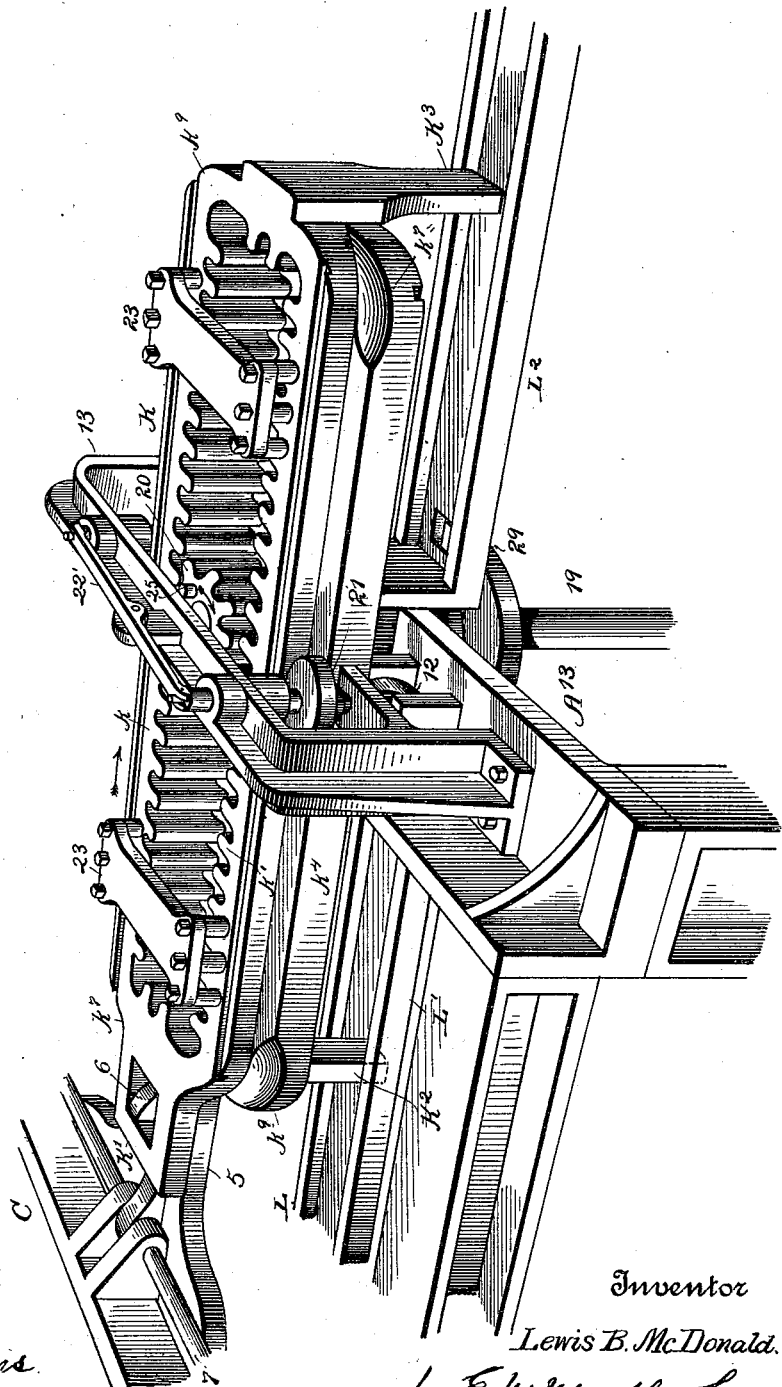

(No Model.)
25 Sheets—Sheet 15.

L. B. McDONALD.
PRESS FOR BALING COTTON, &c.

No. 556,274.  Patented Mar. 10, 1896.

Witnesses
Victor J. Evans
O. F. Braitmayer

Inventor
Lewis B. McDonald
by E. M. Marble
Attorney

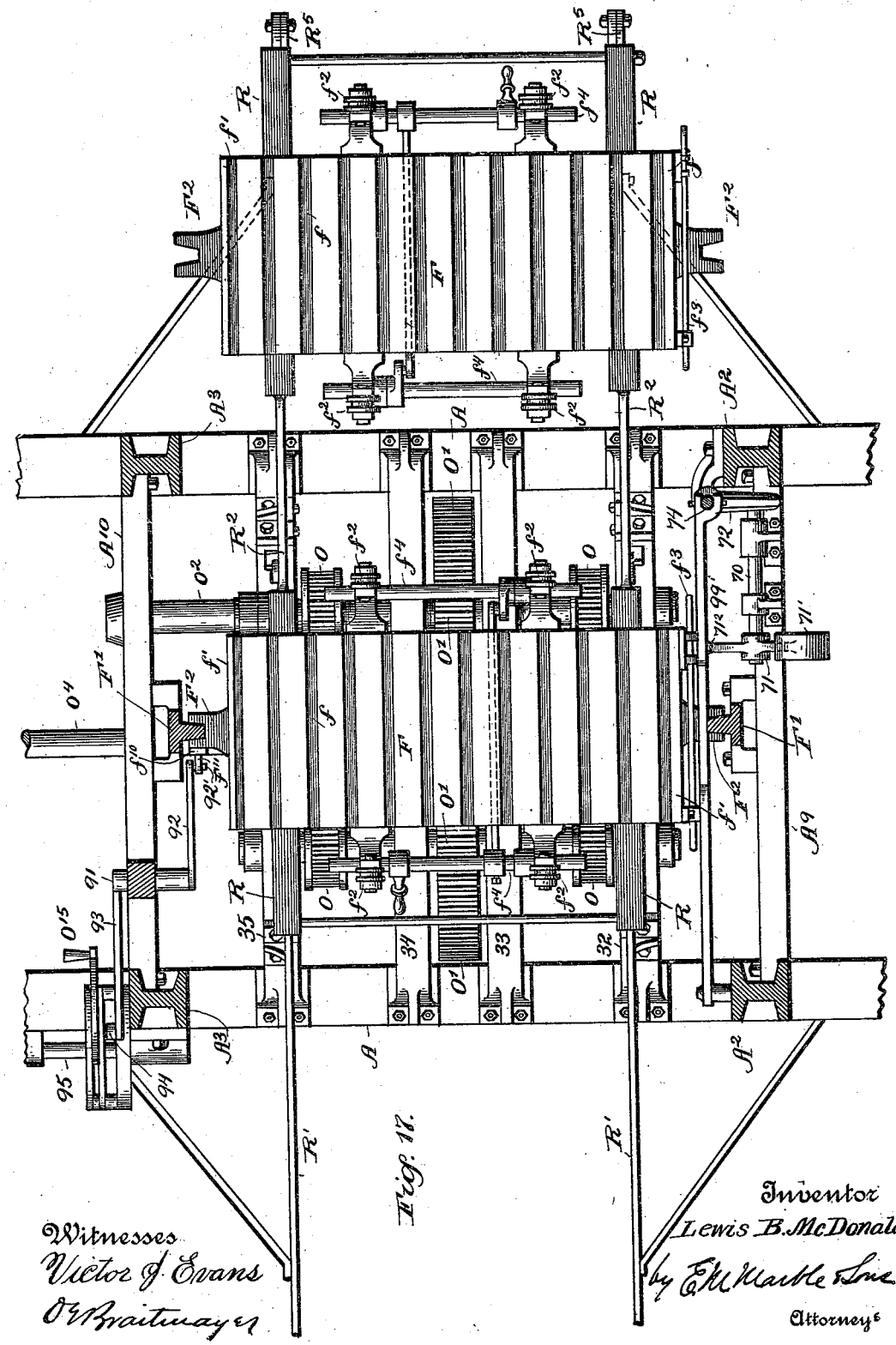

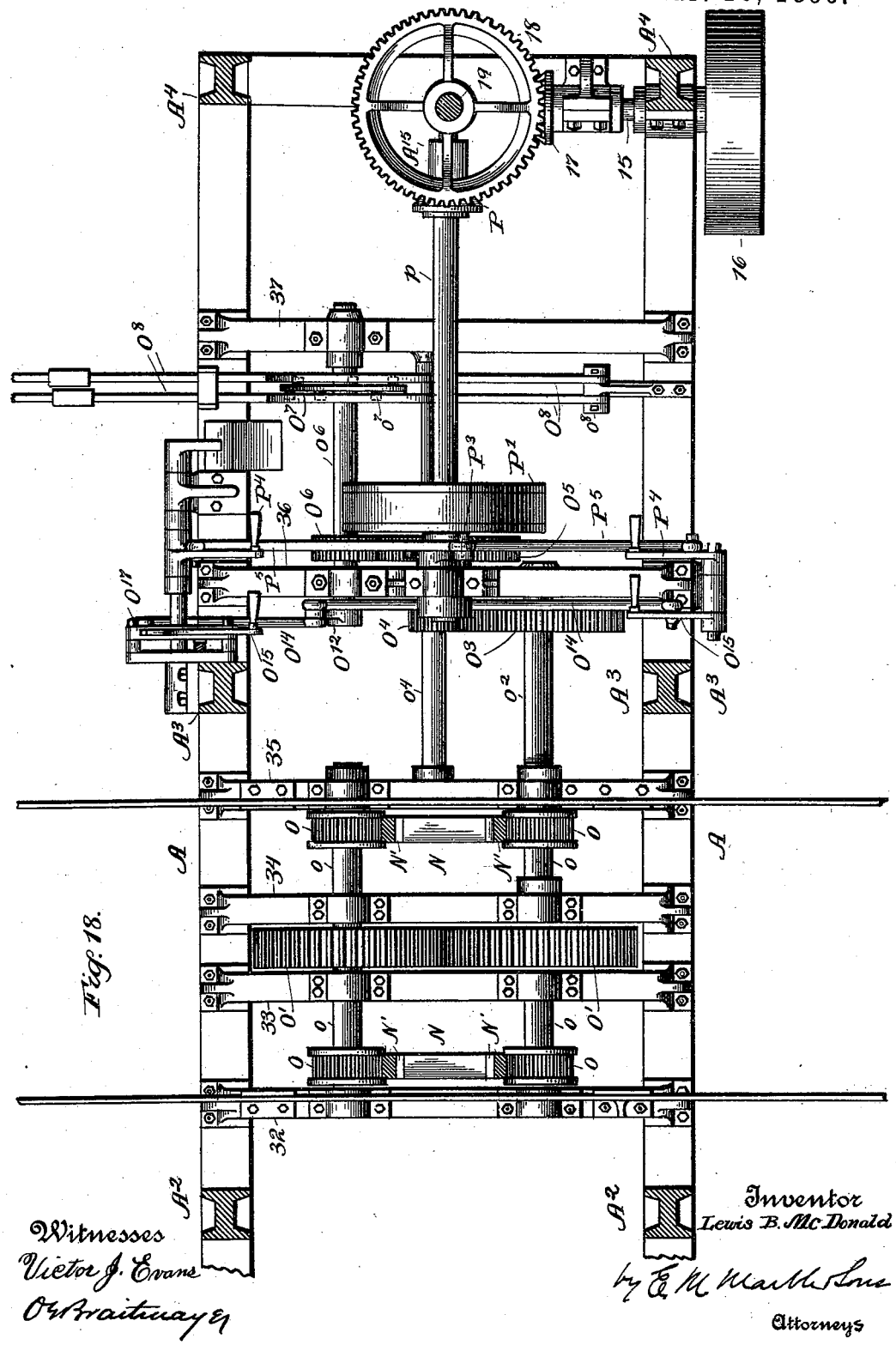

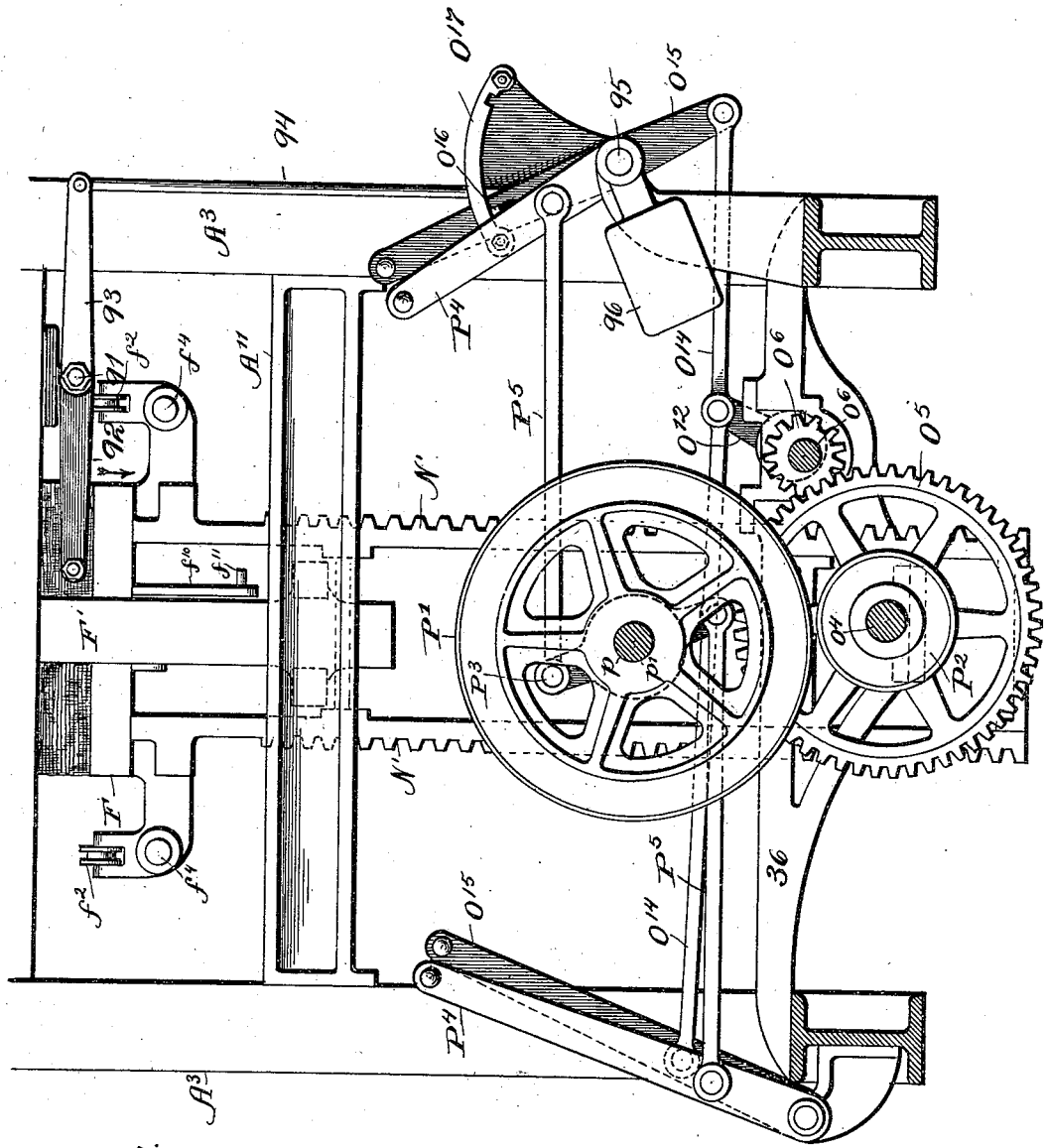

(No Model.)
L. B. McDONALD.
PRESS FOR BALING COTTON, &c.
No. 556,274. Patented Mar. 10, 1896.
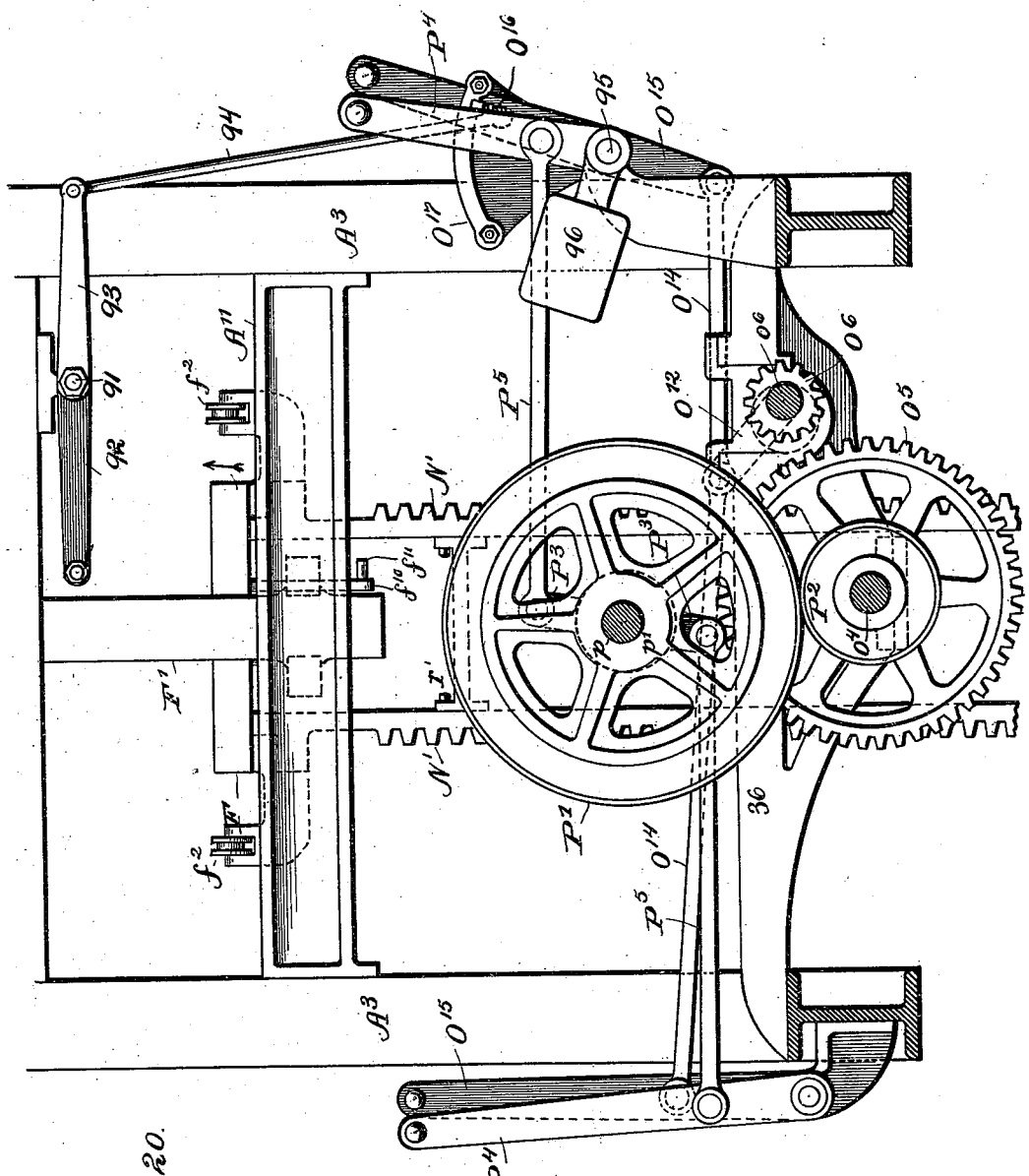

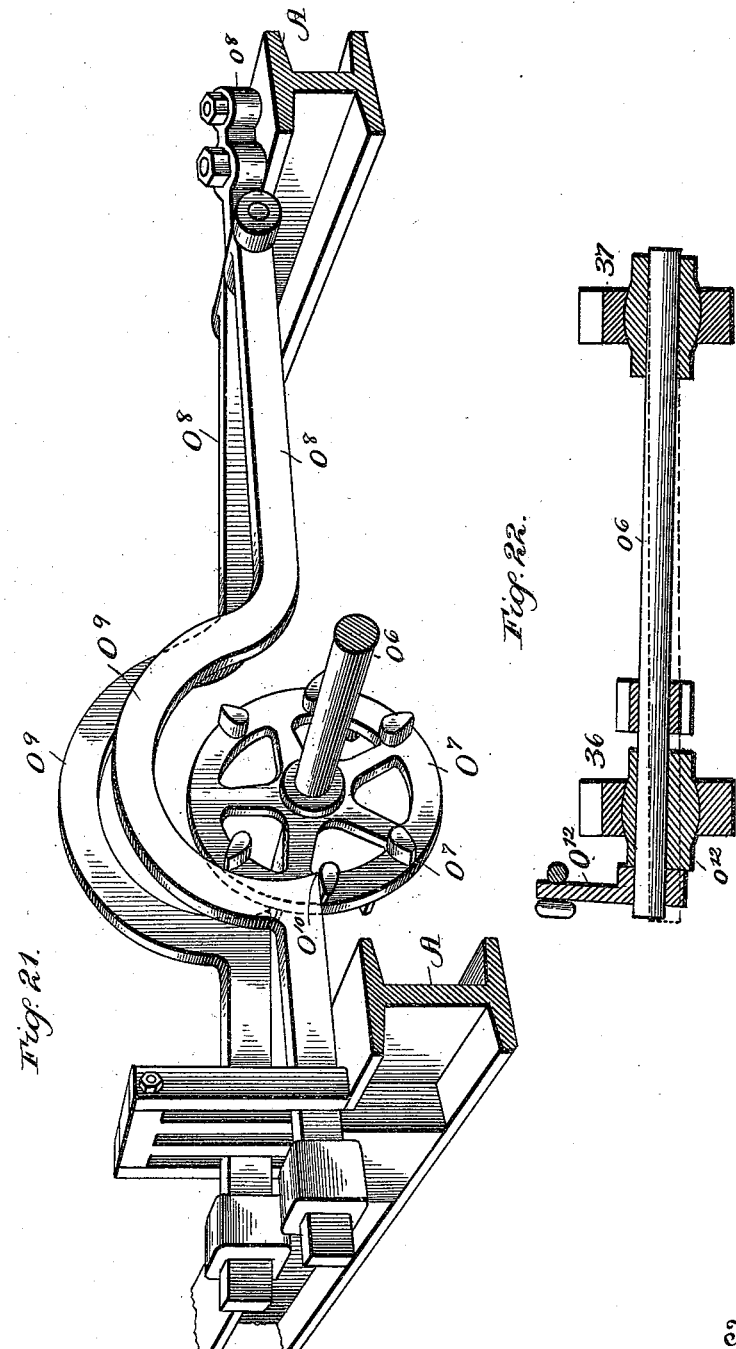

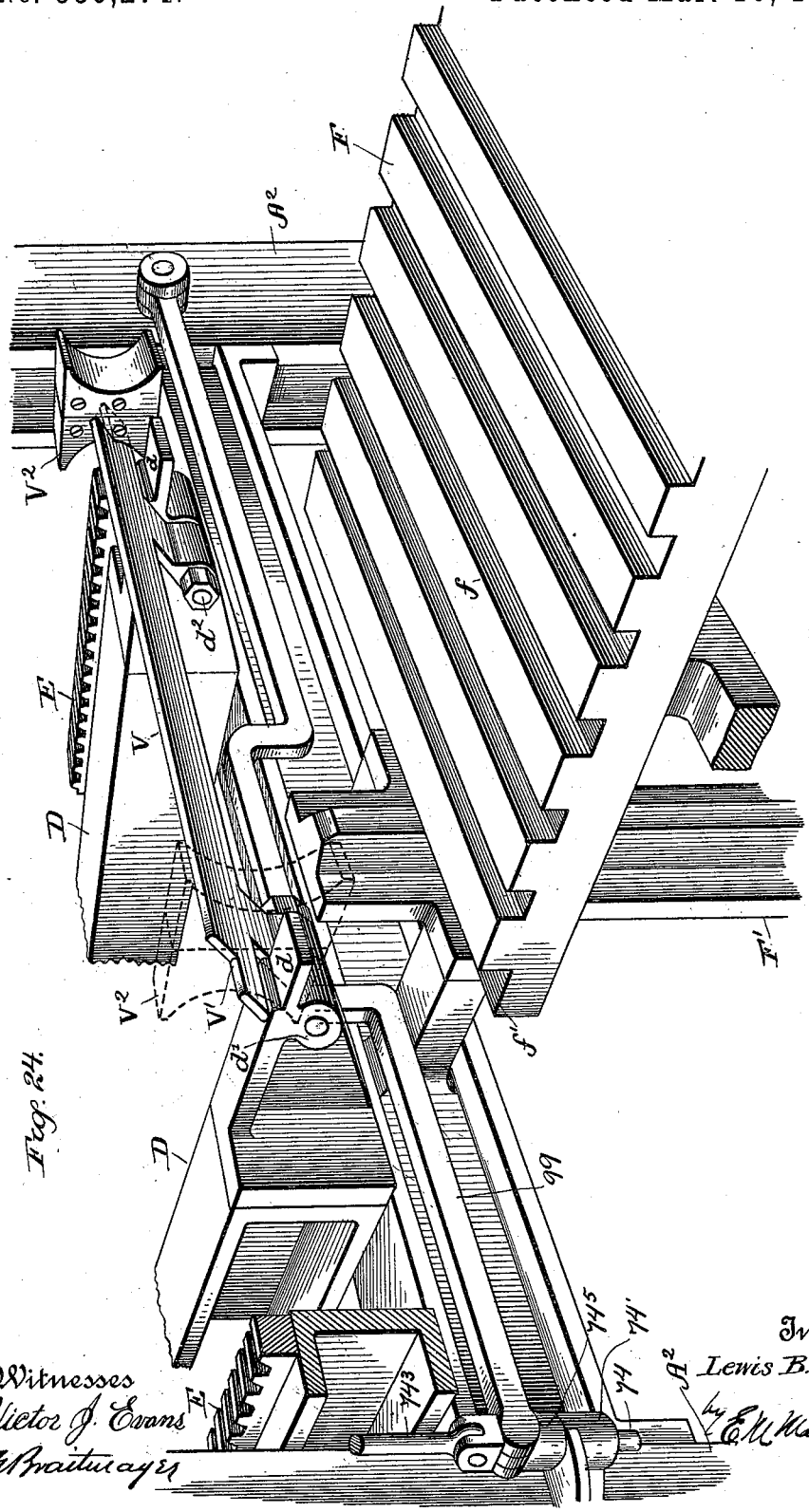

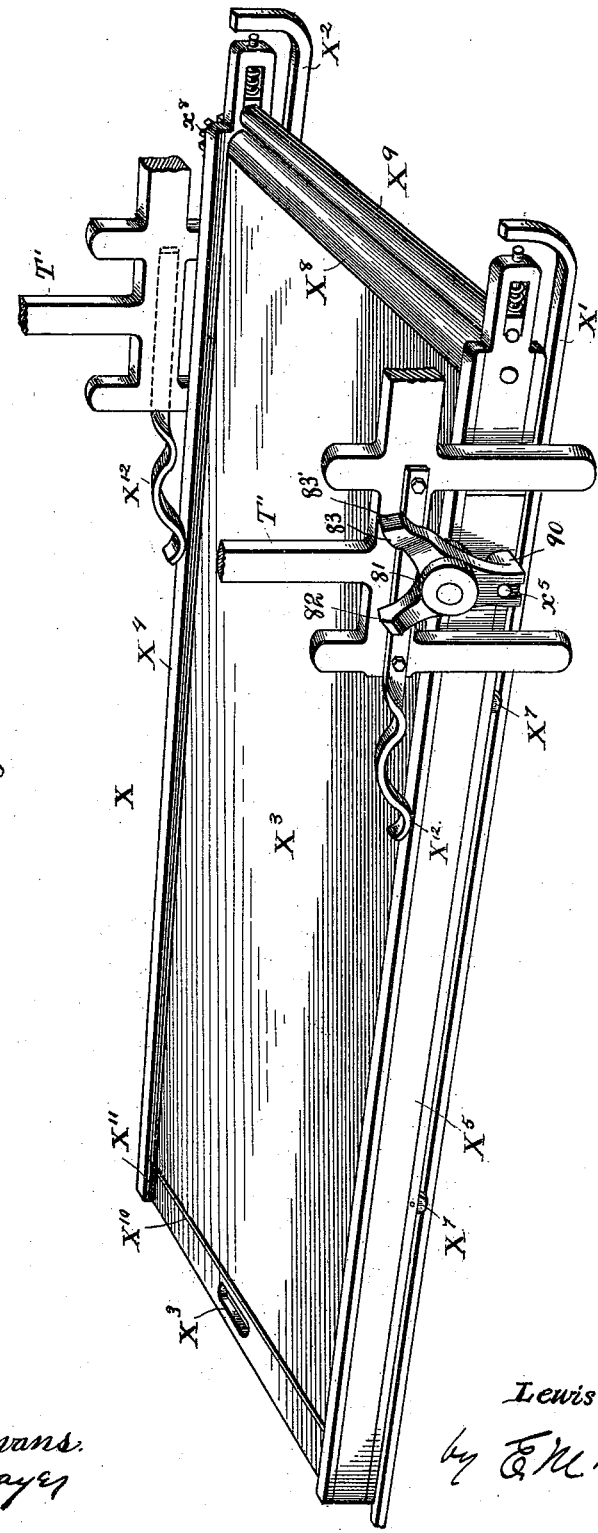

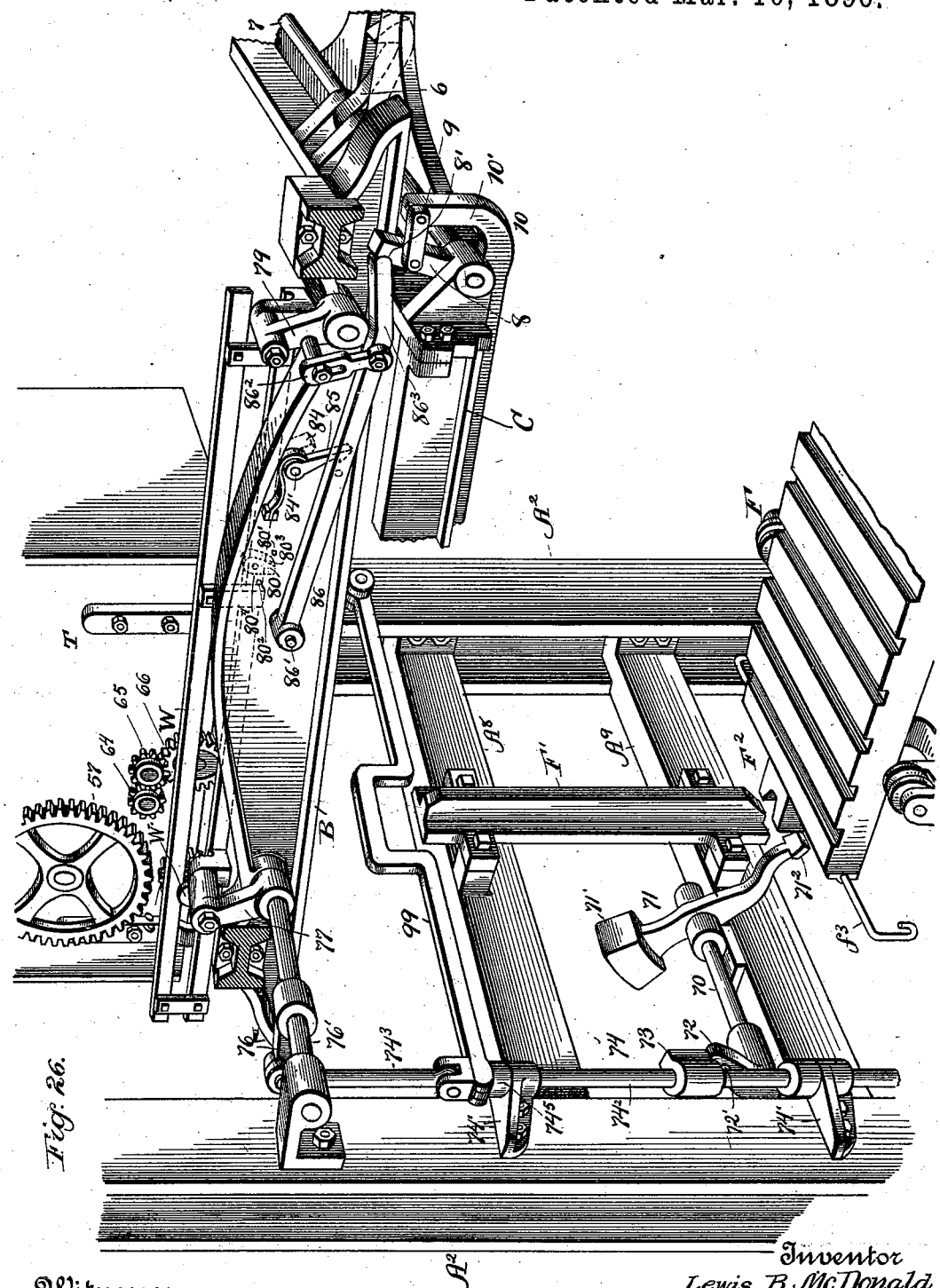

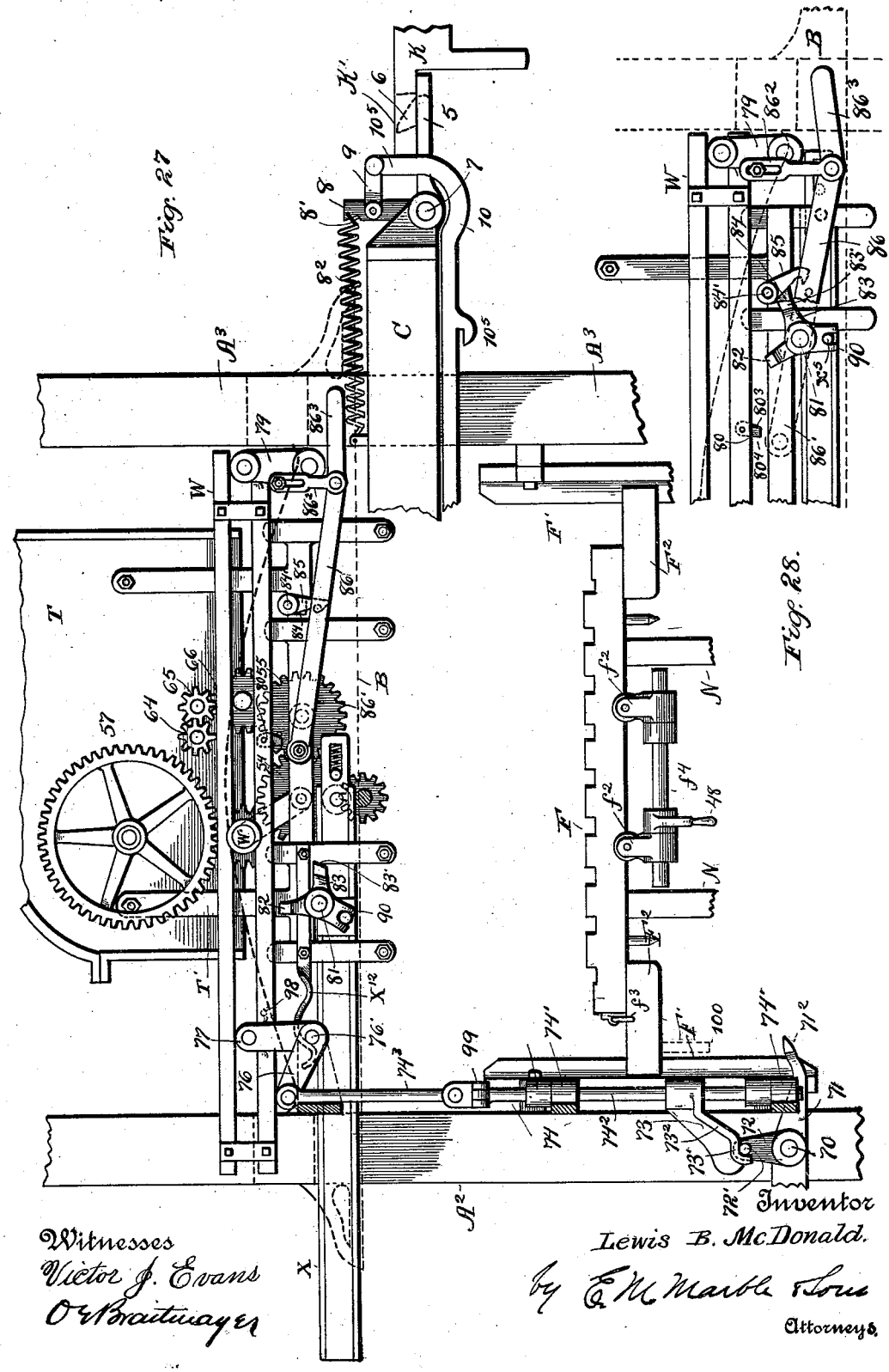

(No Model.)
L. B. McDONALD.
PRESS FOR BALING COTTON, &c.
No. 556,274.
25 Sheets—Sheet 25.
Patented Mar. 10, 1896.
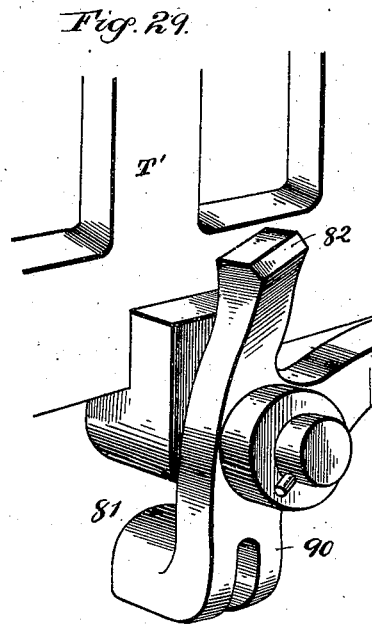
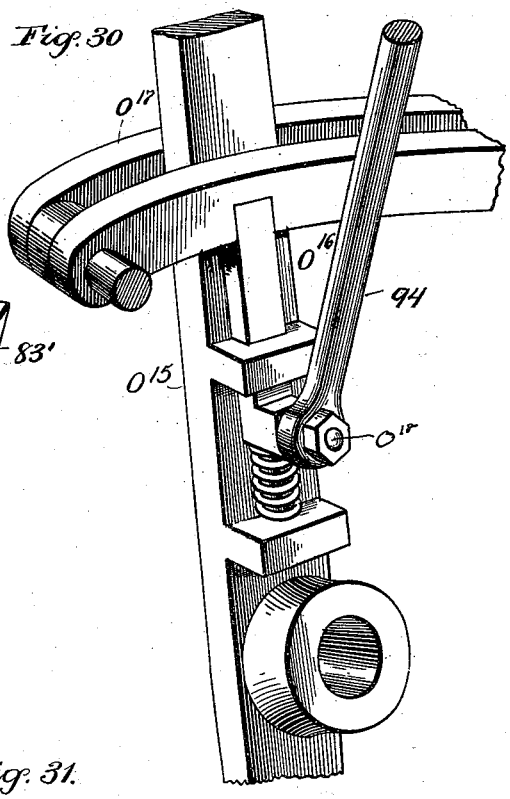
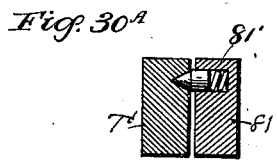
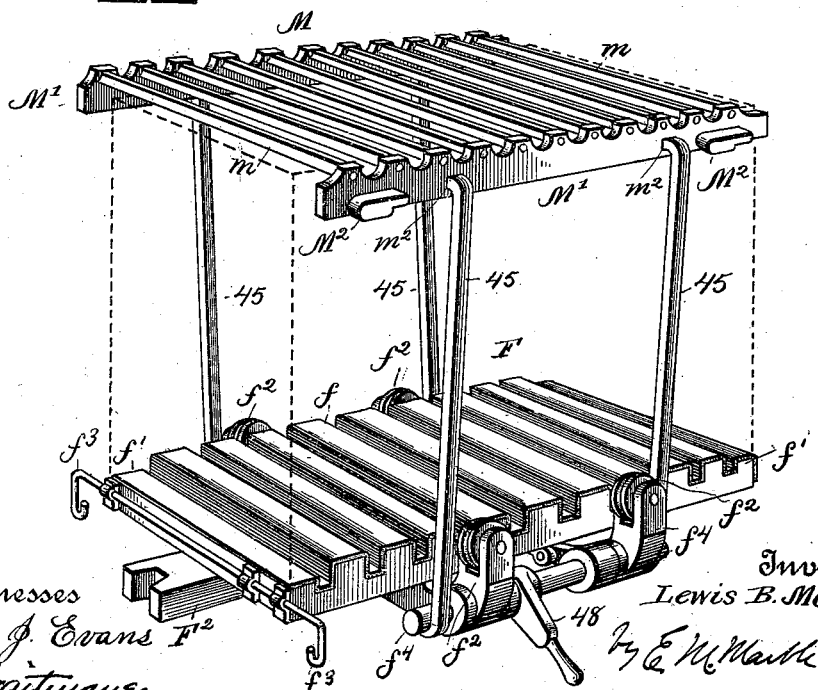
Witnesses
Victor J. Evans
O. W. Braitmayer
Inventor
Lewis B. McDonald
By E. M. Marble & Sons
Attorneys

UNITED STATES PATENT OFFICE.

LEWIS B. McDONALD, OF LITTLE ROCK, ARKANSAS, ASSIGNOR TO THE
McDONALD COTTON COMPRESS COMPANY, OF ARKANSAS.

PRESS FOR BALING COTTON, &c.

SPECIFICATION forming part of Letters Patent No. 556,274, dated March 10, 1896.

Application filed December 30, 1895. Serial No. 573,797. (No model.)

*To all whom it may concern:*

Be it known that I, LEWIS B. MCDONALD, a citizen of the United States, residing at Little Rock, in the county of Pulaski and State of Arkansas, have invented certain new and useful Improvements in Presses for Baling Cotton and other Fibrous Materials; and I do hereby declare the following to be a full, clear, and exact description of the invention, such as will enable others skilled in the art to which it appertains to make and use the same.

My invention relates to improvements in presses operated by power, and more particularly to improvements in that class thereof adapted to the baling of cotton and other fibrous materials; and it consists in the improved cotton-press whose construction and arrangement of parts will be hereinafter described, and particularly pointed out in the claims.

The objects of my invention are, first, to construct a cotton-press operated by power by the action of which cotton fed directly to the press from a cotton-gin or condenser may be formed by a single baling operation into bales suitable for ocean transportation and general commercial use; second, to construct a press for baling cotton which shall be adapted to form square bales in which a practically-frictionless movement of the reciprocating pressure-transmitter can be obtained and the operation of which shall involve so little wear of the moving parts that the press when once constructed can safely be put in the hands of an ordinary mechanic for practical and continued operation; third, to provide a press for baling cotton which shall require the expenditure of so little power for successful operation that it may be run in connection with gins without necessitating the installation of a new power-plant.

Heretofore the baling of cotton has been almost universally accomplished by the "compress" system of baling, in which the cotton has to be subjected to two distinct baling operations before a commercial bale is obtained. In the first place, the cotton is carried from the field to a point where a gin is stationed. Here it is ginned, passed through a condenser to free it from the dirt which it gathers in the fields, and then compressed into what are termed "plantation-bales." Plantation-bales contain the same amount of cotton as commercial or so-called "compress" bales; but they are much larger. The presses employed to produce them, acting, as they do, upon the cotton in bulk, are not capable of exerting sufficient power to reduce the cotton to a density which will render transportation of the bales profitable to the shipper, because the space which they occupy is so great in proportion to their weight that cars cannot be loaded to their full carrying capacity. It is therefore necessary to recompress the plantation-bales by so-called "power-compresses" to produce bales which satisfy and supply the demands of commerce. Compresses are stationed at commercial centers, where they draw from large surrounding territories. By their operation they reduce the plantation-bales to bales of such size and density as to render ocean transportation and general commercial use thereof profitable; but to accomplish this result the expenditure of a vast amount of power is necessary, and the power exerted, acting, as it does, upon the cotton in bulk, has been found to be detrimental to the fiber of the cotton, tearing the same, and thus impairing its value.

With a view of remedying these disadvantages, and especially that which lies in the loss involved in twice compressing the same cotton, methods of compressing the lint cotton in detail and of forming a bale by rolling or folding the fiber as it is compressed into a compact bale have been from time to time discussed and evolved. A system of baling which aims to produce a round bale has been developed in which the cotton fed to the press in the form of a sheet or bat is wound around a central core, pressure being applied to the cotton layer by layer as it is fed to and forms a part of the bale. The ease of applying the pressure requisite to form the bale and the theoretical ease of maintaining the cotton once compressed in a uniform state of compression have led to the construction of several presses operating upon this system. This style of presses has not met with ready introduction into the commercial world, however, for practical reasons Prominent among these lies the fact that a round bale is not advantageous to ship because of the lost space entailed in packing, and is dangerous to ship because the spaces left between the bales act as airflues to promote drafts, and thus not only increase the tendency to spontaneous combustion, which is present at all times when cotton is being shipped, but make the extinction of a fire very difficult should one gain headway. The disadvantage and danger thus presented are of a character that no shipper of cotton can neglect, and go far toward counteracting the advantage given by a system which enables the cotton to be pressed into a commercial bale at the point where the ginning of the cotton takes place and by a single operation.

In the press which I have constructed to fulfill the objects of my invention I have obviated the difficulties attendant to the compress system of baling by forming the cotton into a bale of a density which renders it suitable for general commercial use at the place where it is ginned and have avoided the dangers and disadvantages which are being met with in the round-bale system of presses by forming a square bale, which by virtue of its shape can be easily handled and packed, and which when once packed will be practically impervious to fire. I also, by reason of the small amount of power required to operate my press, am enabled to use the same in direct connection with cotton-gins without requiring the installation of a new power-plant, an advantage which will be at once appreciated.

In my press I make use of an upper fixed pressure-surface and a lower receding pressure-surface and form the bale upon the lower pressure-surface by repeatedly lapping across the same the cotton, which is fed to the press in the form of a sheet or bat, an intermediate reciprocating pressure transmitter or carriage serving not only to effect the initial compression of the cotton and the lapping of the layers of the same, but also the maintenance of the cotton once compressed in a uniform state of compression. The receding pressure-surface is formed by a follower, and in connection with the same I use escapement mechanism which permits downward movement of the follower only when the pressure upon the surface thereof exceeds a predetermined amount, and then by a step-by-step movement.

The principal difficulty which I have had to overcome in my press has been the excessive friction and consequent loss of power which would commonly attend the movement of the reciprocating pressure-transmitter. In accomplishing this result I have made use of an entirely new principle in obtaining the desired frictionless movement of the moving pressure-transmitter, which I will now explain.

When a revoluble body is moved between two pressure-surfaces, (the conditions met with by pressure-rollers operating between an upper pressure-beam and a lower pressure-surface formed by the follower with superposed layers of cotton thereupon,) the revoluble body rolls on one of the pressure-surfaces and slides on the other. If the pressure exerted by the pressure-surfaces be at all considerable, a great amount of friction is caused by the movement of the revoluble body, and if the pressure exerted by the pressure-surfaces is equal to that necessary to be attained in order to compress a fiber possessing the resiliency that cotton fiber possesses the friction becomes so great that movement of the body becomes almost impossible. On the other hand, if a second revoluble body be placed above the first and between the two pressure-surfaces, the centers of the two revoluble bodies being in a line normal to the pressure-surfaces, or, otherwise stated, in a line drawn between the points of contact of the revoluble bodies with the pressure-surfaces, the two revoluble bodies will roll on themselves, and each will roll on the pressure-surface with which its periphery comes in contact. The movement of the bodies will now be frictionless, as the contacts are all rolling contacts, if the following conditions are observed: first, if the centers of the two revoluble bodies be kept perfectly in line—that is to say, in a line perpendicular to the pressure-surfaces; second, if the revoluble bodies be perfectly round, and, third, if the pressure applied does not exceed the elastic limit of the material of which the bodies are composed. This is true, independent of the amount of pressure applied, with the exception just noted. Applying this principle to the construction of a cotton-press, I form the moving pressure-surface of a series of pressure-rolls each of which has resting upon its upper surface an antifriction-roll, held in the desired position by a suitable frame. These rolls move between pressure-surfaces formed by the follower with the superposed layers of cotton thereon and pressure-beams which are supported and held in position over the follower by the machine-frame. The opening through which the cotton is fed is central of the pressure-rollers and is caused by increasing the space between the pressure-rollers at this point. Independent feed-rolls are used to insure the feed of the cotton into the press, and these are so actuated by gearing connection with the pressure-rolls that they move in the same direction independent of the direction of movement of the pressure-rolls and the carriage in which the same are journaled.

I am thus enabled to reciprocate the moving pressure-transmitter over the bale of cotton being formed with the exertion of an almost inappreciable amount of power and to maintain the cotton once formed on the bale in a compressed state without the exertion of any power. As the downward movement of the follower is caused solely by the cotton forming the bale and is regulated by the gradually-increasing thickness of the bale, taking place slowly and by a step-by-step movement, so as not to appreciably alter the pressure upon the cotton during the entire operation of the press, it results that no external power is required to be exerted to actuate the mechanism which controls the movement of the follower. Two of the operations which would otherwise require the exertion of a great amount of power—viz., the maintaining of the cotton once compressed in a compressed state and the movement of the follower—I thus accomplish without the exertion of any external power, or at least without the exertion of any appreciable power.

In order that the cotton may be fed the desired distance across the surface of the follower without intermitting at any time the pressure exerted upon the surface of the cotton already held in a state of compression, it is necessary that the carriage in which the pressure-rollers are journaled be of a length much greater than that of the follower, so that pressure-rolls may constantly be in position under the pressure-beams over the cotton, whatever the position of movement of the feed-opening.

It is further necessary to provide track-sections on either side of the space occupied by the follower in order to support those pressure-rollers which are for the moment idle or not between the pressure-surfaces and to provide means for keeping the idle pressure-rollers constantly rotating, so that their action may be uniform when they come into active operation between the two pressure-surfaces.

Other features of my invention involved in the structure and operation of the various parts of my machine, such as the mechanism for reciprocating the pressure-rolls and the operative carriage in which the same are mounted, the escapement mechanism for controlling the movement of the follower, the means used for providing a uniform feed of cotton to the machine, (an absolute necessity,) the folder for folding the ends of the layers of cotton even, so that a perfect bale may be formed, the mechanism for feeding the bagging over the top surface of the bale into position when the bale is completely formed and the trip mechanism for properly timing the operation of the various mechanisms of the press, for permitting the removal of the finished bale from the press and for operating the same, so that it will be in readiness for the formation of another bale, will be hereinafter described, but mention thereof is deferred until the detailed consideration of the same is reached, as they require too close consideration to render a general statement profitable.

My invention is fully illustrated in the drawings which accompany and form a part of this application, in which the same reference letters and numerals refer to the same or corresponding parts, and in which—

Figure 2:
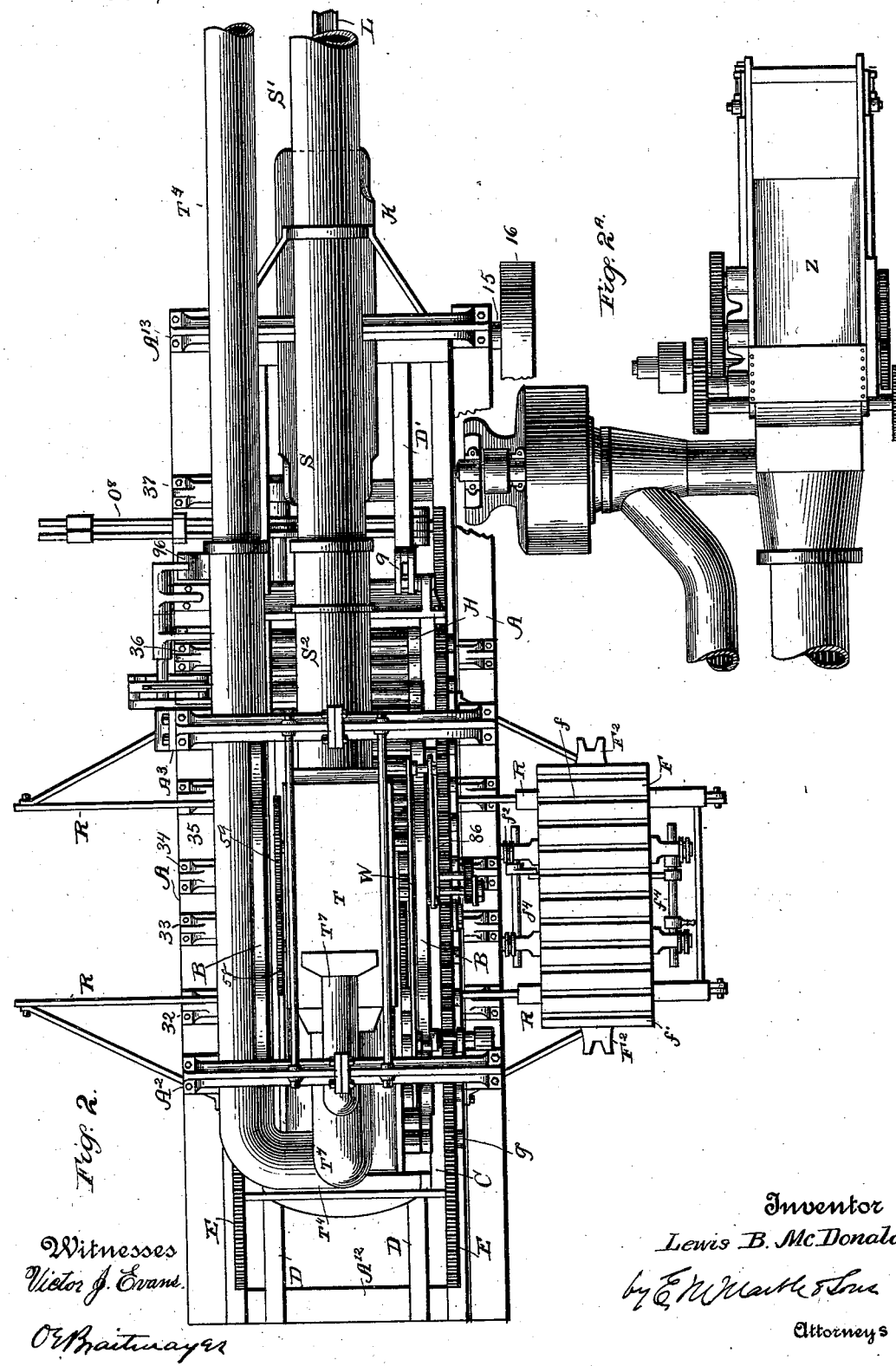
Figure 3:
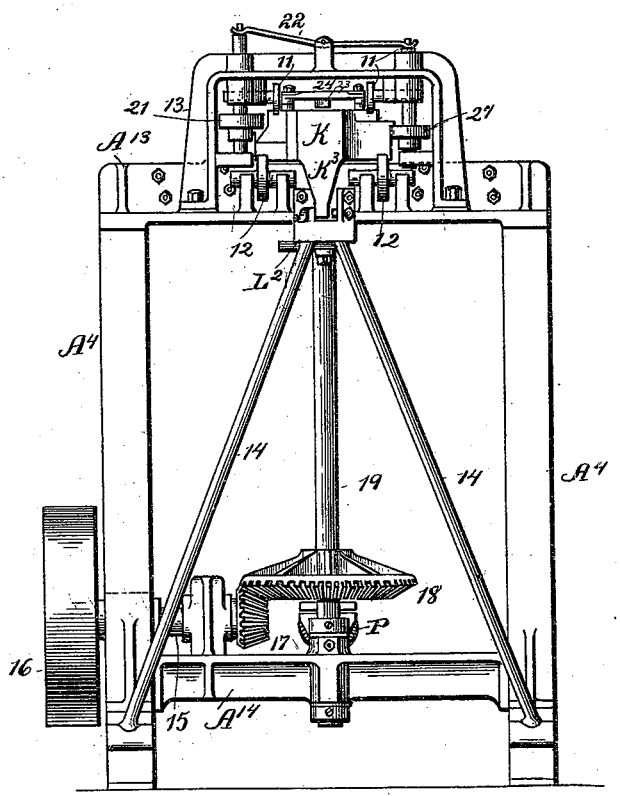
Figure 4:
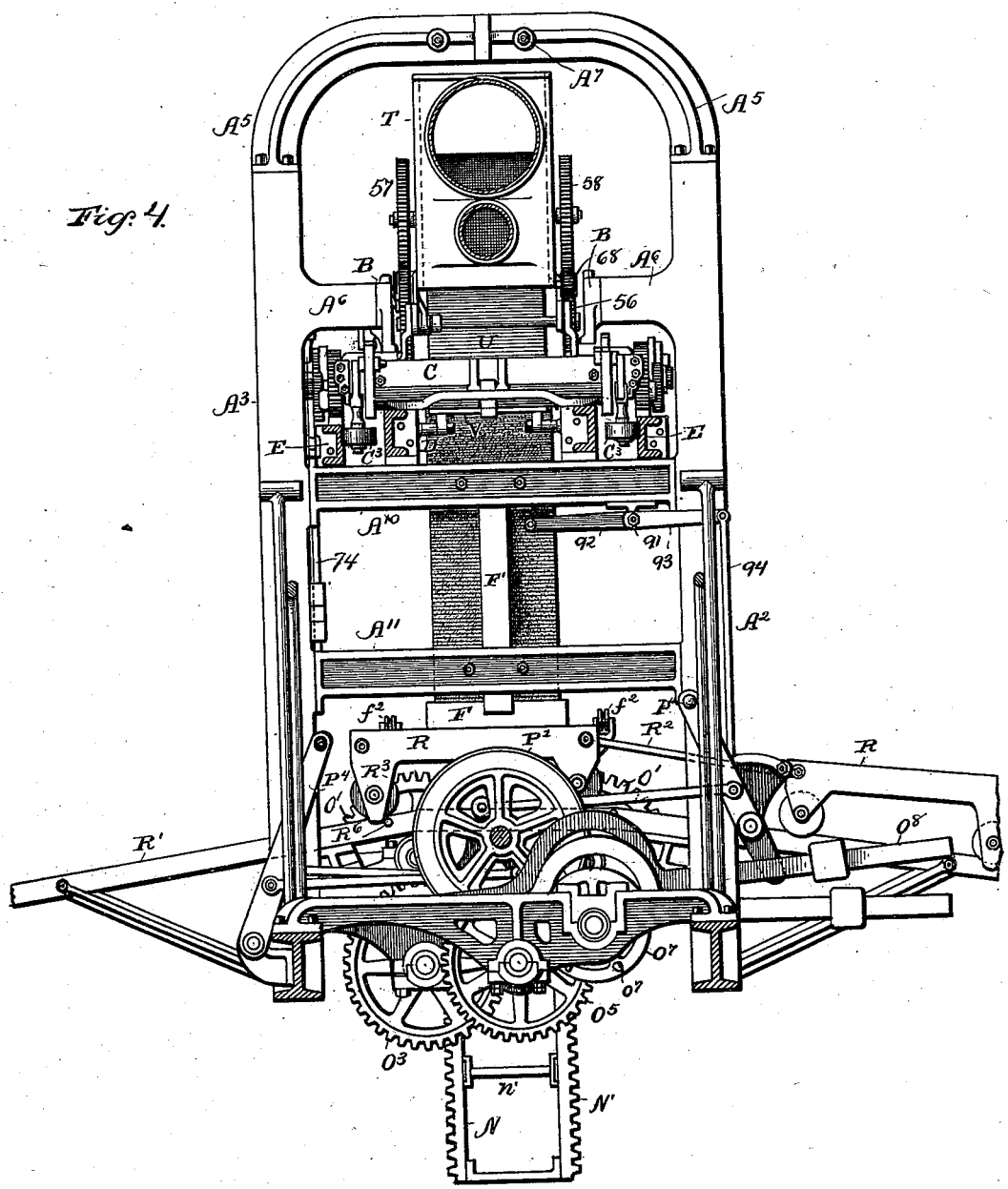
Figure 5:
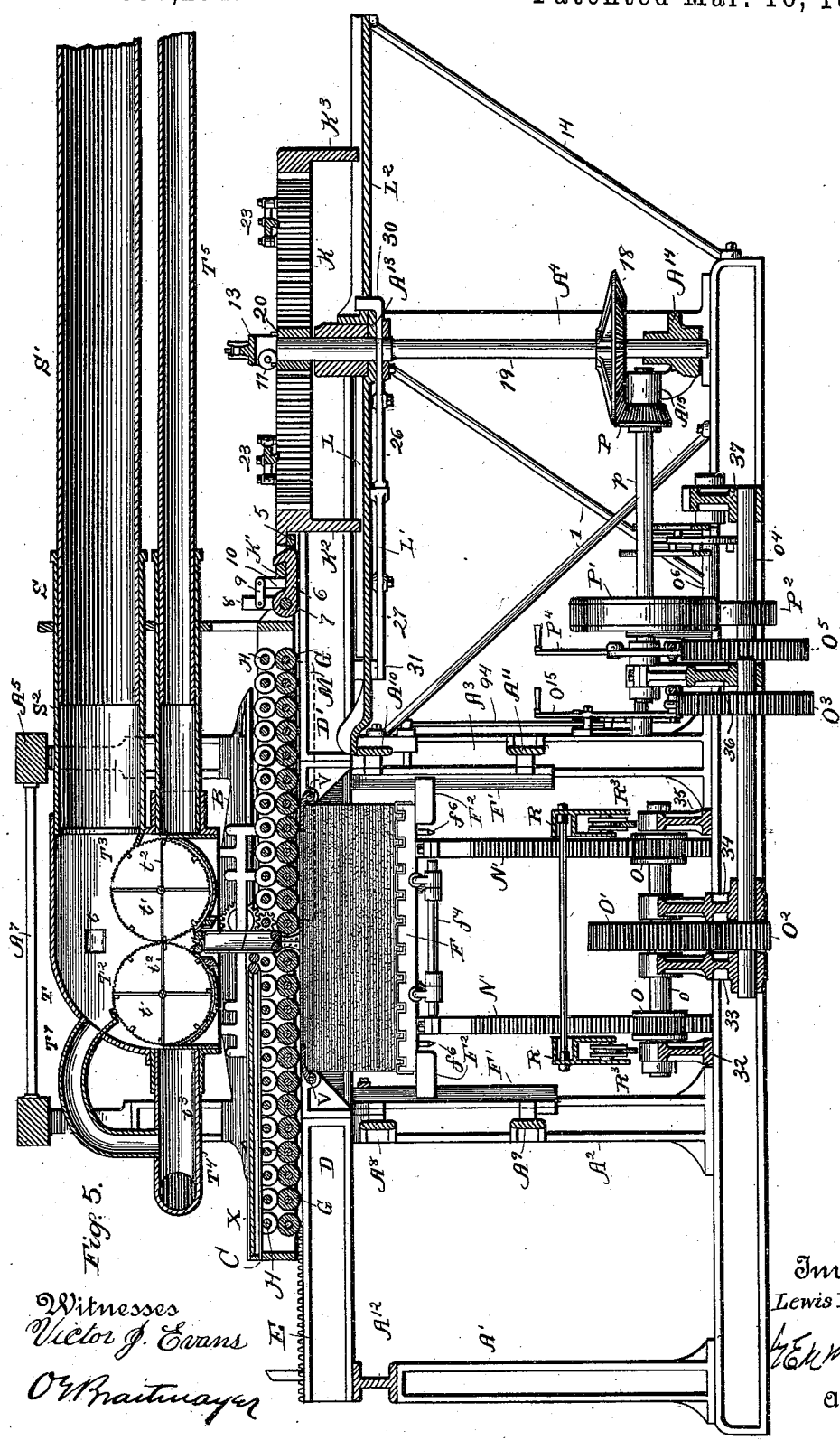
Figure 6:
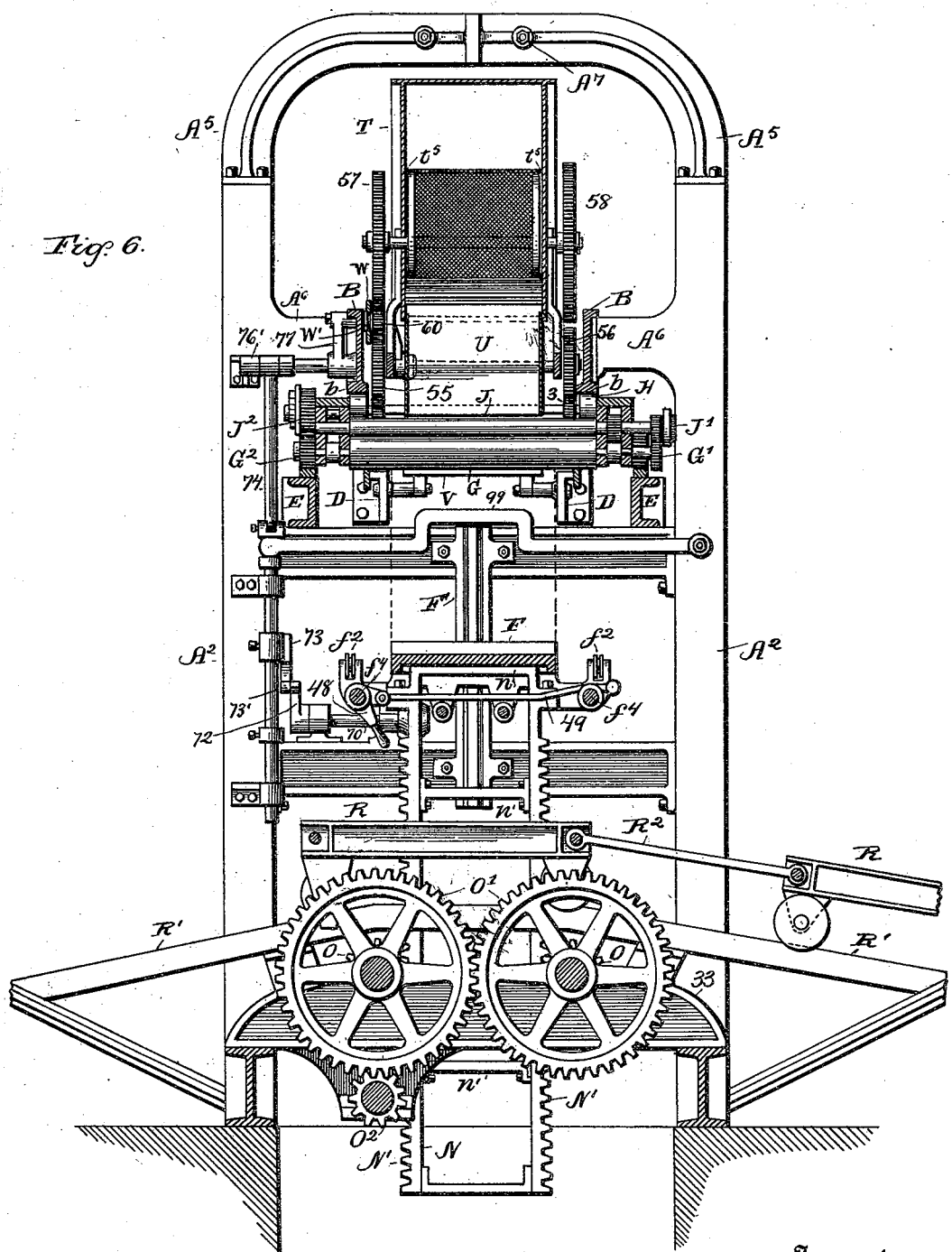
Figure 7:
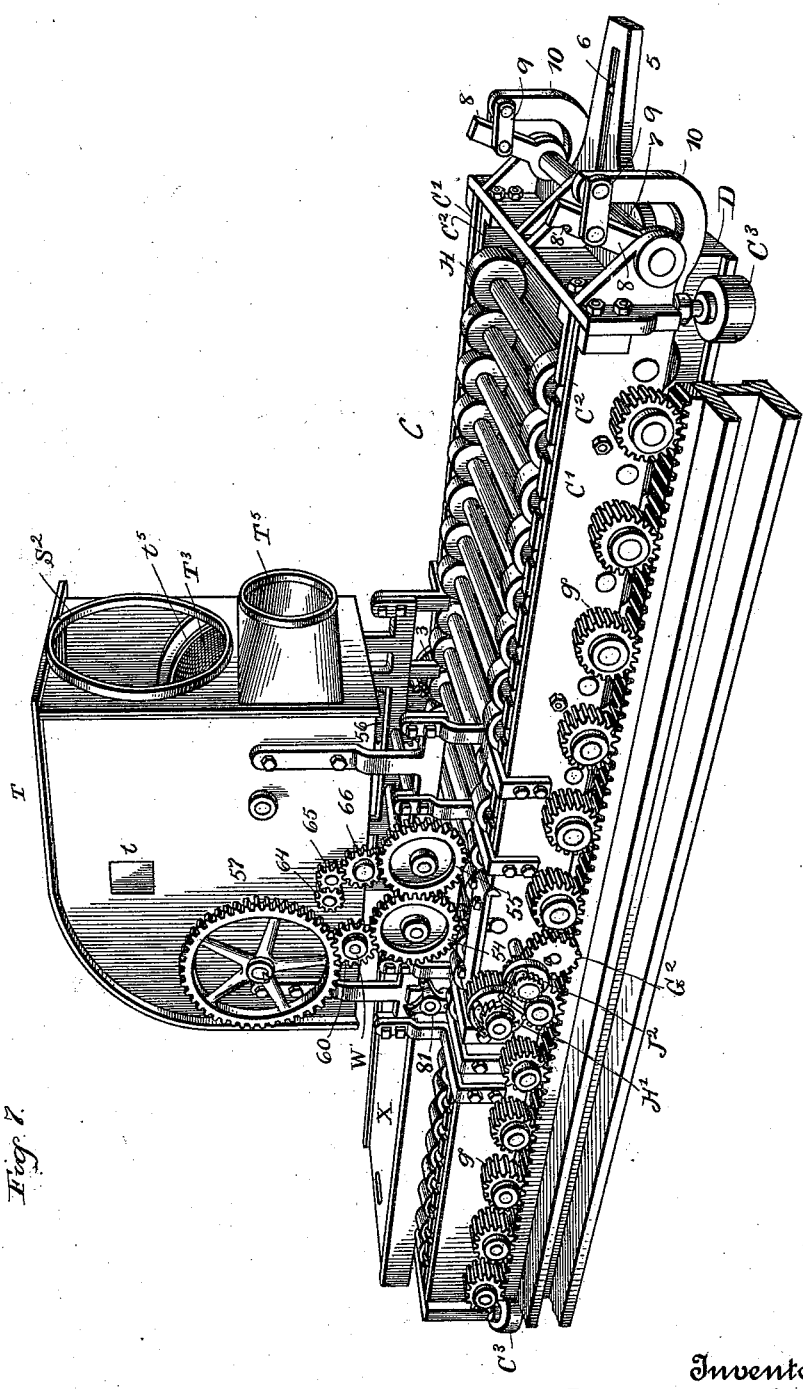
Figure 16:
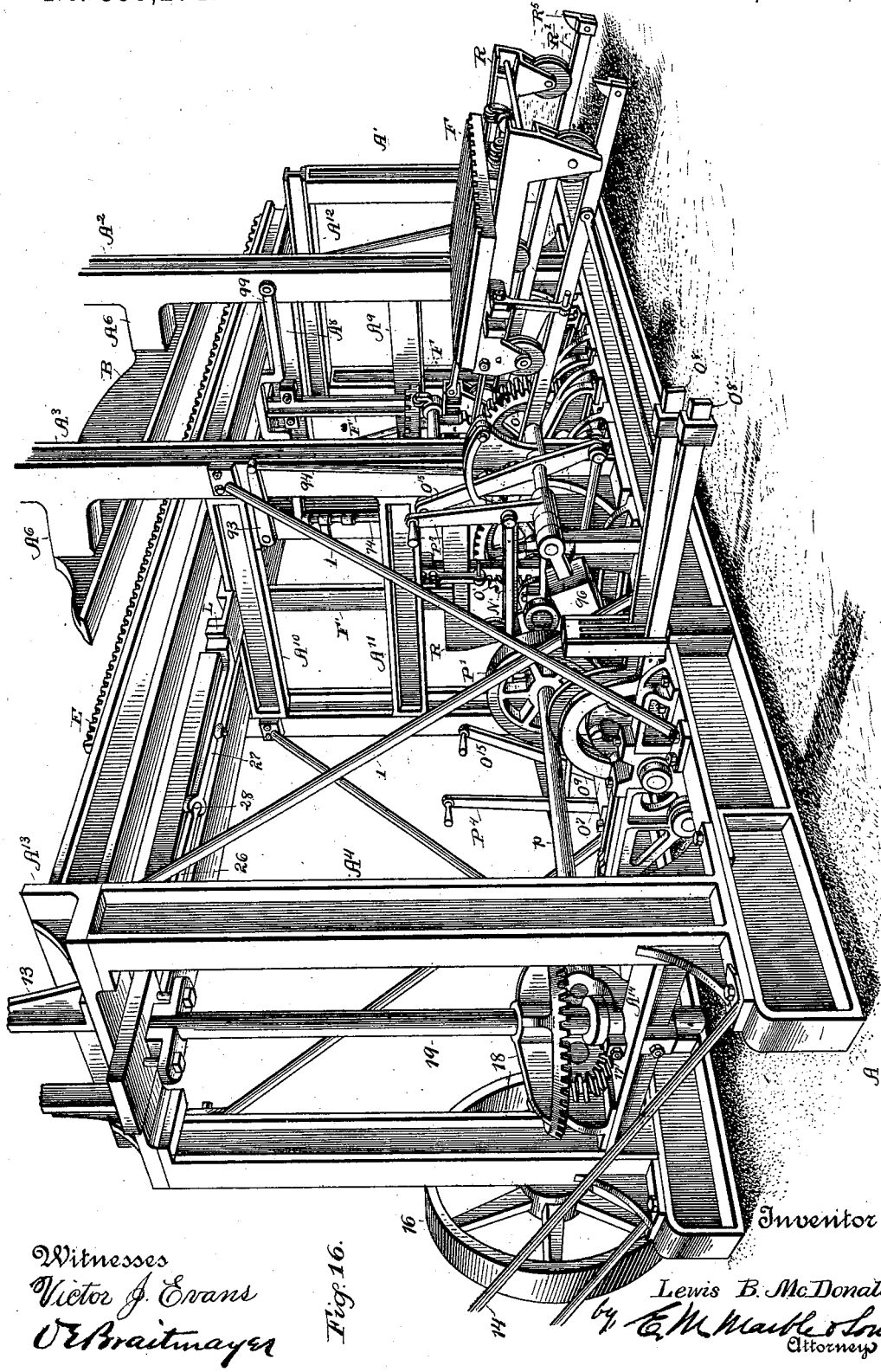

Figure 1 is a side elevation of my press, a bale being represented in the process of formation. Fig. 2 is a top plan view of the machine. Fig. 2$^a$ is a top plan view of a picker which I use to feed the cotton to the machine. Fig. 3 is an end view of the primary power mechanism and of the reciprocator. Fig. 4 is a view taken on the line 4 4, Fig. 1, looking in the direction of the arrow, and presents an end elevation of the escapement mechanism, the carriage in which the pressure-rollers are journaled, the condenser, and the parts connected therewith. Fig. 5 is a central longitudinal section of my machine. Fig. 6 is a transverse section of my machine, taken on the line 6 6, Fig. 1. Fig. 7 is a perspective view of the carriage in which the pressure-rollers are journaled, the condenser and the bagging-carrier being shown in place thereupon. Fig. 8 is a top plan view of the carriage in which the pressure-rollers are journaled, the condenser and the bagging-carrier being removed therefrom. Fig. 9 is a central longitudinal section of the condenser, showing also the feeder-flume, a portion of the pressure-rollers which are journaled in the operative carriage, and the folders which serve to fold the ends of the bale even. Fig. 10 is a side view of the operative carriage, the outer frame of the same being removed, showing also one of the pressure-beams and one of the rack-beams. Fig. 11 is a perspective view of the reciprocator. Fig. 12 is a perspective view of the levers which operate in connection therewith. Fig. 13 is a plan view of the reciprocator and operating-pinion, showing the parts in the position they assume immediately before a throw of the reciprocator. Fig. 14 is a similar view showing the parts in the position they assume immediately after the throw of the reciprocator has taken place. Fig. 15 is an enlarged section of Fig. 14, taken on the line 15 15. Fig. 15$^a$ is a side view of the rocking lever used in a modified construction to control the operation of the guiding-disks shown in Fig. 15. Fig. 15$^b$ is a perspective view of a modified form of reciprocator in connection with which such rocking lever is employed. Fig. 16 is a perspective view of the follower and the escapement mechanism. Fig. 17 is a top plan view of the center portion of the machine, showing the follower and the parts directly in connection therewith. Fig. 18 is a top plan view of the escapement mechanism, taken on the line 18 18, Fig. 1. Fig. 19 is a detail view of the escapement-pinion, the gear-wheel with which such pinion engages, the friction-disks, and the parts directly in connection therewith, the escapement-pinion being shown in engagement with the gear-wheel. Fig. 20 is a similar view, the escapement-pinion being shown out of engagement and the friction-disks being shown in engagement. Fig. 21 is a detail perspective view of the escapement-wheel and the escapement-levers. Fig. 22 is a detail sectional view of the escapement-shaft, showing the ball-bearings thereof. Fig. 23, Sheet 10, is a detail view of the grating. Fig. 24 is a detail perspective view of the folder and the parts directly in connection therewith. Fig. 25 is a detail perspective view of the bagging-carrier. Fig. 26 is a perspective view of the trip mechanisms of the machine. Fig. 27 is a side view of the trip mechanisms of the machine, the pressure-beam being shown in dotted lines. Fig. 28 is a detail view illustrating the trigger 81 in the act of throwing out of engagement the spring-pressed trigger which normally holds the push-bar in its upper position. Fig. 29 is a detail perspective view of the trigger 81 which operates the bagging-carrier. Fig. 30 is a detail perspective view of the spring-pressed pawl which holds the escapement mechanism out of gear. Fig. 30ª is a detail sectional view illustrating the spring-pressed head which holds the trigger 81 in its several positions. Fig. 31 is a perspective view showing the follower and the grating in the position in which they are held after a bale has been formed and removed from the press, the bale itself being shown in dotted lines.

I have stated that in my machine a moving pressure-transmitter is employed which reciprocates relative to the follower on which the bale of cotton is formed; that the bale is formed on the follower by repeated lappings of the bat of fiber as it is fed into the press by feed-rolls stationed centrally on the reciprocating pressure-transmitter; that the follower is arranged to recede with a step-by-step movement as the bale is formed thereon in accordance with the thickness of the layers of cotton upon its surface, this action taking place automatically and being caused solely by the pressure exerted by the cotton, and that the upper pressure-surface is formed by fixed pressure-beams, between which and the surface of the bale being formed reciprocates the moving pressure-transmitter, which acts to lay the bat of fiber as it is fed to the bale across the surface of the follower in layers of uniform length, and to keep the fiber once compressed in a uniform state of compression, and which is formed of a series of pressure-rolls and a series of antifriction-rolls, such rolls being so journaled in a suitable carriage that when under the pressure-surfaces the centers of the rolls of the respective series will lie in lines normal to the pressure-surfaces.

In the detailed description of the machine which now follows the mechanisms thereof and the operation of the press as a whole will be considered in detail in the following order:

I. Machine-frame and beams, constituting the upper pressure-surface.

II. Pressure-rollers constituting the moving pressure-transmitter and carriage thereof.

III. Actuating mechanism for operative carriage.

IV. Follower, constituting the lower pressure-surface, and escapement mechanism connected therewith.

V. Condenser and operative mechanism thereof.

VI. Folder.

VII. Bagging-carrier.

VIII. Trip mechanism.

IX. The operation of the machine.

I. *Machine Frame and Beams, Constituting the Upper Pressure-Surface.*

The function of the machine-frame is to support the pressure-beams which form the upper pressure-surface, upon which the pressure-rolls move when in active operation; to furnish guideways for the movement of the receding follower; to bear the strain of the baling operation; to support the sectional tracks, upon which move the idle pressure-rollers or those not in active operation between the pressure-surfaces; to support the rack-bars which cause the idle pressure-rollers to constantly rotate, and to support the power mechanism of the machine.

The press may be said to be divided by the character of the functions performed thereby into three portions, viz: a central portion, in which the active work of the press—*i. e.*, the formation of the bale and the consequent downward movement of the follower—takes place, and end portions, which accommodate the necessary movement or travel of the reciprocating carriage, in which are journaled the pressure-rollers, which constitute a continuous-moving pressure-transmitter and which support and provide for the action of the power mechanism for operating the press, such power mechanism being stationed entirely in one end of the machine, which may be termed as a consequence the "power" end of the machine. This division in the activities of the various portions of the press is represented in the grouping of the parts thereof upon the bed-sills of the same and is marked by the divisions formed by the columns which are bolted to the bed-sills, the central portion of the press being that between the two main central columns and the end portions of the press being those on either side of the main columns and between the same and the end columns.

The machine-frame itself may be divided into two parts or divisions—first, the portion thereof which supports the track-sections and pressure-beams, and, second, the portion thereof which supports the power mechanism of the machine. Both of these portions rest upon and are connected to the two parallel bed-sills A, which extend the entire length of the machine and constitute the base of support for all the parts thereof. It will be convenient, however, to at this time only consider the first-named portion of the machine-frame—viz., that which supports the track-sections and the pressure-beams.

In order to arrive at a complete comprehension of the press and of the necessities which have dictated the construction and formation of certain parts thereof, and especially the portion of the machine now under consideration, it must be understood that the track upon which moves the carriage in which the pressure-rollers are journaled is divided into three portions, this division being rendered necessary by the length of the carriage and by the character of the movement given thereto. The reason therefor is as follows: It is necessary in order to complete the formation of a bale that the cotton constituting the same be constantly under pressure, and to accomplish this end when the carriage in which the rollers constituting the moving pressure-transmitting surface are journaled is in constant motion across the bale of cotton being formed, and when the feed-opening for the cotton is centrally located on such carriage it is further necessary that the carriage be much longer than the length of the bale being formed. As a further consequence of this movement a track must be provided at both ends of the machine for that portion of the reciprocating carriage supporting the pressure-rolls not between the pressure-surfaces. In the bale-forming portion of the machine it is not necessary to form tracks to support the pressure-rollers, as at this point the pressure-rolls move between an upper pressure-surface formed by the pressure-beams, to be hereinafter described, and a lower pressure-surface formed by the follower itself, or the layers of cotton thereupon.

In the end portions of the machine, where the use of tracks for the pressure-rolls not between the pressure-surfaces is imperative, it is not necessary to form an upper track for the pressure-rollers, as they are not at these points in operation and are not required to exert any pressure, but only necessary to provide a lower track to support the weight of the pressure-rollers and to keep them in position for their active movement.

From the bed-sills A rise four pairs of columns, the end columns A' and A⁴ and the main or central columns A² and A³. The main columns A² and A³ are bolted to the bed-sills at equal distances from the center thereof, and are connected across the machine at the top by curved top plates A⁵ in order to prevent spreading of the same from the lateral strain to which they are subjected. They are further cross-connected by tie-rods A⁷. Near the upper ends the main columns are formed with inwardly-projecting lugs A⁶, (see Fig. 6,) which are provided with square ends and to which are bolted the pressure-beams B. These beams constitute the upper pressure-surface for the pressure-rolls during the baling operation, and it is necessary not only that they lie perfectly even and that their under surfaces be planed accurately smooth, but that they be secured to the inwardly-projecting lugs in such a manner as to prevent any movement of the same. For this purpose they are formed on one side with projecting shoulders $b$, which fit against the square end of the lugs and enable the parts to be securely bolted together. The length of the pressure-beams, as shown in Fig. 5, is such that they extend a little beyond the main central columns on either side of the same, so that the pressure-rolls will already be under their influence when they begin their active operation.

The pressure-beams are placed a little inside the sides of the machine-frame in order to give clearance to certain of the operative mechanisms of the machine, and to them, as will be hereinafter more fully described, are attached portions of the trip mechanism which controls the movement of the operative carriage.

The follower F, which forms the lower pressure-surface for the bale, reciprocates between the main or central columns. In order that its movement may be perfectly steady and uniform and may not vary under the pressure incidental to the operation of the press, vertical guideways F' are provided therefor, which are bolted to cross-beams A⁸ and A⁹, extending between the sides of the columns A², and cross-beams A¹⁰ and A¹¹ between the columns A³. The lower ends of the guideways extend only a short distance below the lower cross-beams, in order to release the follower when in its lowest stage of movement from their guiding influence and to permit the removal of the follower with the finished bale thereon from the machine, as will be hereinafter more fully described. The track-sections for the idle pressure-rollers, or those which are not in active operation between the pressure-surfaces, are supported between the main columns and the end columns A' and A⁴. Each pair of the end columns is connected across the top by top cross-beams A¹² and A¹³, respectively, and at the power end of the machine the end columns A⁴ are further connected at the bottom by a cross-beam A¹⁴, in which is journaled the pinion which transmits motion to the reciprocator and to the mechanism for raising the follower in position.

At the end of the machine at which cross-beam A¹² is stationed, the end columns A' are just high enough so that the upper surface the cross-beam affords a proper bed for one end of the two track-beams D, the other ends thereof resting upon the cross-beam A⁸ between the main columns A². At the other end of the machine, however, the end columns A⁴ are higher, so that the outer ends of the track-beams D' are bolted to the side of cross-beam A¹³, although their other ends rest upon the cross-beam A¹⁰, extending between the main columns A³. The reason for so adjusting the height of the end columns A⁴ will be apparent when the mechanism for actuating the reciprocator is considered, and may be briefly stated now as being done in order to properly support the reciprocator in the line of draft of the operative carriage.

The track-beams D and D' are placed considerably inside the machine-frame, in order to provide sufficient space between them and the rack-beams E for the passage of the guiding-disks C³, (see Fig. 10,) which are journaled upon the operative carriage. The track-sections extend inward sufficiently far to permit their lapping over the space occupied by the follower-block, which, when it reaches its upward limit of travel, lies between them.

It may be remarked that the track-sections are provided with depressed or cut-away ends d, to allow for the proper working of the folding mechanism which insures even bale ends.

The rack-beams E extend the length of the machine on either side of the frame and are supported upon the upper surface of cross-beam A¹², upon the upper surfaces of cross-beams A⁸ and A¹⁰, and to the side of the cross-beams A¹³ in the same manner as the track-beams D and D'. Both the track-beams and the rack-beams lie perfectly level, but the rack-beams lie on a plane slightly higher than that of the track-beams, as shown in Fig. 24, because they do not serve to support the pressure-rollers, but merely to impart movement thereto through the meshing therewith of the pinions with which the pressure-rolls are provided. On their inner surfaces at both ends the rack-beams are formed with smoothed portions e, which constitute the tracks for the guiding-disks C³ journaled in the operative carriage.

Tie-rods 1 are used to strengthen the construction of the machine and to prevent any straining or displacement of the columns.

II. *Pressure-Rollers Constituting Moving Pressure-Transmitter and Carriage Therefor.*

The function which the pressure-rollers perform is, first, to compress the sheet or bat of fiber as it is fed into the press, and, second, to keep the cotton which has been compressed in a uniform state of compression and to prevent the elasticity of the fiber asserting itself and causing an enlargement or expansion of the bale. The original compression of the cotton is effected in detail as the bat is fed to the surface of the bale by the pressure-rollers on either side of the feed-rolls, and the compression thus imparted is maintained by the constantly-moving pressure-surface formed by the pressure-rolls.

It has been stated that the compression of the cotton is effected by the movement of the pressure-rolls between a fixed upper pressure-surface formed by stationary pressure-beams and the surface of the follower-block with the superposed layers of cotton thereon; that the cotton is fed to the machine through a space formed between the two central pressure-rollers by means of independent feed-rolls and is folded in layers back and forth upon the follower-block by virtue of the reciprocating movement of the pressure-rolls, the follower-block being arranged to recede and permit the entrance of additional layers of cotton as the pressure of the cotton already in the press upon the surface thereof reaches the predetermined limit at which the step-by-step downward movement of the follower is arranged to take place.

In order that the pressure-rolls may be given the prescribed movement across the surface of the follower when they are subjected to the pressure required to compress the cotton fiber to the desired extent and to maintain the layers of cotton already compressed in the desired state of compression, it is necessary to provide means for relieving the pressure-rolls from the friction to which they would ordinarily be subject in their movement; otherwise the power required to operate the press would be so great as to render the press useless. In order to produce this result, I use instead of a single series of rolls between the two pressure-surfaces a plurality of series of rolls, the rolls of the various series being arranged directly over each other, so that the centers of the rolls in a vertical series will lie in lines normal to the pressure-surfaces, or, otherwise stated, in lines drawn between the points of contact of the impinging-rolls. The reason for this arrangement of the rolls and the result attained thereby will be apparent when the laws governing the rotative movement of bodies under pressure are considered.

When a revoluble body travels between two stationary parallel bearing-surfaces, with both of which its periphery is in contact, it rolls on one of said surfaces, but slides on the other. The power required to cause the travel of the body is measured by the frictional loss due to the sliding or slipping of one surface of the body upon one of the bearing-surfaces, and increases very rapidly in proportion to the increase of the pressure exerted by the two bearing-surfaces. This frictional loss may be obviated if means are provided for causing the body to move with a rolling contact between the pressure-surfaces, and this is what I accomplish by placing one or more revoluble bodies directly over the first revoluble body between the two bearing-surfaces, and arranging the bodies in the respective series so that their centers lie in lines drawn between the points of contact of the impinging surfaces, or, otherwise stated, lie in lines drawn normal to the pressure-surfaces. When so placed, the bodies move with a rolling contact upon each other, and each of the bodies moves with a rolling contact upon the bearing-surface with which its periphery comes in contact. The movement of the entire series of revoluble bodies is entirely frictionless, and thus can be effected by the exertion of the same power, whether the bearing-surfaces are or are not under pressure, providing only that the amount of the pressure applied does not exceed the elastic strength of the material from which the revoluble bodies are constructed. The application of this principle in the construction of my press results in my being enabled to reciprocate the pressure-rolls with a minimum amount of frictional loss. By using a series of rolls above the pressure-rolls and between the pressure-surfaces, the rolls in the respective series being held when between the pressure-surfaces in lines normal to the same, all of the upward friction is taken away, so that the pressure-rolls move across the surface of the follower just as easily when under pressure as when not under pressure. The result is that it does not require the exertion of any force to maintain the cotton once compressed in a uniform state of compression.

I further relieve the pressure-rollers from the lateral strain which would normally be exerted against the bearings of such rolls by journaling antifriction-disks between the bearing portions or spindles of the pressure-rolls, the centers of which are in line with the centers of the pressure-rolls and the peripheries of which contact with the peripheries of such pressure-rolls. I thus transmit the lateral strain of the entire series of pressure-rolls to the end friction-disks, and while it is impossible to avoid some slipping upon the end friction-disks the entire amount of frictional loss will be taken up against the bearings of the end disks and may be measured by the amount of rotation imparted thereto. This can be much diminished by increasing the size of the end friction-disks relative to the remaining antifriction-disks, so that with the same peripheral travel the rotation, and therefore the frictional loss thereof, will be less.

In order that the pressure-rolls may constantly move over the surface of the follower, and thus fold the cotton into layers of the desired length, and in order that they may keep the cotton already compressed in a uniform state of compression, it is necessary, as has before been stated, that the length of the carriage provided for the pressure-rolls be much greater than the length of the follower-block. Further, in order to prevent the rolls from slipping when they commence their travel between the pressure-surfaces, it is necessary that means be provided for maintaining the rolls in motion when not under the pressure-surfaces and for preventing any break in the uniformity of the movement of the rolls while under the pressure-surfaces.

In the following description attention is specially called to Figs. 7 to 10 of the drawings.

In the drawings the carriage in which the pressure-rollers are mounted is denoted by the letter C. The length of this carriage is double that of the follower-block. The portion thereof which is in operation moves between the pressure-surfaces formed by the pressure-beams B and the follower F, while the portion thereof which is not in operation moves upon the sectional track-sections D and D'. The carriage is formed with an outer frame, C', and an inner frame, $C^2$, the said frames being connected at their ends by single cross-pieces, and tie-rods being used, as shown, to help bear the strain. The bearings for the pressure-rolls G are formed in both the outer and the inner frames, C' and $C^2$, respectively. The pressure-rolls extend entirely across the space between the inner frames and are preferably rather small in diameter, as the efficiency of the press is in a measure proportioned to the number of points of contact which the pressure-rolls have upon the elastic surface of the cotton. The greater the number of pressure-rolls, also, the less tendency there will be for the cotton under compression to rise or form hillocks between the constantly-moving pressure-transmitting surfaces of the adjacent pressure-rolls. The central pressure-rolls are so located that a sufficient space exists between them to permit of the journaling at this point of the feed-rolls J, which are actuated in a manner hereinafter described, so as to move centrally whatever the direction of movement of the carriage.

To enable the pressure-rolls to be readily removed from the frames, the lower portions of their bearings are made removable, and to permit the rolls to be removed singly separate lower bearings are formed for each roll.

The tendency toward upward friction of the pressure-rolls is relieved by a series of antifriction-rolls H, which are held loosely in U-shaped bearings formed in the upper portion of the inner side frame, $C^2$, in such a position that their centers, as related to the centers of the pressure-rolls, are always approximately in lines normal to the pressure-surfaces and become absolutely so when they are between the pressure-surfaces. These rolls are not of uniform diameter across the machine, as is the case with the pressure-rolls, but consist of disks mounted upon central shafts or spindles.

With the exception of the rolls over the central pressure-rolls, the antifriction-rolls are only provided with one bearing, that in the inner frame, $C^2$. The reason for this is that the bearings are of no service except to hold the antifriction-rolls in position over the pressure-rolls in the perpendicular line before stated when they are in the idle portions of their travel. When under the pressure-rolls, the antifriction-rolls are held in position by frictional contact with the pressure-beams and the pressure-rolls and do not bear against their bearings. The spindles or shafts $h'$ and $h^2$ for the central antifriction-rolls are provided with two bearings, one in the outer as well as one in the inner frame, and in this case the antifriction-disks move freely upon the spindles, so that they may reverse their motion with the reciprocation of the carriage, while the spindles or shafts upon which they are mounted may move in the same direction. This construction is rendered necessary by the fact that upon the shafts of the central antifriction-rolls are keyed the pinions 2 and 3, which transmit motion to the condenser, and also pinion 4, which, when thrown in gear, operates the bagging-carriage. It is necessary that pinions 2 and 3 always rotate centrally or toward the center of the machine, as the condenser-rolls, to which they are connected by direct gearing, must move uniformly in a central direction throughout the entire operation of the press. The proper motion is given to the pinions 2 and 3 by providing the ends of shafts $h'$ and $h^2$ with the pinions H' and H², which mesh with the pinions upon the central pressure-rolls. The pinions H' and H² are connected to their shafts with a ratchet connection, so that they only serve to transmit power when moving in one direction, and then in such a manner as to cause the shafts to move centrally. As the two pinions are stationed on opposite sides of the machine and are connected to different spindles, as only one of them is transmitting power at any one time, and as the two spindles or shafts are geared together by gears hereinafter to be described, it will be seen that the power which they transmit is uniform in one direction and results in constant central rotation of the spindles. The central antifriction-rolls never leave the surface of the pressure-beam.

The lateral friction of the pressure-rolls against their bearings is borne by the antifriction-disks I, which are journaled between the inner and outer side frames and stationed between the bearing portions or spindles of the rolls, with their centers in line with the centers of the pressure-rolls and with their peripheries contacting with the peripheries of the same. Like the pressure-rolls, they are removed by taking off the lower bearing-plates provided for said rolls. These antifriction-disks transmit the lateral pressure upon the bearing portions of the pressure-rolls to the antifriction-disks I', which are stationed at both ends of the carriage and are, as shown, of a diameter considerably greater than that of the antifriction-disks I. The entire frictional loss caused by the movement of the carriage is thus borne by the end antifriction-disks and can be measured by the rotation of these disks in their bearings.

By making the disks sufficiently large the peripheral travel of the same, while equal to that of the smaller disks, will result in relatively smaller movement of the same upon their bearings, and thus a minimum of frictional loss.

The power required to reciprocate the carriage may be divided into three components: first, that required to overcome the inertia of the moving parts; second, that required to overcome the friction of the idle portions of the pressure-rolls, and, third, that required to overcome the natural rebound of the cotton between the surfaces of the adjacent pressure-rolls. The power required is uniform, whether pressure is or is not exerted by the pressure-surfaces, and thus no more power is required to reciprocate the carriage when it operates to hold the cotton forming a partly-finished bale in a uniform state of compression than would be required if the press were entirely empty. Indeed, the power required to reciprocate the carriage when the press is in operation is less than would be required to cause the same movement when the press is empty, because if the press is empty and the follower down the weight of the pressure-rolls under the pressure-beam will have to be supported by their bearings, while if the press is in operation forming a bale there is no strain upon the bearings of the active pressure-rolls, the entire strain of the baling operation being that between the pressure-beams and the follower, and the pressure-rolls merely serving to transmit the pressure from the pressure-beams to the surface of the cotton.

The pressure-rolls are caused to rotate between the pressure-surfaces by reason of the frictional contact in which they are held, independent of the exertion of any outside influence. In order, however, that they may commence their travel under the pressure-surfaces at a proper rate of rotation, it is necessary to provide means for rotating the rolls during their travel over the end portions of their movement. This I accomplish by providing each one of the rolls with a pinion $g$, which meshes with the teeth formed on the rack-beams E. The pressure-rolls, however, are so close together that all of the pinions cannot be placed on the same side of the machine, while yet obtaining the desired amount of peripheral travel, so that I attach the pinions to adjacent rolls on opposite sides of the machine. This construction is also dictated by the advisability of having the two sides of the carriage-frame wear equally. The rolls are actuated in this manner so that they move with a uniform rate of travel during their entire movement. The rotation given to the idle pressure-rolls by the pinions meshing with the racks formed in the rack-beams results in the pressure-rolls starting their travel between the pressure-beams at the proper rate of speed, and prevents any slipping of the pressure-rolls upon the elastic surface of the bale which is in process of formation. The racks, however, do not bear any part of the weight of the pressure-rolls, that being supported by the tracks provided therefor, nor does the use to which they are put subject them to much wear. The only restriction to the statement thus made is that when the press is empty and the follower down the journals of the pressure-rolls on the power end of the carriage have to bear the strain of such rolls until the follower is raised.

To prevent side movement of the carriage during its reciprocation, guiding-disks C³ are used, which project down from the corners of the carriage and travel upon the smoothed tracks $e$, formed on the inner surface of the end portions of rack-beams E. In the center of the carriage the two central rolls are journaled, so as to leave a space between the same, and the cotton in the form of a sheet or bat is fed into the machine by the two feed-rolls J. As the feeding of the cotton into the press is continuous during the entire reciprocating movement of the carriage, it is essential not only that the feed-rolls move together—that is to say, in the same direction—but that the direction of their rotation be constantly central during the entire reciprocation of the carriage. For this reason they are geared together by gear-wheels $j$, keyed to the feed-rolls at one end of the frame, and are operated alternately by pinions $J'$ and $J^2$, stationed on opposite sides of the carriage, and mounted upon the pinions of the gear-wheels with a ratchet connection, so as to impart power only when moving in one direction. Pinions $J'$ and $J^2$ engage with gear-wheels $G'$ and $G^2$, mounted upon the central pressure-rolls. The connection is thus such that one of the pinions is idle while the other is transmitting power, and as there is a reversal of the actuation of the pinions at each reversal in the movement of the carriage the rotative impulse imparted remains uniform and results in the actuation of the feed-rolls in the desired direction. Crowding of the cotton into the space between the feed-rolls and the adjacent pressure-rolls is prevented by the space-blocks $J^3$, which completely fill the spaces.

To connect the carriage to the power mechanism for operating the same, there is formed at one end of the frame a draw-head 5, through the central opening in which moves the connecting-hook 6, said hook being keyed to the shaft 7, which extends across the carriage-frame. To the ends of this shaft are keyed lever-arms 8, one of which is notched, as shown at 8', and is operated in a manner to be hereinafter described, so as to release or connect the carriage with the power mechanism which imparts movement to the same. A spring $8^2$ normally holds the connecting-hook in its upper position. To the lever-arms 8 are also connected by the lugs 9 levers 10. The curved ends 10' of these levers are bent upward to make the connection with the levers 8; but the body of the levers extends on the under side of the inner frame, $C^2$, said levers being held in position by headed bolts $10^2$, which work through slots (not shown) cut in the same, and are arranged to reciprocate thereon. The hooks $10^5$, which are formed on the under surface of the levers, act in a manner which will be hereinafter fully described to hold in position the grating which forms the upper removable bale-cover.

III. *Actuating Mechanism for Operative Carriage.*

In the construction of the power mechanism for imparting to the carriage in which the pressure-rolls are journaled the reciprocative movement necessary to its operation I have had the following objects in view: first, to provide a reciprocating mechanism whose movement shall at all times be positive with a fixed power element moving in a uniform direction of rotation; second, to provide a reciprocating mechanism whose pull will at all times be direct, so that the power applied will be uniform and so that the strain upon the working parts will not vary; third, to provide a reciprocating mechanism in which the throw incident upon a reversal of the direction will take place quickly.

The first object is dictated by the necessity of having the reciprocating movement of the operating-carriage uniform in speed and available power, while the second object of invention is necessary to attain if the power mechanism is to move easily and without any racking strain. The third object is indispensible to a reciprocating mechanism which is to operate in connection with a cotton-press, for, since the feed of the cotton to the press is continuous, any lengthened stoppage will lead to a blocking of the feed mechanism and an interruption of the operation of the press.

To provide a reciprocating movement for the operative carriage, I make use of a form of internal rack consisting of a frame having a central opening provided with rack-bars on both sides of the opening lengthwise of the frame and rack-teeth at both ends of the opening, and impart a reciprocating movement to the same by a fixed power-pinion journaled in the machine-frame and operated by a positive connection with the power-shaft, so as to move in a uniform direction. The reciprocating movement of the frame is caused by the meshing of the teeth of the pinion with the rack-bars on either side of the opening of the same, while the throw of the frame at the end of its movement, so that the pinion will act upon both rack-bars to produce a movement intermitting in direction, is caused by the meshing of the teeth of the pinion with the rack-teeth formed in the ends of the opening. In order to secure a proper working of the parts, I have found it necessary to stagger the position of the rack-bars and rack-teeth relative to each other with the direction of the motion of the operative pinion. It is necessary, moreover, in such a construction, to provide means for holding the operative side of the reciprocating frame in close contact with the power-pinion, as otherwise no positive action could be secured; to provide means for insuring a positive throw of the reciprocating frame at either end of its movement, and to provide means for maintaining the entire frame in the line of pull, thus avoiding the diagonal pull which might otherwise be found to exist with a reciprocating frame of the length necessary to give the operative carriage the necessary travel.

The means I use to hold the side of the reciprocator-frame to which power is being applied in close contact with the power-pinion consists of two disks, one on either side of the reciprocator and journaled so that they may be given a vertical movement. One of these disks is always in action, bearing against that side of the reciprocator to which power is being imparted and affording a guide to prevent lateral movement of the reciprocator away from the power-pinion, while the other is idle. To arrange for one of the disks moving idly while the other is in operation, when the disks are journaled with their peripheries only as far apart as the distance between the bearing-surfaces formed on the sides of the reciprocator, I form the bearing-surfaces on the lower portion of the sides of the reciprocator, cut away slightly the upper portion of the same, and provide means for raising either operative disk at the end of its travel, so that as the throw occurs and the reciprocator is drawn toward the operative disk it will rise upon the upper or cut-away portion of the reciprocator and return idly upon the same, while the theretofore idle disk upon the opposite side of the reciprocator falls into operative position. In this manner the result obtained is that of always having one disk in operation to perform the office designated, while the other moves idly. In this same manner I also obtain a positive throw of the reciprocator at the end of its movements, for the guiding-disks will only rise and fall when the throw is complete, and they prevent any oscillation of the frame after their change of position and the application of power through the power-pinion to cause a return movement of the reciprocator. As the guiding-disks are not released from their operative position until the end of their movement, the reciprocator is at all times securely held in proper position for effective movement.

To prevent any failure of proper working of the parts, due to wear, I make use of an auxiliary locking device, which acts to prevent the throw of the reciprocator until the proper stage of its movement is reached.

The guide-rolls, as well as the top and bottom antifriction-rollers, (which move in grooves cut in the upper and under surfaces of the reciprocator and are journaled so that they may move laterally in their bearings to accommodate the lateral throw of the carriage,) are journaled at the point where power is applied to the reciprocator, as it is there that it is necessary to prevent any swerving of the reciprocator from its desired position. It is necessary, however, on account of the length of the reciprocator, to give the operative carriage the desired movement, and on account of the necessity of shifting into the direct line of pull the end of the reciprocator which is connected with the operative carriage, when the throw occurs at the end of the reciprocator distant from the same, not only to provide a track in which feet projecting downward from the end of the reciprocator may travel, but also to provide automatically-operating means for shifting the end of the frame which is connected with the operative carriage. It is unnecessary to provide such shifting means when the power-pinion acts upon the end of the frame which is connected to the carriage, as in this case the end of the frame distant from the carriage, being free to move, will naturally align itself to the line of pull.

To meet these necessities I form the track which I provide for the feet projecting downwardly from the reciprocator of channeled iron, so that the feet may slide against the sides of the track during their lengthwise travel, and make the inner width of the track equal to the width of the bottom portion of the feet and the throw of the reciprocator added, so that the throw of the reciprocator can take place. This throw takes place at the end of the reciprocating movement, and at a time when no power is being exerted to move the operative carriage, so that the weight which has to be moved is merely that of the reciprocator, and as this is supported upon antifriction-rolls the expenditure of but little power is necessary. I further provide a system of levers whose ends project through openings cut in the track, and which are operated automatically by the feet of the reciprocator to produce the desired throw of the same.

Referring to the drawings, and particularly to Figs. 13 to 15, inclusive, K represents the reciprocator. This reciprocator is of considerable length, as it must provide for a movement of the operative carriage C sufficient to carry the cotton-feed rolls which are stationed thereon across the surface of the follower-block, and thus cause the formation of the layers of cotton of the desired length. The reciprocator is provided with a longitudinal opening, on the sides of which rack-bars $k$ and $k'$ are formed, and on the ends of which the rack-teeth $k^2$ and $k^3$, though, for a reason which will hereinafter appear, the rack-teeth $k^2$ and $k^3$ do not extend entirely across the opening in the reciprocator.

The rack-bars and rack-teeth are staggered with relation to a line central of the opening in the reciprocator with the direction of travel of the power-pinion, in order to facilitate the lateral throw of the reciprocator, which takes place at the ends of its movement, and to arrange for the teeth of the power-pinion always having rack-teeth to mesh with. The amount of staggering required of the rack-bars is equal to the movement of the pinion in the end rack-teeth during the throw of the reciprocator. With the width of throw which I use in my present movement the amount of staggering of the side bars is not quite half a tooth; but with different widths of throw the amount of staggering will vary, and I do not restrict myself to any particular width of throw or staggered position of the rack-bars.

The reciprocator lies in the machine with its broad face downward, so as to permit of its being driven by a pinion mounted upon a vertical shaft. Its reciprocatory movement is relative to a fixed point, the point of the application of power, and takes place with the continued rotation of the power-pinion in a given direction.

The reciprocator is held at the point of the application of power between upper and lower antifriction-rollers, 11 and 12, which are journaled in studs projecting from the roller-bracket 13 and are supported so as to be capable of lateral movement. The antifriction-rollers move in grooves cut in the upper and lower surfaces of the reciprocator and afford a positive support, rendering impossible any vertical movement of the reciprocator, though permitting lateral movement thereof. They also render the throw of the reciprocator comparatively frictionless and make the same easy and uniform. Owing to the height of the cross-beam $A^{13}$, to which the bracket 13 is bolted, the reciprocator is supported so as to be on a level with the line of travel of the operative carriage C and so that the connecting-hook 6 pivotally supported in said carriage can be readily passed through the opening in the draw-head K', with which the reciprocator is provided.

In consequence of the length of the reciprocator, and in order to enable the desired throw of the same to take place, I have found it necessary to provide means for the guiding of the movement of the ends of the same. I thus take away from the supporting-rollers the lateral strain to which they would otherwise be subjected. I therefore form at the ends of the reciprocator downwardly-projecting feet $K^2$ and $K^3$, which move against the sides of the track L. This track is supported directly under the reciprocator and is made of channeled iron, so as to permit not only the travel therein of the feet $K^2$ and $K^3$, but also the lateral movement of said feet incidental to a throw of the reciprocator. In order to avoid undue friction, the bottom of the reciprocator is planed smooth. The track in my present construction is made in two pieces, one of which, L', extends from the central cross-beam, $A^{10}$, to the end cross-beam, $A^{13}$, being bolted at these points, and the other of which, $L^2$, extends from the end of the cross-beam $A^{13}$ to the rear of the machine, being supported at its outer end by supporting-braces 14, which extend upward from the bottom cross-piece, $A^{14}$, of the machine-frame.

Power is applied to the reciprocator in the following manner: To the inner end of the power-shaft 15, which is journaled, as shown, in the machine-frame, is keyed the pinion 17. This pinion meshes with the pinion 18, mounted upon the vertical shaft 19. The vertical shaft 19, which has its bottom bearing in the cross-beam $A^{14}$ of the machine-frame and its upper bearing in the cross-piece $A^{13}$, bears upon its upper end a pinion 20, which is arranged to mesh with the rack-teeth formed in the reciprocator and impart thereto the desired movement. The throw of the reciprocator is accomplished at the ends of its longitudinal movement by the engagement of the teeth of the power-pinion with the rack-teeth formed in the ends of the opening of the frame. These rack-teeth are slightly staggered with the direction of the movement of the pinion, so that the position of such teeth will correspond with that required to permit the transmission of effective rotative impulse by the power-pinion, and the rack-bar on the opposite side of the frame is also slightly staggered in the same direction for the same reason.

When the teeth are placed in the manner represented in the drawings, the throw can be affected with only two teeth placed in the ends of the opening in the frame, and the pitch-line of these teeth remains the same as that of the teeth of the rack-bars. If, however, more end teeth be used, as may be used without varying other than the mechanical details of the reciprocator, the pitch-line of the teeth will have to be altered in order to enable the proper throw to take place. While the lateral throw of the carriage is thus accomplished, it is necessary to provide means for holding the side of the reciprocator to which power is being applied against the power-pinion, so that no slipping of the intermeshing teeth can take place, and also to provide means for rendering the throw of the reciprocator positive and certain in its action. These objects I accomplish in the following manner: On both sides of the reciprocator, with their peripheries separated by the width of the bearing portions of the same, I place guiding-disks 21, whose spindles are journaled in lugs projecting inwardly from the roller-bracket 13 and in openings formed in the top of the said bracket. The upper ends of the spindles project upward through such openings, but are normally forced downward by the action of the flat spring 22, which is mounted, as shown, upon the upper surface of the bracket. The guiding-disks are thus so supported as to be capable of vertical movement, although lateral movement is impossible. They are arranged so that one of the same always bears against the side of the reciprocator to which power is being applied, while the other rides idly upon the top of the reciprocator. The construction which renders this operation possible is as follows:

The sides of the reciprocator are formed of two portions, a bearing portion $k^4$ and a recessed or cut-away portion $k^5$. The bearing portion is that toward the bottom of the sides of the reciprocator. A lip $k^6$ separates the two portions and prevents the guiding-disk when bearing against the bearing portion $k^4$ from slipping upward out of engagement with the same. It is intended that the operating guiding-disk shall bear upon the bearing portion $k^4$ of the reciprocator, and that the idle guiding-disk shall move upon the cut-away portion thereof.

It is necessary to provide means, operated automatically by the movement of the reciprocator, for causing the guiding-disks to assume their respective positions. To this end, having in view the fact that the throw of the reciprocator takes place toward the guiding-disk which is in operation, I form on each of the sides of the reciprocator, at diagonal ends thereof, upwardly-curving portions $k^7$, which connect the bearing and the cut-away portions of the reciprocator. I also form on the alternate ends of the reciprocator vertically-depressed portions $k^8$. The upwardly-curving portions $k^7$ are formed at that end of the sides of the reciprocator toward which the movement of the same takes place, while the recessed or depressed portions $k^8$ occur at that end of the reciprocator at which the movement of the same begins.

If now the operation of the reciprocator be considered, it will be seen that as the end of the movement thereof is reached and it begins its lateral throw by the engagement of the teeth of the power-pinion with the rack-teeth in the end of the opening therein, since the throw of the reciprocator is toward the side upon which power has just been applied, the guide-roller, which has just been operating against the bearing portion $k^4$, will be made to rise up upon the upwardly-curving portion $k^7$ in proportion as the throw takes place, and will at the end of the movement be in its upper or raised position resting upon the recessed or cut-away portion $k^5$. During this movement the other guiding-disk will have been carried to the edge of the cut-away portion $k^8$, and will, as the throw is about complete, escape entirely from its support and be forced down by the flat spring 22, bearing against the end of its spindle into operative position. A reversal of the positions of the guiding-disks has thus been effected. That disk which before was moving idly has dropped into operative position, and will now act to hold that side of the reciprocator to which power is being applied against the driving-pinion, avoiding any loss of power, and the guiding-disk which before was operative has become idle and will move back along the cut-away portion of the reciprocator.

The reason for recessing or depressing the portion $k^8$ is to cause the idle guide-disk to drop into position a little before the end of the throw has been accomplished. If such formation were not resorted to, the dropping of the disk into position would perhaps be uncertain, as it would have to occur in the moment of time between the end of the lateral throw of the reciprocator and the forward movement of the same caused by the continuous movement of the actuating power-pinion. If, however, the ends of the bar be cut away, as indicated, the operation takes place without any uncertainty.

The reciprocator is still perfectly guided, for the moment power is applied to the same and movement takes place the guiding-disk passes from the slightly-depressed portion of the bearing-surface and rides upon the bearing-surface in operative position.

In order to prevent the reciprocator throwing before the time at which the throw should occur, by reason of wearing away of the upwardly-curving portion $k^7$, (an action which, if it should occur, would destroy the efficacy of the movement,) I support over the top of the reciprocator, at either end thereof, castings 23, upon whose under surface lugs 24 are formed. The inclined or cam face 24' of these lugs occurs on that side thereof toward the upwardly-curving portion $k^7$. With these lugs engage the pins 25, formed on the power-pinion, the movement being such that the pins move up the curved portion of the cam-face of the lugs at the moment that the throw of the reciprocator commences and finish their movement against such cam-face when the throw is complete. In this manner a guard is provided for preventing the throw of the reciprocator taking place too early, and consequently interrupting the operation of the device. It is necessary to use two pins 25, as shown, as the power-pinion is not at the same stage of revolution at both ends of the movement of the reciprocator, with the length of reciprocator which is in use in my present construction, but differs by half a revolution. As the position of the cams 24 is fixed by the character of the function which they perform, and is the same at both ends of the reciprocator, the use of two pins 25 is indispensable.

In the modified form of reciprocator shown in Fig. 15$^b$ the lip $k^6$ is dispensed with, and instead of depressing vertically-alternate corners of the reciprocator, as at $k^8$, such corners are formed with upwardly-curving portions $k^9$, similar in all respects to the upwardly-curving portions $k^7$. In this construction one of the guiding-disks rises in exact proportion to the fall of the other guiding-disk, and a rocking lever 22' is used, as shown in Fig. 15$^a$, to control the movement of the same.

When the throw of the reciprocator takes place at that end thereof which is attached to the operative carriage, it is unnecessary to use any additional means to align the free end of the reciprocator, as it will itself come into proper alignment as soon as power is applied, the foot $k^3$ sliding over to the proper side of the track and bearing against the side thereof which corresponds to the side of the reciprocator to which power is being applied. When, however, the throw takes place at the end of the reciprocator distant to the carriage, it is necessary to provide means for positively throwing the free end of the reciprocator over a distance equal to the throw of the reciprocator, in order to escape the diagonal pull which would otherwise result. This can be accomplished all the more easily, for at the moment when the throw takes place there is no pull between the connecting-hook of the carriage and the draw head of the reciprocator, and all that has to be shifted is the deadweight of the reciprocator. As this is mounted upon antifriction-roller bearings, the power required is very slight.

I effect the throw of the far end of the reciprocator in the following manner: To the under side of the track L are pivoted levers 26 and 27, which are connected by a knuckle-joint 28. The arms of these levers are of equal length, and their connection is such that a movement of one causes a movement of the other equal in length and opposite in direction. The end of the lever 26 is curved, as shown at 29, and at the extreme end of the curved portion projects upward the pin 30. This pin works through an opening $l$, formed in the bottom of track L. The free end of the other lever, 27, is provided with a bevel-faced head 31, which works in and out of the path of the foot $K^2$ of the reciprocator through an opening $l'$ in the side of the same.

Considering again the operation of the reciprocator, and supposing the reciprocator to be moving backward or away from the body of the machine, and the pin 30 to be in the middle of the track L when the end of the movement is reached and the return of the reciprocator commences, no change will take place in the position of the levers until the moment of the throw of the reciprocator at the end distant from the carriage. As this throw takes place, the pin 30 will be forced out of the track L, and by the same movement the bevel-faced portion 31 will be pushed into the track, forcing the leg $K^2$ to the opposite side of the track L and into the direct line of pull. Should the bevel-faced edge 31 have been in the track L at the time indicated and the pin 30 out of the track, this difference in the operation would have taken place: As the foot $K^2$ reached the outer portion of its travel, it would have forced the bevel-faced portion 31 out of the track (for the foot $K^2$ would then be traveling on the side of the track proper to perform its action) and the pin 31 into the track. The same action as before would then have occurred when the throw took place.

IV. *Follower and Mechanism Connected Therewith.*

It has been stated that the bale of cotton is formed between the surface of the pressure-rolls and the gradually-receding surface of the follower, and that the follower only recedes as the pressure of the cotton gathered in layers thereupon exceeds the pressure which it is intended to impart to the cotton, and then recedes gradually, or with a step-by-step movement, sufficiently only to relieve the cotton from the excess of pressure to which it is being subjected.

I have already described the machine frame, the pressure-rollers and the carriage in which the same are journaled, and the reciprocator which actuates the carriage. It is proper, therefore, to at this point consider the other of the pressure-surfaces which is active in the formation of the bale—viz., the follower and escapement mechanism for controlling the movement thereof. In connection with this part of the description it will also be expedient to describe the grating which forms the upper removable bale-cover and the truck which permits the removal of the finished bale from the press.

A. Follower and escapement mechanism controlling the movement thereof.

Reference is made to Figs. 5 and 6 and to Figs. 16 to 23 of the drawings. The follower is represented in the drawings by the letter F. It is, as shown, a removable casting of the general shape of the bale to be formed. Its length is the same as that of the bale, although its width is slightly greater than that of the bale in order to facilitate the tying of the same. The upper surface of the follower is smooth and is formed with numerous parallel grooves $f$, into which it is expected that the first layers of the bale will expand sufficiently to hold themselves firmly in position on the follower, and through the lower portions of which the bale-ties are passed when the bale is complete. The distance between the grooves and the number of grooves formed is therefore determined by the number of bale-ties which it is intended to use in tying up the bale. The ends of the follower-block are depressed, as shown at $f'$. This is done in order to permit the proper operation of the folders, which act to hold the ends of the layers of cotton firmly in position on the follower, and will be hereinafter described in detail. It may be mentioned at this point that before any cotton is fed upon the surface of the follower a piece of bagging sufficient to cover the bottom and sides of the bale is first placed in position thereon.

The follower is provided on both sides with guides $F^2$, which fit over the guideways $F'$, held in vertical position between the cross-beams of the central or main columns in the manner hereinbefore described, and keep the movement of the follower uniform throughout its travel.

On the sides of the follower are formed brackets, in which are journaled the rollers $f^2$. These rollers are journaled sufficiently high to support the grating M, which rests in position thereupon when raised into position between the pressure-rolls G and in the very commencement of the formation of the bale just free of the surface of the follower. By means of a lever $f^3$, which is revolubly mounted on one end of the follower and which when turned up engages with the grating, movement of the grating upon the follower is prevented. In the brackets in which the rollers $f^2$ are journaled are also formed supports for the revoluble rods $f^4$, around which are passed the hooks which hold the bale in compressed condition when it is removed from the pressure-surfaces before the placing of the ties thereon.

The follower rests upon the cross-pieces $n$ of the follower-support N. No means are used to prevent a slight oscillation of the support relative to the follower, should such oscillation occur in working, but the follower itself is held, as stated, in rigid guideways. The frame N has to be sufficiently strong to withstand the pressure which it is intended to impart to the cotton, and to this end is strengthened by tie-rods $n'$, which are bolted to the inner surface of the same.

The function of the follower-support is to allow the downward movement of the follower necessarily attendant to the formation of a complete bale, and also the further downward movement which must take place when the bale is to be removed from the press. To arrange for this movement of the follower-support, it is provided with external rack-bars N', four of such bars being used to make the working strain uniform. The rack-bars mesh with the pinions O, which are mounted upon the transverse shafts $o$. The shafts $o$ have their bearings in cross-girders 32, 33, 34, and 35 and bear, besides the pinions O, the central large gear-wheels, O', which, for the purpose of equalizing strain, mesh with each other. This construction has been chosen because the torsional strain upon the shafts $o$ is in this manner best accommodated.

I will now describe the escapement mechanism, by means of which the follower-support is allowed to recede when the pressure upon the follower has reached a predetermined limit. One of the wheels O' meshes with the pinion $O^2$, which is mounted upon the fixed shaft $o^2$. This shaft has its bearings in cross-girders 33, 34, and 36 and bears upon its outer end, which extends toward the power end of the press, the gear-wheel $O^3$. This gear-wheel meshes with the pinion $O^4$, which is mounted upon the fixed shaft $o^4$. Shaft $o^4$ has its bearings in cross-girders 34, 35 and 36 and bears the gear-wheel $O^5$, which meshes with the pinion $O^6$. Pinion $O^6$ is mounted upon the shaft $o^6$, which has its journals in cross-girders 36 and 37 and bears at one end the escapement-wheel $O^7$. On each side of the escapement-wheel, but in a staggered position with relation to each other, are formed V-shaped lugs $o^7$. The escapement-levers $O^8$ are pivoted to the lugs $o^8$, which project from one side of the machine-frame. They are provided with a curved portion $O^9$ to escape the curve of the escapement-wheel and with bearing-shoulders $O^{10}$, which rest against the V-shaped lugs $o^7$ formed on the escapement-wheel.

As a consequence of the staggered position of the lugs on the escapement-wheel and of the fact that the bearing-corners of the escapement-levers engage lugs on opposite sides of said wheel, one of the escapement-levers is at all times, relatively speaking, resting against the long V side of one of the lugs, while the other lever is poised upon the point of one of the lugs and ready to fall upon the next succeeding lug as the wheel continues its movement.

Weights may be used, if desired, upon the end of the escapement-levers to graduate the pressure upon the cotton.

Considering now the operation of the escapement mechanism as a whole, the pinions O are mounted on the same shaft with the gear-wheels O', one of which meshes with the pinion $O^2$. This pinion transmits to the gear-wheel $O^3$ any movement given it, and this, through the pinion $O^4$, the gear-wheel $O^5$ and the pinion $O^6$, exerts a rotative tendency upon the escapement-wheel $O^7$. In order that a single one of the gears or pinions in this train may move, and in order that any actuation of the escapement mechanism takes place, the downward pressure upon the follower must be sufficient to cause the escapement-wheel $O^7$ to lift one of the levers $O^8$ by the action of a V-shaped lug $o^7$. By properly proportioning the size of the various gears and pinions not only may the relative movement of the follower and escapement-wheel be such that a downward movement of the follower of one thirty-second of an inch will cause an actuation of the escapement-wheel, but so that such movement can only take place when any desired pressure, whether ten thousand or twenty thousand pounds, is exerted.

By placing lugs on both sides of the escapement-wheels and using two escapement-levers I am able to keep the follower under constant pressure, so that no sudden movement of the same can take place.

In actual operation the follower-block recedes whenever the bat of cotton which has been folded thereupon reaches one thirty-second of an inch in thickness, and at every increase of thickness a thirty-second of an inch one actuation of the escapement-wheel results. The escapement-levers rise and fall alternately. Theoretically their rise and fall should be entirely uniform, but in practice I have found it to occur with some irregularity, due to the resiliency of the fiber with which I have to deal. The pressure which I find it necessary to apply in my press to the cotton is usually about twelve thousand pounds, but it may vary more or less with different conditions of the cotton.

It is necessary to provide a downward movement of the follower after the bale has been formed and has been held in position by the removable rods, which will be hereinafter described, in order that the removal of the finished bale may be possible, and it is further necessary that means be provided for raising an empty follower into operative position. Both of these operations must take place when the movement of the train of gears is not restricted by the escapement-wheel. For this reason I arrange for throwing the pinion $O^6$, which is mounted upon the shaft which bears the escapement-wheel out of gear with the gear-wheel $O^5$, and thus relieve the train of gears directly in connection with the rack-bars N' of the follower-support from the restraint to which they are normally subjected.

This I accomplish by mounting both ends of the shaft $o^6$ in roller-bearings, and by further mounting that end of the shaft farthest from the escapement-wheel in an eccentric-head. The type of roller-bearings which I use is that which involves the use of barrel-shaped heads on the ends of the shaft, (see Fig. 22,) these heads being provided with corresponding bearing-surfaces. A free oscillatory movement within certain limits is thus provided. At the end of the shaft distant from the escapement-wheel and near to the gearing-pinion the bearing for the shaft is mounted in an eccentric-head $o^{12}$, the position of which is controlled by the lever $O^{12}$. This lever is connected by rods or links $O^{14}$ to handle-bars $O^{15}$, such bars being stationed on either side of the machine. One of said handle-bars moves within a notched quadrant $O^{17}$, (see Fig. 30,) a spring-pressed pawl $O^{16}$ being used to define the position of the handle-bars. In this manner the shaft $o^6$ can be drawn to one side and the pinion $O^6$ thrown out of gear with the gear-wheel $O^5$ whenever such movement is desired, and from either side of the machine. In Figs. 19 and 20 the position of the parts is shown when the escapement-pinion $O^6$ is in gear with the gear-wheel $O^5$ and when such escapement-pinion has been thrown out of gear.

The length of the guides F', which are provided for the follower, is such that while they guide the follower during its active movement they do not afford a guide for the follower when it drops into its lowest position, ready for removal from the press. Thus when the bale is completely formed and the escapement mechanism is thrown out of connection with the same by proper movement of the handle-bars $O^{15}$, the downward movement of the follower which results is sufficient to entirely free the same from the guides F', the follower resting, when in its lowest stage of movement, not upon the support N, but upon the truck R, as will be hereinafter described.

It is necessary to provide means for raising the follower-support and the empty follower in place thereon at the beginning of the formation of each bale. This upward movement must also act when the pinion $O^6$ is out of engagement. The raising means must be positive in their action and raise the follower-support quickly. The means for accomplishing this end which I use in my present construction consist of friction-wheels, normally disengaged from the train of gears which are connected to the follower-support, but so arranged as to be thrown into engagement when desired, such wheels being driven by a positive connection with the power-shaft as follows: From the bottom cross-beam $A^{14}$ projects a lug $A^{15}$, which forms a bearing for one end of the shaft $p$, the bearing for the other end of which is formed in the eccentric-head $p'$, supported in a bearing formed in the cross-girder 36, and held in a determined position by the double lever $P^3$. The position of this lever is itself determined by the handle-arms $P^4$, which are connected to the ends of lever $P^3$ by the links $P^5$. Upon the shaft $p$ are mounted the gearing-pinion P, which is in constant gear with the pinion 18, to which power is imparted to the press through the mediation of the pinion 17 and the friction-disk P'. I have found it unnecessary to use the ball-bearing construction in connection with the gearing-pinion P, for the eccentric movement given to the same is slight, and the length of the shaft is so great relative to the movement that its effect upon the pinion P is inappreciable. When the eccentric is turned so as to raise the friction-disk P', this disk runs idle. When, however, the eccentric is turned so as to lower the friction-disk P', the periphery of this disk comes in contact with that of the disk $P^2$, which is mounted upon the shaft $o^4$, and thus in position to impart movement to the train of gears which act upon the follower-support. The direction of the rotation imparted by the friction-disk is opposed to that which the gears have when the follower is receding from the pressure-rolls, and results in a rapid and uniform raising of the follower-support and the follower which is in position thereupon. In this manner the position of the follower can be adjusted in any desired manner. When the bale has been completed, the follower-support is allowed to fall and the follower with the finished bale thereupon removed from the press, while by the same operation a new follower is drawn into position under the follower-support in a manner hereinafter to be described. Then the friction-disks are thrown into gear and the follower raised into position, when they are thrown out of gear and the pinion $O^6$ is automatically thrown into gear, thus bringing the escapement mechanism into action. The trip mechanism by which the automatic movement of the pinion $O^6$ is effected will be hereinafter described.

B. Grating and removable rods for holding bale in position before tying.

The necessity for the use of an upper removable bale-cover arises from the fact that in my present construction the putting of the ties upon the bale is not performed while the bale is under pressure between the pressure-rolls and the follower, but is done after the compressed bale has been removed from the press. If such upper removable bale-cover were not used, the resiliency of the cotton fiber would assert itself as soon as the pressure was removed therefrom, and the production of a compressed bale would be impossible. The construction I use for this purpose I term a "grating." It is represented in the drawings by the letter M, and it consists of a number of triangularly-shaped bars $m$, held in proper position by side pieces M' and adapted to fit into position between the curved surfaces of the pressure-rollers in such a manner as not to interfere with their action and at the same time to be above the bale as it is being formed layer by layer. The flat side of the bars $m$ is down, as shown, and it is this side that comes in contact with the upper surface of the cotton-bale. The inclined sides of the bars are curved, so that they may be fitted very close against the moving surface of the pressure-rolls without interfering with their movement. The bars are stationed far enough apart to permit of their proper placing in position, and the grating is held in position by the engagement of hooks $10^5$, formed on the reciprocating levers 10 with the studs $M^2$, which project from the sides of the grating on both sides and at both ends of the same. The faces of these studs are rounded so as to render the engagement positive and certain.

Openings $m^3$ are formed in the side of the grating-frame to permit the entrance therein of the bent ends of the holding-bars 47, the lower curved ends of which are passed around the rods $f^4$, which are mounted in brackets projecting from the follower. When the holding-rods are in place, the bale is completely held, and the ties may be put around the same at leisure.

The grating-bars are longer than the width of the bale, so as to simplify the tying operation. When the bale is tied, the holding-rods are removed by the action of the lever 48 and the link 49. This action is as follows: The lever 48 is keyed to one end of the shaft $f^4$, and the link 49 runs from the short end of said lever to a lever 50, which is keyed to the other revoluble rod $f^4$. When now the lever 48 is moved, the rods $f^4$ are rotated, such rotation being, on account of the connection stated, opposite in direction. Both of the curved ends of holding-bars 45 are thus removed from engagement with the rods $f^4$, and the holding-rods can be removed. When a grating is to be raised into position, it is placed upon the rolls $f^4$ of the follower, being held in position by the engagement of the ends of the lever $f^3$ with the same and is raised when the follower is raised. When in its upper position fitting closely against the under surface of the pressure-rolls, it is caught and held by the hooks $10^5$ and is retained in position until the said hooks are withdrawn in a manner hereinafter to be fully described when the trip mechanism is considered.

It is apparent from the description thus given that the grating and the follower serve really as upper and under bale-covers, and they may be so considered.

C. Bale-removing truck.

It has been stated that when the follower-support reaches its lowest level the follower is entirely free from the vertical slides or guideways F' and is capable of lateral movement. At that stage of the operation the follower does not rest, however, upon the follower-support, but upon a truck R, the truck-wheels of which run upon outwardly-extending and downwardly-inclining tracks R'. The dowel-pins $f^6$, which are formed on the under surface of the carrier, engage in suitable apertures formed in the sides of the truck and prevent any slipping of the follower upon the truck.

I have found it convenient to draw an empty follower into the press in proper position to permit its being raised by the follower-support at the same time and by the same movement that the loaded follower, with the bale thereon, is removed from the press. This I accomplish in the following manner: I have stated that the truck R rides upon the downwardly-inclined and outwardly-extending tracks R'. These tracks extend on both sides of the press and afford support for two bale-trucks, one of which is at all times (except during the moment of time required to make the change) in position under the follower-support, while the other is idle. The trucks are connected by links $R^2$. The length of the trucks is such that, when in position, one pair of the truck-wheels is upon the level portion of the track provided therefor, while the other is upon the inclined portion of such track. The weight of the idle truck, therefore, is constantly tending to pull the truck which is in position out of position, and I make use of the stops $R^6$, with which the downwardly-extending flanges $R^3$ of the trucks contact, and the curved shoes $R^5$, to keep the active truck in the proper position.

When no weight is upon the active truck it is pulled over against its stop by the idle truck. When, however, the follower-support descends and allows the follower with the completed bale thereupon to rest upon the truck which is in position under the follower, the weight of the bale overcomes the pull of the idle truck, and the truck upon which the bale rests slides down its inclined track, and by the same action pulls the idle truck into operative position. Upon the idle truck has previously been placed a follower and a grating, so that a follower ready for active service is drawn into position to be raised into contact with the pressure-rolls to permit the formation of a new bale.

The entire operation of lowering the follower into its lowest position, removing the completed bale, and raising an empty follower into position need not occupy more than half a minute, and does not sensibly interrupt the baling operation.

V. *Condenser and Feeder-Flume.*

For the satisfactory operation of the press, it is absolutely essential that the means provided for the feeding of the cotton to the press be such as to provide a uniform supply of cotton, so that the action of the press may be uniform. Certain other considerations have guided me in the choice of a condenser which I am about to describe, which I will state as follows:

I wish in the first place to feed my press with cotton coming from one or more gins or other sources of cotton supply. It is more convenient to have a cotton-press which will take cotton from several sources of supply at one time, for the number of machines necessary to be placed at large gin centers is thus diminished. Moreover, the capacity of my press is sufficient to enable it to handle satisfactorily such a quantity of cotton. When several gins are used in connection with a single press, the difference in the feed is manifested by the size of the bat produced. By arranging the power mechanism for my press so that its speed can be increased or diminished in accordance with the number of gins feeding into the press I can accommodate the press to the increased or diminished supply. It is not necessary to multiply the speed of the press when the supply is multiplied, but only to increase it slightly, so that the bat will not be uncontrollable. The thicker the bat which is fed to the pressure-rolls of course the more rapidly a bale will be formed with uniform reciprocation of the pressure-rolls.

In order to feed cotton to my press from more than one gin at a time, it is absolutely essential that an exhaust-air current be used to bring the cotton from the source of supply to the condenser-cylinders. A driving air-current could not be satisfactorily used in view of the working conditions which pertain to the operation of the gins. I have further found it necessary, since the condenser must form a part of the machine and be rigidly held thereto in a fixed relation to the feeder-rolls, to provide means for connecting the source of lint supply with the condenser in a novel manner, in order to secure a uniform feed.

The condenser which I have made use of is not of my invention, but is the invention of A. S. Gooch, and is claimed in an application for Letters Patent filed concurrently herewith. As the condenser enters as a necessary factor in the operation of my press, however, I will describe the same.

In a condenser which is to be used with an exhaust-air current it is of essential importance that the portion of the condenser which is to be exposed to the action of the air-current be guarded and defined to exact limits, so that removal of the bat from the condenser-cylinder by the batter-rolls will be permitted, and so that no cotton will be carried out of the range of the influence of the condenser-cylinder. To accomplish this, it has been found necessary to close the ends of the condenser-cylinder and to cut up or divide the interior of the condenser-cylinder into segments, which are so arranged that the air-exhaust opening can never suck through into the space in which the batter-rolls operate, leathers placed against the cylinder-surface being used in addition to prevent circumferential air-suction. It has been further found necessary, in order to obtain a uniform bat and a uniform strength of operative air-current, to make use of two condenser-cylinders instead of one, as in the ordinary construction, the two cylinders being actuated so as to move centrally or with their contiguous surfaces moving in the same direction and to make use of multiple air-exhaust openings. By the conjoint action of these two means I am enabled to obtain a uniform bat and a uniformly-produced bat.

With a condenser of this type it is not convenient or advisable to bring such a quantity of lint-cotton as is required to supply my press directly from the source of supply to the condenser. Lint-cotton before it has been passed through a condenser is filled with fine dust, and it would be inadvisable to throw the entire cleaning operation upon this condenser. I aim, therefore, to pass the cotton as it comes from the gin over a preliminary condenser before feeding it to the press-condenser. I do not use a batter-roll in connection with a preliminary condenser, but allow the air-current to blow the cotton from the surface of the same. The condenser used on my machine performs the function of forming the bat rather than that of forming the bat and cleaning the cotton.

The means which are used to actuate the condenser are of my own invention, and have been devised with a view to, first, gearing the condenser-rolls so that they will operate satisfactorily at a uniform rate of speed, whatever the direction of motion of the reciprocating pressure-rolls; second, gearing the batter-rolls so that they will also rotate centrally and at a rate of speed slightly in excess of the peripheral travel of the condenser-cylinder surface; third, providing means operating automatically by the moving of the follower for starting and stopping the condenser.

Reference is made to Figs. 6, 7, 8, 9 and 27 of the drawings.

The first problem to be solved in feeding cotton from a stationary point of supply to a reciprocating condenser is to arrange for a uniform feed during the varied conditions of the travel. This has been done by connecting the press-condenser to the source of supply, which in this instance is the picker Z, (shown in Fig. 2$^a$,) by a telescopic supply-pipe S, one section, S', of which is connected to the framework of the dirt-removing condenser, and the other section, S$^2$, of which is connected to the press-condenser, at one end of the same, above the condenser-cylinders. The moving section S$^2$ is made long enough to permit the necessary travel of the pressure-rolls and yet maintain an air-tight joint.

With the use of a round lint-supply opening it has been found necessary to use two condenser-cylinders in order to spread the bat evenly and uniformly over the surface of the same. The condenser as a whole is represented in the drawings by the letter T. It is supported upon a frame T' in such a position that the space between the condenser-cylinders is directly over the opening between the feed-rolls. The frame T' is itself held in position by supports 51, which are bolted to the sides of the outer framework, C', of the reciprocating carriage. The bent portions of these supports rest upon the upper surface of the inner framework, C², of the carriage, between the U-shaped journal-openings formed for the antifriction-rolls.

The frame of the condenser is made with solid ends, as shown. Windows $t$ are cut in the side, so that the operation of the condenser can be constantly inspected.

The condenser-cylinders T² and T³ are journaled parallel to each other, with their peripheries separated by only a sufficient distance to permit the passage of a bat of the desired size. The heads of the cylinders are closed by head-pieces $t'$ and the inner surface of the cylinder is divided into quadrants $t^2$, this being done to control the cylinder-surface to which the exhaust-air current has access. The exhaust-air openings T⁶ and T⁵ are placed near the bottom of the condenser-frame on either side of the same. The portions of the condenser-cylinders upon which the air-currents which are drawn into the same operate are not, however, the same, for otherwise the points of cut-off of the two cylinders would occur at the same time and the operation of the condenser would lack uniformity. The surface upon which the exhaust-opening T⁶ operates is defined by the upper and lower cut-off provided therefor, the lower cut-off being the leathered plate $t^3$ and the upper cut-off the leathered plate $t^4$. Side leathers $t^5$ at both sides of both condenser-cylinders (see Fig. 6) still further tend to control the direction of the exhaust-air current and the bottom of the condenser is closed by the plates $t^9$.

The points of the cut-off of the condenser-cylinder upon which the exhaust-opening $t^5$ operates are shifted relatively to that in the other cylinder, so that the cut-off of the two cylinders will not take place at the same moment, the result of this being that the exhaust-air current is as uniform as is possible to attain throughout the operation of the condenser. The points of cut-off upon this condenser-cylinder are found at $t^6$ and $t^7$, leathered plates being used as before.

The cotton which is drawn to the condenser-surface through the supply-pipe S tends to fall first upon the surface of the condenser-cylinder nearest the opening, and forms upon the same a bat of uniform thickness. The cotton in the upper portion of the supply-pipe is, however, drawn over to the surface of the other condenser-cylinder, especially when the cut-off of the first cylinder occurs, and is laid upon this condenser-surface in a uniform bat, the bats being taken off of the condenser-surface into the flume U. In order to make the action of the two condenser-cylinders uniform I also provide the exhaust-opening T⁷, the mouth of which is guarded by a strip of wire-netting, as shown. The joint action of these various exhaust-air currents unites to cause the formation of a bat of uniform thickness, and while the cotton may gather in masses across the mouth of the exhaust-opening T⁷ this cotton will all be drawn down by the condenser-cylinder T² as it continues its revolution, owing to the adhesion of the cotton, and formed into a bat, as before described.

The batter-rolls T⁴ are provided with leather strips $t^8$, which fly outwardly as the rolls rotate by the force of the centrifugal action and effectually prevent any air-current coming in contact with the cotton as it is taken from the condenser-cylinders by the batter-rolls and delivered in the flume U. These batter-rolls are further actuated so as to rotate at a slightly-greater speed than the condenser-cylinders, in order that clogging of the bat may be prevented. The leather strips, besides performing the function above indicated, serve as positive means for removing the cotton from the surface of the condenser-rolls.

The method of actuating the condenser is as follows: It has been stated in the description of the pressure-rolls and the carriage provided therefor that the pinions 2 and 3 are designed to operate the condenser, and that the pinions II' and II², mounted on the central antifriction-rolls, are only connected to the spindles $h'$ and $h^2$ of the said rolls by a ratchet connection, so that the spindles are only driven by the pinions when the pinions are moving in one direction, and may move independently of the same when the pinions are moving in the opposite direction—that is to say, the pinions II' and II², which must have, by reason of their connection with the pinions of the pressure-rolls, an intermittently-reversed motion, impart power to the spindles of the antifriction-rolls only when moving in one direction, and leave the antifriction-rolls to have any desired direction of rotation when they are moving in the opposite direction. As there are two sets of pinions thus connected, and as the driving-actuation of the same occurs alternately, it will be seen that it only requires the proper choice of the sides of the machine on which to place the pinions II' and II² to give the spindles of the antifriction-wheels a definite constant direction of rotation, provided they be connected by a system of gearing. The rotative impulse imparted by each of the driving-pinions is central or toward the feed-opening. As one of the driving-pinions is constantly acting to rotate one of the spindles of the antifriction-rolls centrally during half of the movement, and has no rotative tendency upon the roll during the other half of the movement, and as the two driving-pinions act alternately, it will be seen that the spindles are driven in a constant direction of rotation, while the direction of rotation of the actuating-pinions is regularly reversing. Such being the case, it is possible to actuate the condenser so that the cylinders thereof will move centrally whatever the direction of travel of the pressure-rolls and carriage carrying the same.

In the frame T', I form journals for the shafts 52 and 53. These shafts extend across the frame. Upon shaft 52, on one side of the same, I mount a gear-wheel 54, which is arranged to mesh with the pinion 2 upon that one of the central antifriction-roll spindles $h'$ controlled by the pinion G'. Upon the shaft 53 is mounted gear-wheel 55, which is arranged to mesh with gear-wheel 54, and also on the opposite side of the press the gear-wheel 56, which is arranged to mesh with the pinion 3, operated through the actuating tendency of the pinion $G^2$. When now the pinion G' is the driving-pinion, it acts through the pinion 2 to move the gear-wheel 54 centrally, and through the meshing of the same with the gear-wheel 55 also to move the gear-wheel 56 centrally, and thereby cause the spindle upon which the pinions 3 and $H^2$ are mounted to move with a clicking sound oppositely to the direction of the rotation of pinion $H^2$. When the pinion $G^2$ is the driving-pinion, it acts to turn the gear-wheel 56 in the same direction in which it was caused to rotate by the meshing of the gear-wheels 54 and 55 and thus to cause the gear-wheels 54 and 55 to move in the same direction of rotation which they had before. In other words, the gear-wheel 54, which is the power-gear in operating the condenser-cylinders, is given a central direction of rotation whatever the direction of the movement of the reciprocating carriage.

Upon the spindle of the condenser-cylinder $T^2$ is mounted on one side the gear-wheel 57 and on the other side the gear-wheel 58. The gear-wheel 59 is mounted upon the spindle of the other condenser-cylinder, $T^3$, and meshes with the gear-wheel 58. In this manner the central rotation of both of the condenser-cylinders is effected by simply rotating the gear-wheel 57.

The gear-wheel 54, which, as before stated, is driven in a central direction of rotation, is thrown into and out of gear with the gear-wheel 57 by the movable gear-wheel 60, mounted upon a pivoted arm 60', supported by the shaft 52. The radial movement of the gear-wheel 60 is limited by suitable stops. When this gear-wheel is in its upper position, the condenser-cylinders are driven. When it is in its lower position, the condenser-cylinders are stationary.

The trip mechanism by which the position of the movable gear-wheel 60 is determined will be hereinafter described; but it may be here stated that the action is effected by throwing up and down the trolley-bar W, which is movably mounted in the machine-frame and between the bars of which runs the trolley-wheel W'. The trolley-wheel W' is mounted upon an extension of the same pin which bears the gear-wheel 60. It will be understood that the trolley-wheel and gearing-pinion reciprocate with the remainder of the condenser, while the operating-bar, being fixed in the machine-frame, is stationary.

To operate the condenser-cylinders, it is also necessary to operate the batter-rolls $T^4$. It is further necessary, in order to secure the best results, to rotate these rolls so that their peripheral speed will be slightly greater than that of the feed-rolls. This I accomplish by placing on the spindles which bear the batter-rolls gear-wheels 64 and 65, which mesh with one another. The gear-wheels are driven by the pinion 66, mounted upon the shaft 67 and itself actuated through the pinion 68 on the other end of the shaft 67 by the gear-wheel 56. In this manner any actuation of the condenser-cylinders results in a corresponding movement of the batter-rolls, and the size of the gears and pinions has been so chosen that these rolls rotate with the desired peripheral speed.

To the lower portion of the condenser-frame T, central of the same, I attach the feeder-flume U, which is pivoted, as shown, near its center, and is adapted to convey the cotton from the batter-rolls to the feed-rolls, by which the cotton is conveyed directly to the baling operation.

VI. *Folder*.

The necessity for the use of what I term a "folder" arises from the tendency of the pressure-rolls to roll back the ends of the layers of cotton and cause the ends of the finished bale to present a rough and uneven appearance. This action must be prevented if a perfectly finished and complete bale is produced, and I accomplish this result in the following manner:

On the inner surface of the ends of the track-beams D and D' at each side of the follower I form downwardly-projecting lugs $d'$, through which I pass rivets $d^2$ to hold in pivotal position the "folder-plates" or "folders," V, as they will be indefinitely termed. These folder-plates extend entirely across the machine and have a pivotal movement limited in its downward direction by the recessed ends $d$ of the track-beams D and D', upon which they rest when the follower is down, and in the upward direction by the pressure-rolls G. The follower, when in its raised position, lies between the two track-sections with its ends projecting into the sections nearly the length of the recessed or cut-away portions $d$, and with its upper surface level with the upper surface of the track-sections. The ends of the follower are recessed, as shown at $f'$, to correspond with the recessed portions of the track-beams, so that the folder rests upon the recessed portions of the follower, or the piece of bagging laid thereon, when the follower is in its upper position. The recesses mentioned are of a depth equal to the thickness of the folder-plates, so that when in their lower position the folder-plates form a portion of the track upon which the pressure-rolls operate. This is true whether the press is empty or whether a bale is being formed, for if a bale is being formed the cotton at the end of the bale will be compressed slightly greater than that in the remainder of the bale, to allow for the passage of the pressure-rolls over the upper surface of the folder.

At their ends the folder-plates are cut away, as shown at V', to permit the operation of the lugs on the inner surface of the carriage-frame, which act to raise the same and to afford clearance for the side bars and grating, which, in the reciprocation of the carriage, pass between the shouldered ends of the folder-plates and the frame.

In their operation the folder-plates must be caused to rise when the feed-opening in the carriage is traveling toward them, in order that the end of the layer of cotton may be placed in position, and to fall with the return movement of the carriage, in order that the pressure-rolls may pass over them and cause them to bite into the end of the layer of cotton and hold it so firmly that it cannot slip.

The rise of the folder-plate is accomplished by the inclined-faced lugs $V^2$, which are bolted to the inner surface of the inner carriage-frame, so that the centers of the lugs are in a line passed through the center of the feed-opening. The lugs are made in two sections and are slightly adjustable, so that they may be changed in position to take up the wear of the working parts. The outer faces of the lugs are curved in such a manner that when the lugs strike the rounded ends of the cut-away portions V' of the folder-plates the plate will be caused to rise until when the travel of the carriage ends they are in their extreme raised position, just clearing the under surface of the feeder-rolls J.

When the return movement of the carriage commences, the first pressure-roll which comes in contact with the folder-plates causes them to fall and strike the surface of the cotton. The pressure-rolls then pass over the folder-plates, they forming a portion of the track upon which the rolls move until the return movement of the carriage takes place and the plates are raised. Thus the folder-plates are caused to rise and fall alternately. Their action is positive and certain, and effectually prevents any slipping of the end portions of the layers which form the bale. Owing to the width of the recesses cut in the surface of the follower, the bagging which is placed upon the surface of the follower is not cut or injured during the first few actuations of the folder-plates before cotton has gathered on the face of the follower. The movement of the carriage is so adjusted that the cotton-feed rolls are caused to travel a little beyond the ends of the follower, so that sufficient cotton will be provided to make square ends to the layers.

VII. *Bagging-Carrier.*

I place the bagging, which is to cover the bottom and sides of the bale, upon the follower-block before it is raised in position for the formation of a bale. It is necessary, however, to provide means for feeding a layer of bagging over the top surface of the bale after the operation of the condenser has been stopped and before the grating which forms the upper removable bale-cover has been released. This strip of bagging could not be placed in position after the compressed bale is removed from the press. To accomplish this result (see Figs. 7, 9, 25, and 26) I support above the spindles of the antifriction-rolls H on the inside of the frame of the carriage, by means of inwardly-projecting lugs $x$, tracks $X'$ and $X^2$. These tracks extend from the end of the carriage distant from the reciprocator to the center of the antifriction-roll on which is keyed the pinion 4, which, as stated, when considering the pressure-rolls and operative carriage therefor, acts to operate the bagging-carrier. Upon the tracks $X'$ and $X^2$ runs the bagging-carrier X, such carrier consisting of a flat central plate, $X^3$, the width of the strip of bagging which it is desired to run into the machine, and two vertical sides $X^4$ and $X^5$. On the lower surface of the slides are placed rollers $X^7$, which run on the tracks $X'$ and $X^2$. The plate $X^3$ is further provided with an opening $x^3$ at one end, so that the carrier can be readily withdrawn from the machine. Springs $X^{12}$ prevent the carriage from springing up while in operation.

At the front end of the bagging-carrier two rollers $X^8$ and $X^9$ are journaled, the roller $X^8$ being journaled in fixed bearings in the sides $X^4$ and $X^5$ of the carrier-frame and having keyed to its shaft the gear-wheel $x^8$, and is rotated through the engagement of the gear-wheel $x^8$ with the pinion 4 upon the spindle $h'$ of the central antifriction-roll, and the roller $X^9$ being forced by spring-pressure against the periphery of the roller $X^8$ and rotated by frictional contact therewith. The diameter of roller $X^9$ is further made less than that of the roller $X^8$, so as to permit proper feeding of the strip of bagging.

From the side $X^5$ of the carrier-frame projects the pin $x^5$, which is adapted to be engaged by the downwardly-projecting arm 90 of the trigger 81.

The operation of the bagging-carrier is so closely allied with the operation of the trip mechanism, which is next to be described, that I will defer a statement of the same until the form and operation of the trigger 81 is considered in detail. I wish here to state, however, that in placing the bagging in position on the carrier I provide for the uniform feed of the bagging to the upper surface of the bale by attaching the end of the bagging which feeds into the press last by spring-clasps to guide-rod $X^{10}$, which guide-rod runs in grooves on the sides of the carrier, but is normally held at the outer end of the carrier by the springs $X^{11}$. As the bagging feeds forward into the machine, it draws the guide X¹⁰ forward until nearly all of the bagging has been fed to the surface of the bale. At this point the guide X¹⁰ reaches the end of its travel, strikes the end of the groove in which its slides, and frees itself from the bagging. A uniform speed of travel of bagging is thus insured and its proper placing on the upper surface of the bale.

VIII. *Trip Mechanism.*

In the starting and stopping of my press certain operations have to be performed automatically in order that the parts may act in the proper manner.

The mechanism by which the various operations are performed I have classified under the general head of "trip mechanism."

It is necessary in stopping the press to first stop the operation of the condenser, in order that the cotton may not be fed to the feed-rolls while the same are not rotating, and thus clog the machine; second, to bring the bagging-carriage into position for active service after the condenser has been stopped and before the movement of the operative carriage has entirely ceased, in order that a layer of bagging may be placed over the top surface of the bale before the grating which forms the upper removable bale-surface is released from its retaining-hooks; third, to release the carriage from the reciprocator, in order that the carriage may remain stationary while a bale is being discharged, and at such a time that the grating M may be over the bale which has been formed, and, fourth, to release the grating which forms the upper removable bale-surface. It is further necessary to perform these operations at specified times. Thus it is necessary first of all to stop the condenser, and thus stop the feeding of the cotton. Then it is necessary to start the bagging-feed in time to have the end of the strip of bagging fed to the top surface of the bale before the carriage commences its last movement across the surface of the follower. Lastly, when these operations have been performed it is necessary to release the carriage from the reciprocator and release the grating from its retaining-hooks. It is further necessary to provide means for placing all of the parts thus moved into operative position again when the follower-block has been raised to commence the formation of a fresh bale.

In my press, (referring especially to Figs. 26 to 29 of the drawings,) on the inner surface of one of the main columns A² of the machine I form the bearings for a short shaft 70. This shaft projects toward the center of the machine, just above the cross-beam A⁹. Keyed to this shaft are two parts, viz: the trigger 71, one end of which, 71′, is weighted, and the other end of which, 71², is finger-shaped and projects into the line of travel of the follower, and the short lever 72, which has journaled in its upper end a roller 72′. These parts are keyed to the shaft in such position that when the weighted arm 71 is level, with its finger end projecting into the path of the follower, the short lever is perpendicular, or rather slightly inclined toward the weighted end of the trigger 71. The roller 72′ is intended to travel against the under surface of the arm 73, formed, as shown, with a lower straight portion, 73′, and an upper inclined portion, 73², which arm is keyed to the operating-rod 74. The operating-rod 74 is supported in a vertical position close to the main column by guides 74′, which are brackets projecting from the column. It is formed of two portions, a lower portion, 74², and an upper portion, 74³, the two portions being connected together with a hinge-bearing, so as to allow the upper portion, 74³, to swing, while the lower portion, 74², has only a vertical movement. The upper end of the upper portion, 74³, of the operating-rod 74 is pivotally attached to one end of the lever 76, which is mounted upon the short shaft 76′. Upon shaft 76′ is also mounted a lever-arm 77, (levers 76 and 77 practically forming a bell-crank lever,) to a boss on the outer end of which is firmly attached one end of the trolley-bar W, which hangs inside the pressure-beam and is supported at the other end by the lever-arm 79. The trolley-bar may be in the form of a single bar, upon the upper surface of which runs the trolley-wheel W′, but I prefer to form the same, as shown, with an upper and a lower bar, between which the trolley-wheel runs, as in this manner a more uniform operation of the parts is insured. It will be seen that should the trigger 71 be depressed by the downward movement of the follower, and the lever 72 be turned so that the roller 72′ would travel in the inclined portion 73² of its track 73, thus allowing the vertical operating-rod 74 to fall, the trolley-bar W would also fall, swinging in its bell-crank supports. When the trolley-bar falls the trolley-wheel must fall also. This throws the gearing-pinion 54 out of mesh with the gear-wheel 57 and thus stops the operation of the condenser, although the gearing-pinion will still continue to rotate as long as the operative carriage moves and actuates the gear-wheel 54. The first of the operations to be performed—namely, the stopping of the condenser—is thus accomplished.

I shall now describe the trip mechanism by the action of which the feeding of the bagging across the upper surface of the bale is accomplished.

Upon the surface of the trolley-rod nearest the pressure-beam the trigger 80 is pivoted. This trigger is provided with stops 80′ and 80² to limit its movement, and is formed on the side toward the reciprocator with an inclined or beveled face 80³ and on the other side with a straight face 80⁴. The pivotal movement of the trigger is upward and away from the reciprocator, but when resting vertically with the face 80³ resting against the stop 80′ it can have no movement toward the reciprocator.

To the frame T' of the condenser, at the end thereof which is distant from the reciprocator, and between two of the supports 51, is pivoted the trigger 81. This trigger has three arms, all of which have definite functions to perform. It has an upper arm, 82, (see Fig. 29,) which normally extends upward in the path of the trigger 80, an upper arm, 83, which is provided with a bearing-face 83', which when in operative position is perpendicular, and a lower arm, 90, which has a U-shaped opening in its lower end and clasps the outwardly-extending stud $x^5$ which projects from the face of the bagging-carrier. The trigger 81 has three operative positions. It has an upright position, with the arm 82 perpendicular to the frame, an inclined position with the bearing-face 83' perpendicular to the frame, and it can be thrown over so as to permit the removal of the bagging-carrier. It is actuated by the trigger 80 in a manner which will be hereinafter described, and it is held in its operative positions by a pointed spring-pressed head 81', which presses into suitable depressions to define the operative positions of the trigger. The trigger 81 is actuated by the trigger 80 in a manner which will be hereinafter explained, so as to bring the bagging-carrier into operative position after the operation of the condenser has ceased. In the pressure-beam is also journaled the pin 84', whose location is determined by considerations which will presently be stated, and which bears on the inner surface of the pressure-beam the lever 84 and on the outer surface a spring-pressed hook 85.

The hook 85 when in operative position serves to hold up the swinging end of the push-bar 86, which is pivoted at one end, 86', to the pressure-beam, and is limited in its movement by a slotted lever 86² at the other end, so that when engaged by the hook 85 it is out of the way of the operative mechanism. When the hook 85 is withdrawn and the push-bar 86 allowed to fall, its end 86³ turns the shaft 7, withdraws the connecting-hook 6 from the drawhead of the reciprocator, thus releasing the reciprocator from the operative carriage and also throwing outward the hooked lever 10, thus releasing the grating.

Considering now the operation of the press, when the follower has receded from the pressure-rolls sufficiently to allow the formation of a bale of the desired thickness, the lower surface of the follower (or an adjustable stop attached thereto, which renders possible the formation of bales of varying thickness and therefore weight, as shown in dotted lines at 100 in Fig. 27) strikes the finger-end of the trigger 71 and depresses the same until the roller 72' has traveled over the straight bearing portion of its track 73 and reaches the inclined portion of its travel. The weight of the operating-rod 74 now acts, and, throwing the trigger 71 downward, the operating-rod falls, thus causing the trolley-bar to fall and releasing the pinion 54 from engagement with the gear-wheel 57. The operation of the condenser is thereby stopped. This takes place whatever the position of the pressure-rolls, as the trolley-wheel W', running upon the trolley-bar W, normally holds the pinion 54 in mesh with the gear-wheel 57 and thus transmits power to the condenser. The condenser being stopped the feed of the cotton to the press at once ceases.

Supposing the carriage to be moving away from the reciprocator, no further actuation of the trip mechanism takes place until the arm 82 of the trigger 81 strikes the trigger 80, when the carriage is moving toward the reciprocator. This causes the trigger 81 to move in its bearing into its second operative position, with the bearing-face of the arm 83 in position for action; also, as a consequence of the engagement of the lower arm 90 with the outwardly-extending arm $x^5$ of the bagging-carrier, the bagging-carrier is moved forward into gear and the bagging begins to be fed forward between the two bagging-rolls $X^8$ and $X^9$. The position of the trigger 80 is such that the further movement of the carriage to the end of its travel is just sufficient to insure sufficient forward feed of the bagging to cause the end of the bagging to pass between the feed-rolls J onward to the surface of the cotton-bale, where it is caught and held by the folder. The travel of the carriage is such that the feed-rolls are caused to pass a short distance beyond the ends of the follower, so that the ends of the layers of cotton may be turned squarely on the edge of the follower. This action permits the end of the bagging to be firmly caught and held by the folder. In the further movement of the carriage, after actuating the bagging-carrier, as the carriage reaches its extreme movement the arm 83 of the lever 81 strikes the lever 84 and thus withdraws the pivoted hook 85 from engagement with the push-bar 86 and allows the push-bar to fall into operative position. The backward movement of the carriage away from the power end of the machine now takes place and the bagging is fed by the feed-rolls across the top surface of the bale. As the carriage reaches the extreme limit of its travel, the arm 82 of the trigger 81 strikes the lug 98, formed on the trolley-bar, and the trigger is thrown into upright position, the bagging mechanism being thrown out of gear.

As the carriage completes its travel with the grating directly over the bale, the end 86³ of the lever 86 comes into contact with the notched end 8' of the lever 8, turns the shaft, and withdraws the connecting-hook from the draw-head of the reciprocator, thus releasing the reciprocator from the carriage, and also throwing outward the lever 10 and releasing the grating from the hooks which had held it in position. The holding-rods 45 may now be applied to the bale, thus holding it in position and preventing it from expansion while the bale-ties are being put in place. The follower-block may be allowed to fall by throwing out of gear the pinion $O^6$ upon the escapement-shaft, and the bale may be removed from the machine, another bale-truck being thereby drawn into position below the follower-support with a new follower in position thereon. This operation takes place automatically by the action of gravity, as a result of the construction of the bale-truck earlier described. In order to bring these parts into condition for operation again, it is necessary to provide means for raising the push-bar out of engagement with the notched end 8' of the lever 8, and also for throwing the condenser into operation. The bagging mechanism has already been disengaged, and therefore needs no further attention. I also wish to provide means for automatically throwing the escapement-pinion $O^6$ into gear when the follower has reached its extreme upward position. These actions I accomplish in the following manner:

Across the machine, between the main columns $A^2$ and at about the height of the extreme upward movement of the follower-guide, is placed the trolley lift-lever 99. (See Figs. 24 and 26.) This lever is pivoted to the machine-frame at one end and at the other end is provided with a U-shaped mouth, which passes around the vertical operating-rod 74, and is held between the joint at rod 74 and the boss $74^5$. When the follower is raised to its upper position, the follower-guide strikes this lever, which has been inclined downward with the fall of the vertical rods and raises the same, thereby also raising the vertical operating-rod 74 and allowing the weighted end 71' of the weighted lever 71 to operate and raise the lever 73 into a position where the roller 73' bears against the extreme end of the straight portion of its track. It also raises the trolley-bar, restoring the connection with the condenser. The rise of the trolley-bar lifts the free end of the push-bar 86 and allows the connecting-hook 6 to engage with the draw-head of the reciprocator at its next inward reciprocation. The spring-pressed hook 85 holds the push-bar in its raised position until it is again withdrawn. With the actuation of the carriage the condenser begins to operate and the formation of a new bale begins.

To automatically throw the pinion $O^6$ into gear with the gear-wheel $O^5$, and thus to bring into operation again the escapement mechanism, I make use of the following trip device: Attention is called to Figs. 17, 19, 20 and 30 of the drawings. On the lower surface of the cross-beam $A^{10}$, I form a bearing for the shaft 91, upon which are mounted the two levers 92 and 93. The lever 92 is so placed that the pin 92', which projects from its end, is in the line of motion of the pin $f^{11}$, which projects from the bar $f^{10}$, attached to the follower-guide on this side of the machine. The outer end of lever-arm 93 is connected by the rod 94 with the pin $O^{18}$, which projects from the spring-pressed pawl $O^{16}$, engaging with the notched quadrant $O^{17}$. The lever $O^{15}$, upon which the spring-pressed pawl $O^{16}$ is placed, is keyed to a shaft 95, and except when held outward by the engagement of the spring-pressed pawl with the notched quadrant is held in its inner position with the escapement-pinion $O^6$ in gear with the gear-wheel $O^5$ through the action of the weighted arm 96. When now the follower rises, as it reaches its extreme upward travel, the projecting pin $f^{11}$ of the follower-guide strikes the pin 92', formed on the lever 92, and depressing the lever 93, withdraws the spring-pressed pawl $O^{16}$ from engagement with the notched quadrant $O^{17}$ and thereby allows the weight 96 to exert its influence and cause the escapement-pinion to be thrown into gear again with the remainder of the train of gears connected with the mechanism which controls the receding movement of the follower.

IX. *The Operation of the Machine.*

Prior to the consideration of the actual operation of my press it will be advantageous to consider the position of the parts of the same when the press is at rest and before power has been applied thereto. When the press is empty the operative carriage C, in which the pressure-rolls are supported, is at the end of its travel distant from the power end of the machine. The reciprocator may or may not be in contact therewith, but probably will not be in contact because its reciprocating movement is independent of the carriage, except when the connecting-hook 6 connects the draw-heads of the carriage and of the reciprocator, and in any case the reciprocator is not connected to the carriage, because, when the press is standing idle, the connecting-hook 6 is not in position to engage with the draw-head of the reciprocator, as it is held in its lower position by the engagement of the push-bar 86 with the notched end 8' of the lever 8. The follower F is in its extreme lower position resting upon the truck R. This truck is prevented from being drawn from under the follower-support N by one of the stops 48. The follower-support N is itself directly under the follower and in readiness to rise and carry the same, with the grating M which rests thereupon, to its upper position. The friction-wheels P' and $P^2$ are out of engagement and the escapement mechanism is also out of connection with the train of gears which controls the movement of the follower-support by reason of the escapement-pinion $O^6$ being out of gear with the gear-wheel $O^5$. The trolley-rod W is down, the pinion 54 out of engagement with the gear-wheel 57, and the condenser therefor, not in operation. The bagging carrier is also out of operative position.

To start the machine and prepare the same for the formation of a bale, it is necessary—

First, to place a strip of bagging over the follower sufficient to cover the bottom and sides of the bale to be formed, and to further place a strip of bagging in position on the bagging-carrier which is large enough to serve as a covering for the upper surface of the bale which is to be formed.

Second, to apply power to the machine through the power-pulley 16, and thus to commence the reciprocation of the reciprocator. The movement of the reciprocator being entirely independent of that of any other portion of the machine, its backward and forward movement commences as soon as power is applied thereto, and continues without interruption.

Third, to throw the friction-wheels P' and P² into engagement by pulling one of the handle-bars P⁴ into the proper position. This will result in the rising of the follower into its upper position, so that it just escapes contact with the lower surface of the pressure-rolls and also in the carrying upward of the grating M into position to be engaged by the hooks 10⁵. As a further consequence of the rise of the follower, the trolley lift-lever 99 is raised, and thereby the trolley-rod W is raised so that the trolley-wheel W' is moved upward, and thereby the pivoted movable gear-wheel 60, thus restoring the connection between gear-wheels 54 and 57 and arranging for the operation of the condenser when the movement of the carriage C commences. The lever 72 is turned through the influence of the weighted trigger 71 as the trolley-bar is raised, so that the roller 72', which is journaled in its outer end, travels in the straight portion 73' of its track, thus holding the vertical operating-rod 74 in its upper position and preventing the trolley-rod falling until proper actuation of the trip mechanism. As the follower reaches its upper position it further causes the projecting pin $f^{11}$, which is attached thereto, to contact with the pin 92' formed on the lever 92, and thereby withdraw the spring-pressed pawl O¹⁶ from engagement with the notched quadrant O¹⁷, thus allowing the weight 96 to turn the shaft 95 and to place the escapement-pinion O⁶ in gear with the gear-wheel O⁵. Thus when the follower is in its upper position all of the parts of the press are automatically caused to assume a position ready for instant operation. The rise of the trolley-rod W causes the push-bar 86 to be drawn upward and freed from engagement with the notched end of the lever 8, thus permitting the connecting-hook 6 to be drawn upward by the spring 8². The push-bar is held in its upper position by the engagement therewith of the spring-pressed hook 85. When, now, the reciprocator reaches the limit of its movement toward the carriage, it will strike the connecting-hook 6, and the same will act to connect the reciprocator with the carriage. As the reciprocating movement of the carriage commences, the condenser T, the batter-rolls T⁴ and the feed-rolls J commence their respective operations in readiness for the feed thereto of cotton through the telescopic supply-pipe S.

The folders V rise and fall as the feed-opening approaches and recedes from the same, such folder-plates serving as a track for the pressure-rolls, except for the instant of time when they are raised by the lugs V² when the feed-rolls are over the same. The follower remains in its upper position until the feeding of cotton to the press begins, as its downward movement is caused solely by the pressure of the cotton which is formed in layers thereupon. As cotton is fed to the press through the telescopic supply-pipe S it is formed into a bat of a suitable thickness by the condenser-rolls T' and T², and is passed between the batter-rolls T⁴ through the flume U and between the feed-rolls J until it reaches the surface of the follower. The cotton, which is now in the form of a bat, is folded in layers upon the surface of the follower by the action of the pressure-rolls, which constitute a moving but practically-continuous pressure-transmitter. The first few layers of cotton will expand into the grooves formed on the upper surface of the follower, so that they will be held securely in position and be prevented from slipping. The ends of the layers will be held square and even through the action of the folders V, the active operation of which begins with the formation of the first layer of cotton. As soon as the thickness of the cotton upon the surface of the follower becomes sufficient to exert the desired pressure upon the follower, the follower recedes the distance permitted by one actuation of the escapement-wheel O⁷, and thus is relieved from the excess of the pressure thereupon. In my present construction two complete reciprocations of the operative carriage generally result in a single movement of the escapement-wheel and the consequent downward step-by-step movement of the follower, though of course this arrangement may be varied at will. As the thickness of the layers of cotton upon the surface of the follower increases, the follower continues to recede, the escapement-levers O⁸ being actuated alternately and preventing any sudden or extreme downward movement of the follower. When the thickness of the layers of cotton upon the follower equals that of the bale which it is desired to form, the end surface of the follower or a pin attached thereto comes into contact with the finger-shaped end 71² of the trigger 71 and causes the roller 72', which is journaled on the upper end of the short lever 72, to move over the straight portion of its travel until it reaches the inclined portion 73² of its travel. When this point is reached the weight of the operative rod 74 asserts itself and the operative rod falls, thereby causing the trolley-bar W to fall and release the pinion 54 from engagement with the gear-wheel 57. The operation of the condenser at once ceases. As the carriage continues its movement the arm 82 of the trigger 81 strikes the trigger 80, thereby causing the bagging-carrier to be thrown into operative position. The feeding of the bagging into the machine at once commences, but is only sufficient to insure sufficient forward feeding of the bagging into the machine to cause the end of the bagging to pass between the feed-rolls J onward to the surface of the bale and to be there caught and held by the folder V before the final backward reciprocation of the carriage commences.

Just before the carriage completes its reciprocation toward the power end of the machine the arm 83 of the lever 81, which has been moved into operative position by the striking of the trigger 81 against the trigger 80, strikes the lever 84 and thus withdraws the pivoted spring-pressed hook 85 from engagement with the push-bar 86 and allows the push-bar to fall into operative position. As the backward movement of the carriage now commences, the strip of bagging which is to serve as a covering for the upper surface of the bale is fed across the upper surface of the same until it is completely in position. At this moment of time the operative carriage has reached its extreme backward movement, and the push-bar 86, striking the notched end 8' of the lever 8, withdraws the connecting-hook 6 from connection with the draw-head of the reciprocator and allows the carriage to remain stationary, although the reciprocator continues its movement. At the end of this last movement of the carriage the bagging-carrier X is thrown out of operative position by the arm 82 of the trigger 81 striking the lug 98 formed on the trolley-bar. The movement of the operative carriage C is thus stopped when that end of the same in which is held the grating M is over the completed bale. By the same movement of the shaft upon which the hook 6 is mounted which causes said connecting-hook to be withdrawn from engagement with the draw-head of the reciprocator the hooks $10^5$, which have hitherto held the grating in position, are withdrawn and the grating freed from its support. The holding-rods 45 may now be put in place, connecting the grating with the follower and preventing expansion of the bale when pressure is removed therefrom. The bale being now completely formed and held from expansion, the escapement mechanism may be thrown out of gear by movement of one of the handle-bars $O^{15}$ and the follower-support allowed to fall into its lowest position. When such lowest position is reached, the follower F rests not upon its support, but upon the truck R, the dowel-pins $f^6$ holding said follower in position thereon. The weight of the bale upon the truck more than overcomes the pull exerted by the idle truck, and the follower with the bale thereupon at once rolls out of position under the machine to the limit of travel provided by the inclined tracks R', thereby drawing the heretofore idle truck, with the follower and grating in position thereupon, into position for the raising of the follower. The tying of the bale may now be completed at leisure, and the follower may be raised into position under the pressure-rolls in the manner heretofore described.

It is evident that many changes in construction may be made in the press which I have thus described without departing from the spirit and scope of my invention, and that many of the mechanical movements of which I make use may be with advantage adopted in other and widely-varying types and classes of machines, so that I do not restrict myself to the precise details of construction shown, nor to the use of the novel mechanical movements herein described in connection with cotton-presses.

I do not in this application claim the reciprocator, as that is claimed in a separate application for Letters Patent filed January 27, 1896, Serial No. 577,025; nor do I claim the condenser or the method of feeding cotton to the same, as these matters are claimed in a separate application for Letters Patent filed by A. S. Gooch on February 6, 1896, Serial No. 578,297; but What I do claim as new, and desire to secure by Letters Patent, is—

1. The combination with opposed surfaces, of intermediate revoluble bodies held by contact with said surfaces with their centers in a line normal thereto, and means for moving said revoluble bodies longitudinally, substantially as described.

2. The combination with opposed surfaces, of intermediate rolls held in contact by said surfaces with their centers in a line normal thereto, and means for moving said rolls longitudinally, substantially as described.

3. The combination with opposed surfaces, of intermediate series of contacting rolls, the corresponding rolls of said series having their centers held in normal line by said surfaces, and means for moving said rolls longitudinally, substantially as described.

4. The combination with a suitable track, of a carriage provided with contacting series of rolls one above the other, and means for moving said carriage longitudinally, substantially as described.

5. In a press for baling cotton and other fibrous materials, the combination with fixed and receding pressure-surfaces, of a carriage provided with contacting series of rolls one above the other, and means for reciprocating said carriage between said pressure-surfaces, substantially as described.

6. In a press for baling cotton and other fibrous materials, the combination with an upper fixed surface and a lower receding surface, of a carriage supporting a series of pressure-rolls, a series of antifriction-rolls in contact therewith, and means for reciprocating said carriage between said pressure-surfaces, substantially as described.

7. In a press for baling cotton and other fibrous materials, the combination with an upper fixed surface and a lower receding surface, of a carriage, provided with a cotton-feed opening, supporting contacting series of pressure-rolls and antifriction-rolls, and means for reciprocating said carriage between said pressure-surfaces, substantially as described.

8. In a press for baling cotton and other fibrous materials, the combination with an upper pressure-surface, a lower pressure-surface, and means for permitting said lower pressure-surface to recede as a bale is formed thereon, of a carriage having a cotton-feed opening and supporting a series of pressure-rolls and a series of antifriction-rolls, the corresponding rolls of said series having their centers held in normal line by said surfaces, and mechanism for reciprocating said carriage between said pressure-surfaces, substantially as described.

9. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the rolls in the respective series being held one above the other with their centers when between the pressure-surfaces in lines normal to the same, track-sections for the pressure-rolls beyond the pressure-surfaces, and mechanism for reciprocating said carriage between said pressure-surfaces, substantially as described.

10. In a press for baling cotton and other fibrous materials, the combination with an upper pressure-surface, a follower constituting a lower pressure-surface, and mechanism for permitting said follower to recede as a bale is formed thereon, of a carriage supporting contacting series of pressure-rolls and antifriction-rolls, the corresponding rolls of said series having their centers held in normal line by said surfaces, track-sections for the pressure-rolls outside of the pressure-surfaces, means for causing the pressure-rolls to rotate throughout their movement, and mechanism for reciprocating said carriage between said pressure-surfaces, substantially as described.

11. In a press for baling cotton and other fibrous materials, the combination with an upper pressure-surface, a follower constituting a lower pressure-surface, and means for permitting said follower to recede as a bale is formed thereon, of a carriage having a central feed opening and supporting contacting series of pressure-rolls and antifriction-rolls, the corresponding rolls of said series having their centers held in normal line by said surfaces, track-sections for the pressure-rolls beyond the pressure-surfaces, rack-bars extending lengthwise of the machine on either side thereof, pinions on the pressure-rolls meshing with said rack-bars, and mechanism for reciprocating said carriage between said pressure-surfaces, substantially as described.

12. In a press for baling cotton and other fibrous materials, the combination with a follower constituting a lower pressure-surface, mechanism for permitting the same to recede as a bale is formed thereon, and beams, of length greater than the length of the follower, supported over the same and constituting an upper pressure-surface, of a carriage supporting contacting series of pressure-rolls and antifriction-rolls, the corresponding rolls of said series having their centers held in normal line by said surfaces, track-sections for the pressure-rolls beyond the pressure-surfaces, and mechanism for reciprocating said carriage between said pressure-surfaces, substantially as described.

13. In a press for baling cotton and other fibrous materials, the combination with a follower constituting a lower pressure-surface, means for permitting the same to recede as a bale is formed thereon, and beams, of length greater than the length of the follower, supported over the same and constituting an upper pressure-surface, of a carriage supporting contacting series of pressure-rolls and antifriction-rolls, the corresponding rolls of said series having their centers held in normal line by said surfaces, track-sections for the pressure-rolls beyond the pressure-surfaces, mechanism for causing the pressure-rolls to rotate throughout their movement, and mechanism for reciprocating said carriage between said pressure-surfaces, substantially as described.

14. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the rolls in the respective series being held one above the other with their centers, when between the pressure-surfaces, in lines normal to the same, a feed-opening central of the carriage, feed-rolls mounted therein, means for causing said rolls to rotate centrally, track-sections for the pressure-rolls outside of the pressure-surfaces, and mechanism for reciprocating said carriage between said pressure-surfaces, substantially as described.

15. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the corresponding rolls of said series having their centers held in normal line by said surfaces, a feed-opening on the carriage, feed-rolls mounted therein, means for causing said rolls to rotate centrally, means for preventing crowding of cotton between said rolls and the adjacent pressure-rolls, track-sections for the pressure-rolls beyond the pressure-surfaces, and means for reciprocating said carriage between the pressure-surfaces, substantially as described.

16. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the rolls in the respective series being held one above the other with their centers, when between the pressure-surfaces, in lines normal to the same, a feed-opening central of the carriage, feed-rolls mounted therein, said rolls being geared together, ratchet connection of the feed-rolls on opposite sides of the carriage with the pressure-rolls, whereby rotation of said rolls in the same direction is secured, track-sections for the pressure-rolls outside the pressure-surfaces, and mechanism for reciprocating said carriage between the pressure-surfaces, substantially as described.

17. The combination with a series of parallel rolls mounted in suitable bearings, and means for rotating the same, of disks journaled between said rolls with their centers in line with the centers of the rolls, the peripheries of the disks and of the rolls contacting, whereby lateral friction of said rolls in their bearings is prevented, substantially as described.

18. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the corresponding rolls of said series having their centers held in normal line by said surfaces, means for preventing lateral friction of said pressure-rolls in their bearings, track-sections for the pressure-rolls outside the pressure-surfaces, and means for reciprocating said carriage between said pressure-surfaces, substantially as described.

19. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the rolls in the respective series being held one above the other with their centers when between the pressure-surfaces in lines normal to the same, disks journaled between the bearing portions of the pressure-rolls with their centers in line with the centers thereof, the peripheries of the rolls and of the disks contacting, track-sections for the pressure-rolls beyond the pressure-surfaces, and means for reciprocating said carriage between said pressure-surfaces, substantially as described.

20. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the rolls in the respective series being held one above the other with their centers, when between the pressure-surfaces, in lines normal to the same, disks journaled between the bearing portions of the pressure-rolls with their centers in line with the centers thereof, the peripheries of the rolls and of the disks contacting, a feed-opening central of the carriage, track-sections for the pressure-rolls beyond the pressure-surfaces, rack-bars lengthwise of the machine on either side thereof, pinions on the pressure-rolls meshing with said rack-bars, and mechanism for reciprocating said carriage between the pressure-surfaces, substantially as described.

21. In a press for baling cotton and other fibrous materials, the combination with an upper pressure-surface, a follower constituting a lower pressure-surface, and means for permitting said follower to recede as a bale is formed thereon, of a carriage supporting contacting series of pressure-rolls and antifriction-rolls, the rolls in the respective series being held one above the other with their centers, when between the pressure-surfaces, in lines normal to the same, track-sections for the pressure-rolls not between the pressure-surfaces, rack-bars lengthwise of the machine on either side thereof, pinions on the pressure-rolls meshing with said rack-bars, guiding-disks on the carriage bearing against the inner side of the rack-bars, and mechanism for reciprocating said carriage between the pressure-surfaces, substantially as described.

22. In a press for baling cotton and other fibrous materials, the combination with fixed and receding pressure-surfaces, of an intermediate, reciprocating pressure-transmitter, actuating mechanism therefor, and a detachable coupling, connecting said pressure-transmitter and said actuating mechanism and adapted when a bale is completed to be disconnected, substantially as described.

23. In a press for baling cotton and other fibrous materials, the combination with fixed and receding pressure-surfaces, of an intermediate reciprocating pressure-transmitter, a reciprocator for actuating the same, means for operating said reciprocator, and a coupling connecting said pressure-transmitter and said reciprocator, substantially as described.

24. In a press for baling cotton and other fibrous materials, the combination with an upper pressure-surface, a follower constituting a lower pressure-surface, and means for permitting the same to recede as a bale is formed thereon, of an intermediate, reciprocating pressure-transmitter, actuating mechanism therefor, a coupling connecting said pressure-transmitter and said actuating mechanism, and mechanism operated by the follower for attaching and detaching said coupling device, substantially as described.

25. In a press for baling cotton and other fibrous materials, the combination with an upper pressure-surface, a follower constituting a lower pressure-surface, and means for permitting said follower to recede as a bale is formed thereon, of an intermediate reciprocating carriage supporting contacting series of rolls, mechanism for operating the same, a coupling connecting said carriage with said actuating mechanism, and mechanism actuated by the follower for attaching and detaching said coupling device, substantially as described.

26. In a press for baling cotton and other fibrous materials, the combination with beams constituting an upper pressure-surface, a follower constituting a lower pressure-surface, and means for permitting said follower to recede as a bale is formed thereon, of an intermediate, reciprocating carriage supporting contacting series of rolls, actuating mechanism therefor, a spring-controlled hook on said carriage for connecting the same with said actuating mechanism, a pivoted bar secured to one of said pressure-beams and adapted when in its lower position to disengage said connecting-hook, and mechanism actuated by the follower for operating said pivoted bar, substantially as described.

27. In a press for baling cotton and other fibrous materials, the combination with bale-forming mechanism and a condenser, of mechanism operated by the bale-forming mechanism for controlling the operation of the condenser, substantially as described.

28. In a press for baling cotton and other fibrous materials, the combination with fixed and receding pressure-surfaces, an intermediate reciprocating pressure-transmitter, and operating mechanism therefor, of a condenser, and mechanism operated by the receding pressure-surface for controlling the operation of the condenser, substantially as described.

29. In a press for baling cotton and other fibrous materials, the combination with fixed and receding pressure-surfaces, an intermediate reciprocating pressure-transmitter, and operating mechanism therefor, of a condenser stationed on said pressure-transmitter, and mechanism actuated by the movement of the pressure-transmitter for operating the same, substantially as described.

30. In a press for baling cotton and other fibrous materials, the combination with fixed and receding pressure-surfaces, an intermediate reciprocating pressure-transmitter, and operating mechanism therefor, of a condenser stationed on the pressure-transmitter, mechanism actuated by the movement of the pressure-transmitter for operating the same, and mechanism operated by the receding pressure-surface for controlling the operation of the condenser, substantially as described.

31. In a press for baling cotton and other fibrous materials, the combination with an upper pressure-surface, a follower constituting a lower pressure-surface, mechanism for permitting the same to recede as a bale is formed thereon, an intermediate reciprocating carriage provided with contacting series of rolls, and operating mechanism therefor, of a condenser stationed on said carriage, mechanism for operating the same, and mechanism actuated by the follower for controlling the operation of the condenser, substantially as described.

32. In a press for baling cotton and other fibrous materials, the combination with an upper pressure-surface, a follower constituting a lower pressure-surface, mechanism for permitting the same to recede as a bale is formed thereon, an intermediate reciprocating carriage supporting contacting series of pressure-rolls and antifriction-rolls, the corresponding rolls of said series being held in normal line by said surfaces, and mechanism for operating the same, of a condenser stationed on said carriage, mechanism actuated by the carriage for operating the condenser, and mechanism actuated by the follower for controlling the operation of the condenser, substantially as described.

33. In a press for baling cotton and other fibrous materials, the combination with fixed and receding pressure-surfaces, an intermediate reciprocating pressure-transmitter, and operating mechanism therefor, of a condenser stationed on said pressure-transmitter, an operative gear-wheel therefor, a suitably-supported gear-wheel distinct from the condenser, means for rotating said gear-wheel with the direction of passage of cotton into the press, and means for placing said gear-wheels in and out of connection, substantially as described.

34. In a press for baling cotton and other fibrous materials, the combination with an upper pressure-surface, a follower constituting a lower pressure-surface, means for permitting the follower to recede as a bale is formed thereon, an intermediate reciprocating pressure-transmitter, and operating mechanism therefor, of a condenser stationed on said pressure-transmitter, an operative gear-wheel therefor, a suitably-supported gear-wheel distinct from the condenser, means operated by the pressure-transmitter for rotating said gear-wheel with the direction of passage of cotton into the press, and means for placing said gear-wheels in or out of connection, substantially as described.

35. In a press for baling cotton and other fibrous materials, the combination with an upper pressure-surface, a follower constituting a lower pressure-surface, means for permitting the follower to recede as a bale is formed thereon, an intermediate reciprocating pressure-transmitter, and operating mechanism therefor, of a condenser stationed on the pressure-transmitter, an operative gear-wheel therefor, a suitably-supported gear-wheel distinct from the condenser, means operated by the pressure-transmitter for rotating said gear-wheel with the direction of passage of cotton into the press, a pivoted gear-wheel adapted to place said gear-wheels in or out of connection, and means for operating said pivoted gear-wheel, substantially as described.

36. In a press for baling cotton and other fibrous materials, the combination with a machine-frame, an upper pressure-surface, a follower constituting a lower pressure-surface, means for permitting said follower to recede as a bale is formed thereon, an intermediate reciprocating pressure-transmitter, and operative mechanism therefor, of a condenser stationed on the pressure-transmitter, an operative gear-wheel therefor, a suitably-supported gear-wheel distinct from the condenser, means operated by the pressure-transmitter for rotating said gear-wheel with the direction of passage of cotton into the press, a pivoted gear-wheel adapted to place said gear-wheels in or out of connection, a grooved disk secured to one face thereof, a track for said grooved disk pivotally supported in the machine-frame, and trip mechanism for raising and lowering said track, substantially as described.

37. The combination with a pivotally-mounted gear-wheel having a grooved disk secured to one face thereof, of a pivotally-mounted bar adapted to serve as a track for said grooved disk, and means for raising and lowering the same, substantially as described.

38. The combination with two gear-wheels, the peripheries of which are not in contact, of a pivoted gear-wheel adapted in one position to contact with the peripheries of both of said gear-wheels, a grooved disk secured to one face thereof, a pivotally-mounted bar adapted to serve as a track for said grooved disk, and means for raising and lowering the same, substantially as described.

39. In a press for baling cotton and other fibrous materials, the combination with an upper pressure-surface, a follower constituting a lower pressure-surface, means for permitting the same to recede as a bale is formed thereon, an intermediate reciprocating pressure-transmitter, and operative mechanism therefor, of a condenser stationed on the pressure-transmitter, mechanism for operating the same, batter-rolls operating in connection with the condenser-cylinders, and mechanism actuated by the movement of the carriage for operating said batter-rolls, substantially as described.

40. In a press for baling cotton and other fibrous materials, the combination with a follower, and mechanism for feeding cotton thereto and forming a bale thereupon, of rack-bars supporting said follower, pinions meshing with said rack-bars, and escapement mechanism for permitting rotation of said pinions when the pressure upon the surface of the follower exceeds a predetermined limit.

41. In a press for baling cotton and other fibrous materials, the combination with a follower and mechanism for feeding cotton thereto and forming a bale thereupon, of rack-bars supporting said follower, pinions meshing with said rack-bars, escapement mechanism for permitting rotation of said pinions when the pressure upon the surface of the follower exceeds a predetermined limit, thereby causing the descent of said follower, and mechanism for raising said follower, substantially as described.

42. In a press for baling cotton and other fibrous materials, the combination with a follower and means for feeding cotton thereto and forming a bale thereupon, of an escapement-wheel having V-shaped lugs projecting from both sides thereof, said lugs being staggered relative to each other, pivoted levers resting upon said lugs, and mechanism connecting said escapement-wheel with said follower, whereby downward movement of the follower can only take place by causing movement of said escapement-wheel, substantially as described.

43. In a press for baling cotton and other fibrous materials, the combination with a follower, and means for feeding cotton thereto and forming a bale thereupon, of an escapement-wheel mounted upon a suitable escapement-shaft, V-shaped lugs projecting from either side of said escapement-wheel, said lugs being staggered relative to each other, pivoted levers resting upon said V-shaped lugs, a pinion upon said escapement-shaft, rack-bars supporting said follower, pinions meshing with said rack-bars, and gears connecting said rack-bar pinions with said escapement-shaft pinion, whereby downward movement of the follower will only occur when the pressure upon its surface is sufficient to cause movement of the escapement-wheel, substantially as described.

44. In a press for baling cotton and other fibrous materials, the combination with a follower, and means for feeding cotton thereto and forming a bale thereupon, of escapement mechanism connected therewith for permitting downward movement of the follower when the pressure thereupon exceeds a predetermined amount, and means for throwing said escapement mechanism into and out of connection with said follower, substantially as described.

45. In a press for baling cotton and other fibrous materials, the combination with a follower, and means for feeding cotton thereto and forming a bale thereupon, of rack-bars extending downward from said follower, pinions meshing with said rack-bars, escapement mechanism for permitting rotation of said pinions when the pressure upon the surface of the follower exceeds a predetermined amount, and means for throwing said escapement mechanism out of gear with said pinions, substantially as described.

46. In a press for baling cotton and other fibrous materials, the combination with a follower, and means for feeding cotton thereto and forming a bale thereupon, of escapement mechanism connected therewith for permitting downward movement of the follower when the pressure thereupon exceeds a predetermined amount, normally-disengaged means for raising said follower, mechanism for actuating the same, and means for throwing said normally-disengaged means into operative position, substantially as described.

47. In a press for baling cotton and other fibrous materials, the combination with a follower and means for feeding cotton thereto and forming a bale thereupon, of escapement mechanism connected therewith for permitting downward movement of the follower when the pressure thereupon exceeds a predetermined amount, means for throwing said escapement mechanism into and out of connection with said follower, and means for raising said follower, substantailly as described.

48. In a press for baling cotton and other fibrous materials, the combination with a follower, and means for feeding cotton thereto and forming a bale thereupon, of escapement mechanism connected therewith for permitting downward movement of the follower when the pressure thereupon exceeds a predetermined amount, means for throwing said escapement mechanism into and out of connection with said follower, normally-disengaged friction-disks in connection with the follower for raising said follower into position, mechanism for actuating said disks, and means for throwing said disks into engagement, substantially as described.

49. In a press for baling cotton and other fibrous materials, the combination with a removable follower, means for feeding cotton thereto and forming a bale under pressure thereupon, and a support therefor, of escapement mechanism connected with said support for permitting downward movement of the follower when the pressure thereupon exceeds a predetermined amount, substantially as described.

50. In a press for baling cotton and other fibrous materials, the combination with a removable follower, means for feeding cotton thereto and forming a bale thereupon, and a support therefor, of escapement mechanism for permitting downward movement of said follower when the pressure thereupon exceeds a predetermined amount, and independent means for supporting the follower when in its lowest stage of movement, substantially as described.

51. In a press for baling cotton and other fibrous materials, the combination with a removable follower, means for feeding cotton thereto and forming a bale thereupon, and a support therefor, of escapement mechanism connected with said support for permitting downward movement of said follower when the pressure thereupon exceeds a predetermined amount, means for throwing said escapement mechanism out of engagement, and an independent movable support for sustaining said follower when in its lowest stage of movement, substantially as described.

52. In a press for baling cotton and other fibrous materials, the combination with a removable follower and means for feeding cotton thereto and forming a bale thereupon, of a support therefor, means for permitting said follower to recede when the pressure thereupon exceeds a predetermined amount, a truck adapted to hold said follower independent of its support when the same is in its lowest position, and a track on which said truck moves, substantially as described.

53. In a press for baling cotton and other fibrous materials, the combination with a removable follower, and means for feeding cotton thereto and forming a bale thereupon, of a support therefor, escapement mechanism in connection therewith for permitting said follower to recede when the pressure thereupon exceeds a predetermined amount, truck-rails, the central portion of which is level and the ends inclined, connected trucks, one of which rests partly on the level portion of the track and partly on the inclined portion thereof, adapted to hold said follower independent of its support when the same is in its lowest position, and stops for controlling the movement of said trucks, substantially as described.

54. In a press for baling cotton and other fibrous materials, the combination with a follower and means for feeding cotton thereto and forming a bale thereupon, of a support therefor, escapement mechanism in connection therewith adapted to permit said follower to recede when the pressure thereupon exceeds a predetermined limit, means for throwing said escapement mechanism out of gear, a truck adapted to support said follower independent of its support when the same reaches its lowest position, and rails on which said truck moves, substantially as described.

55. In a press for baling cotton and other fibrous materials, the combination with a follower, and means for feeding cotton thereto and forming a bale thereupon, of a support therefor, escapement mechanism in connection therewith adapted to permit said follower to recede when the pressure thereupon exceeds a predetermined limit, means for throwing said escapement mechanism out of gear, means for raising said follower-support, and means for throwing the escapement mechanism into gear when the upper position of the follower is reached, substantially as described.

56. In a press for baling cotton and other fibrous materials, the combination with a follower and means for feeding cotton thereto and forming a bale thereupon, of a support therefor, escapement mechanism in connection therewith adapted to permit the follower to recede when the pressure thereupon exceeds a predetermined limit, means for throwing said escapement mechanism out of gear, guides for said follower adapted to guide the follower during the formation of a bale and to release the same when the follower reaches its lowest position, a truck adapted to support said follower independent of its support when the same reaches its lowest position, and rails on which said truck moves, substantially as described.

57. In a press for baling cotton and other fibrous materials, the combination with bale-forming mechanism, of covering-plates for the upper and under bale-surfaces, means for holding the lower covering-plate in position during the formation of the bale, means for placing the upper covering-plate over the bale when the same is completely formed, and means for holding said covering-plates together when pressure is removed from the bale, substantially as described.

58. In a press for baling cotton and other fibrous materials, the combination with an upper pressure-surface, a removable follower constituting a lower pressure-surface, a support therefor, and means for permitting the follower to recede as a bale is formed thereon, of means for forming a bale between said pressure-surfaces, a covering-plate for the upper surface of the bale, means for placing the same over the bale when the bale is completely formed, and means for holding together said covering-plate and said follower when pressure is removed from the bale, substantially as described.

59. In a press for baling cotton and other fibrous materials, the combination with an upper pressure-surface, a follower constituting a lower pressure-surface, a support therefor, means for permitting the follower to recede as a bale is formed thereupon, an intermediate reciprocating pressure-transmitter and operative mechanism therefor, of a covering-plate for the upper surface of the bale, means on said pressure-transmitter for holding said covering-plate during the formation of a bale and for releasing the same when the bale is completely formed, and means for securing together said covering-plate and said follower when pressure is removed from the bale, substantially as described.

60. In a press for baling cotton and other fibrous materials, the combination with an upper pressure-surface, a removable follower constituting a lower pressure-surface, a support therefor, means for permitting the follower to recede as a bale is formed thereon, an intermediate reciprocating pressure-transmitter, and mechanism for operating the same, of a covering-plate for the upper surface of the bale, means on said carriage for holding said covering-plate during the formation of a bale and for releasing the same when the bale is completely formed, and means for holding together said covering-plate and said follower when pressure is removed from the bale, substantially as described.

61. In a press for baling cotton and other fibrous materials, the combination with an upper pressure-surface, a follower constituting a lower pressure-surface, a support therefor, means for permitting the follower to recede as a bale is formed thereon, an intermediate reciprocating pressure-transmitter, and operative mechanism therefor, of a grating adapted to serve as a cover for the upper surface of the bale, means for holding said grating in position between the pressure-rolls during the formation of a bale and for releasing the same when the bale is completely formed, and means for holding together said grating and said follower when pressure is removed from the bale, substantially as described.

62. In a press for baling cotton and other fibrous materials, the combination with an upper pressure-surface, a follower constituting a lower pressure-surface, a support therefor, means for permitting the follower to recede as a bale is formed thereon, an intermediate reciprocating pressure-transmitter, and actuating mechanism therefor, of a grating adapted to serve as a cover for the upper bale-surface, automatically-operating retaining means for holding said grating in position between said pressure-rolls during the formation of a bale and for releasing said grating when the formation of a bale is complete, and means for holding together said grating and said follower when pressure is removed from the bale, substantially as described.

63. In a press for baling cotton and other fibrous materials, the combination with an upper pressure-surface, a follower constituting a lower pressure-surface, a support therefor, means for permitting the follower to recede as a bale is formed thereon, an intermediate reciprocating pressure-transmitter and operative mechanism therefor, of a grating adapted to be held in position between said pressure-rolls, side plates on said grate, lugs on said side plates, reciprocating levers on said carriage having holding devices thereon adapted to engage said lugs and hold said grating in position, means actuated automatically by the rise and fall of the follower for actuating said levers, and means for holding together said grating and said follower when pressure is removed from the bale, substantially as described.

64. In a press for baling cotton and other fibrous materials, the combination with an upper pressure-surface, a follower constituting a lower pressure-surface, a support therefor, means for permitting said follower to recede as a bale is formed thereon, an intermediate reciprocating pressure-transmitter and operative mechanism therefor, of a covering-plate for the upper surface of the bale, supports on said follower for supporting the said covering-plate while it is being raised in position, automatically-operating retaining means for holding said covering-plate in position during the formation of a bale and releasing it when the formation of a bale is complete, and means for holding together said covering-plate and said follower when pressure is removed from the bale, substantially as described.

65. In a press for baling cotton and other fibrous materials, the combination with an upper pressure-surface, a follower constituting a lower pressure-surface, a support therefor, means for permitting the follower to recede as a bale is formed thereon, an intermediate reciprocating pressure-transmitter and operative mechanism therefor, of a grating adapted to be held in position between said pressure-rolls, rollers on said follower adapted to support the grating while the same is being raised into position, automatically-operating retaining means on said carriage for holding said grating in position between the pressure-rolls during the formation of a bale and for releasing the same when the formation of a bale is complete, and means for holding together said grating and said follower when pressure is removed from the bale, substantially as described.

66. In a press for baling cotton and other fibrous materials, the combination with an upper pressure-surface, a follower having revoluble rods journaled on each side thereof constituting a lower pressure-surface, a support therefor, means for permitting the follower to recede as the bale is formed thereon, an intermediate reciprocating pressure-transmitter and operative mechanism therefor, of a covering-plate for the upper surface of the bale, means for placing said plate over the bale when the same is completely formed, and holding devices engaging said covering-plate and said revoluble follower-rods and adapted to prevent expansion of the bale when pressure is removed therefrom, substantially as described.

67. In a press for baling cotton and other fibrous materials, the combination with an upper pressure-surface, a follower, having revoluble rods journaled on each side thereof, constituting a lower pressure-surface, a support therefor, means for permitting the follower to recede as a bale is formed thereon, an intermediate reciprocating pressure-transmitter, and operative mechanism therefor, of a covering-plate for the upper surface of the bale, means for placing the same over the bale when the same is completely formed, holding devices engaging said covering-plate and said follower and adapted to hold the same together when pressure is removed from the bale, and means for removing said holding devices, substantially as described.

68. In a press for baling cotton and other fibrous materials, the combination with an upper pressure-surface, a follower, having revoluble rods journaled on each side thereof, constituting a lower pressure-surface, a support therefor, means for permitting the follower to recede as a bale is formed thereon, an intermediate reciprocating pressure-transmitter, and operative mechanism therefor, of a grating adapted to be held in position between said pressure-rolls, side plates on said grating, lugs on said side plates, reciprocating levers on said carriage having holding devices thereon adapted to engage said lugs and hold said grating in position, supports on said follower for holding said grating while it is being raised in position, automatically-operating mechanism actuated by the follower for operating said reciprocating levers, and hooked rods engaging said grating and said revoluble follower-rods and adapted to prevent expansion of the bale when pressure is removed therefrom, substantially as described.

69. In a press for baling cotton and other fibrous materials, the combination with an upper pressure-surface, a follower having revoluble rods journaled on each side thereof constituting a lower pressure-surface, a support therefor, means for permitting the follower to recede as a bale is formed thereon, an intermediate reciprocating pressure-transmitter and operative mechanism therefor, of a grating formed with triangularly-shaped bars, adapted to be held in position between said pressure-rolls, side plates on said grating, lugs on said side plates, reciprocating levers on said carriage having holding devices thereon adapted to engage said lugs and hold said grating in position, supports on said follower for holding said grating while it is being raised in position, automatically-operating mechanism actuated by the follower for operating said reciprocating levers, hooked rods engaging said grating and said revoluble follower-rods and adapted to prevent expansion of the bale when pressure is removed therefrom, levers connecting said revoluble follower-rods, and means for operating the levers so as to cause said rods to rotate in opposite directions, substantially as described.

70. In a press for baling cotton and other fibrous materials, the combination with an upper pressure-surface, a follower constituting the lower pressure-surface, mechanism for forming a bale in layers upon the surface of the follower, and means for permitting the follower to recede as the bale is formed thereon, of plates movably supported on either side of the space occupied by the follower and adapted to press upon and hold even the ends of the layers of cotton, and means for causing said plates to rise and fall upon the surface of the cotton as the layers of the bale are added thereto, substantially as described.

71. In a press for baling cotton and other fibrous materials, the combination with an upper pressure-surface, a follower constituting the lower pressure-surface, means for permitting the same to recede as the bale is formed thereon, an intermediate reciprocating pressure-transmitter having a feed-opening, and mechanism for actuating the same so that the feed-opening traverses the surface of the follower, of plates movably supported beneath the pressure-rolls on either side of the space occupied by the follower, and adapted to press upon the ends of the layers of cotton which are formed on the follower, and means for causing said plates to rise when the feed-opening is over them and to press against the surface of the cotton when the pressure-transmitter is over them, substantially as described.

72. In a press for baling cotton and other fibrous materials, the combination with an upper pressure-surface, a follower constituting a lower pressure-surface, means for permitting the same to recede as a bale is formed thereon, an intermediate reciprocating pressure-transmitter having a feed-opening, and mechanism for actuating the same so that the feed-opening traverses the surface of the follower, of plates pivoted to the machine-frame, with their upper faces when in their lower position on the level of travel of the pressure-transmitter, on either side of the space occupied by the follower, said plates being adapted to press upon the ends of the layers of cotton which are formed on the follower, and means for causing said plates to rise when the feed-opening is over the same, substantially as described.

73. In a press for baling cotton and other fibrous materials, the combination with an upper pressure-surface, a follower constituting the lower pressure-surface, means for permitting the same to recede as the bale is formed thereon, an intermediate reciprocating carriage having journaled therein a series of pressure-rolls, having a central feed-opening, and having lugs with curved outer faces on both sides of the inner surface of the carriage with their centers on a line central of the feed-opening, and means for causing said carriage to reciprocate so that the feed-opening traverses the surface of the follower, of plates pivoted to the machine-frame with their upper faces when in their lower position on the level of travel of the pressure-rolls, on either side of the space occupied by the follower, said plates being adapted to press upon the ends of the layers of cotton which are formed on the follower, whereby said plates will be raised by said lugs when the feed-opening is over them, and depressed by said pressure-rolls during the remainder of the travel of the carriage, substantially as described.

74. In a press for baling cotton and other fibrous materials, the combination with a follower, means for forming a bale thereon, and means for permitting the follower to recede as the bale is formed, of means for feeding a strip of bagging across the upper surface of the completed bale, substantially as described.

75. In a press for baling cotton and other fibrous materials, the combination with a follower, means for forming a bale thereon, and means for permitting the follower to recede as a bale is formed, of normally-disengaged means for feeding a strip of bagging across the surface of the completed bale, and automatic means for bringing said normally-disengaged means into operative position, substantially as described.

76. In a press for baling cotton and other fibrous materials, the combination with an upper pressure-surface, a follower constituting a lower pressure-surface, means for permitting the same to recede as a bale is formed thereon, an intermediate reciprocating pressure-transmitter, and operative mechanism therefor, of a normally-disengaged bagging-carrier on said carriage, bagging-feeding mechanism on said carrier, means on said carriage for actuating the same, and means for bringing said carrier into operative position, substantially as described.

77. In a press for baling cotton and other fibrous materials, the combination with an upper pressure-surface, a follower constituting a lower pressure-surface, means for permitting the same to recede as a bale is formed thereon, an intermediate reciprocating pressure-transmitter, and operative mechanism therefor, of a normally-disengaged bagging-carrier on said carriage, a track therefor, feed-rollers on one end thereof, gears on said carriage for actuating said feed-rolls so as to feed bagging into the press, and means for bringing said carrier into operative position, substantially as described.

78. In a press for baling cotton and other fibrous materials, the combination with an upper pressure-surface, a follower constituting a lower pressure-surface, means for permitting the same to recede as a bale is formed thereon, an intermediate reciprocating pressure-transmitter, and operative mechanism therefor, of a normally-disengaged bagging-carrier on said carriage, a track therefor, feed-rollers on one end thereof, gears on said carriage for actuating said feed-rolls so as to feed bagging into the press, a pivoted trigger engaging with said carrier, and means for operating the same so as to throw the carrier into operative position when a bale is formed.

79. In a press for baling cotton and other fibrous materials, the combination with an upper pressure-surface, a follower constituting a lower pressure-surface, means for permitting the same to recede as a bale is formed thereon, an intermediate reciprocating pressure-transmitter, and operating mechanism therefor, of a normally-disengaged bagging-carrier on said carriage, feeding mechanism thereon, means on said carriage for actuating the same, means for bringing said carrier into operative position when a bale is formed, and means for throwing said carrier out of operative position after the bagging has been fed across the upper surface of the bale, substantially as described.

In testimony whereof I affix my signature in presence of two witnesses.

LEWIS B. McDONALD.

Witnesses:
R. C. PAYMENT,
JENNIE C. MARION.